US012790854B2

(12) United States Patent
Trent et al.

(10) Patent No.: US 12,790,854 B2
(45) Date of Patent: Nov. 10, 2026

(54) CYLINDER LOCK WITH SECONDARY LOCKING ELEMENT COUPLED TO A PRIMARY PIN ASSEMBLY

(71) Applicant: ASSA ABLOY HIGH SECURITY GROUP INC., Salem, VA (US)

(72) Inventors: Douglas E. Trent, Roanoke, VA (US); Mark Benzie, Roanoke, VA (US); Adam Johnson, Salem, VA (US)

(73) Assignee: ASSA ABLOY HIGH SECURITY GROUP INC., Salem, VA (US)

( * ) Notice: Subject to any disclaimer, the term of this patent is extended or adjusted under 35 U.S.C. 154(b) by 55 days.

(21) Appl. No.: 18/978,339

(22) Filed: Dec. 12, 2024

(65) Prior Publication Data

US 2025/0198196 A1 Jun. 19, 2025

Related U.S. Application Data

(60) Provisional application No. 63/610,334, filed on Dec. 14, 2023.

(51) Int. Cl.

*E05B 27/00* (2006.01)
*E05B 15/08* (2006.01)
*E05B 27/10* (2006.01)

(52) U.S. Cl.

CPC .......... *E05B 27/0057* (2013.01); *E05B 15/08* (2013.01); *E05B 27/0017* (2013.01);
(Continued)

(58) Field of Classification Search

CPC .. E05B 27/0057; E05B 27/10; E05B 27/0017; E05B 15/08; E05B 27/0078;
(Continued)

(56) References Cited

U.S. PATENT DOCUMENTS 3,722,240 A * 3/1973 Spain .................. E05B 27/0039 70/494
3,788,110 A * 1/1974 Sugae ................. E05B 27/0053 70/358

(Continued)

FOREIGN PATENT DOCUMENTS

EP 4 253 699 A1 10/2023
ES 2 955 095 A1 11/2023

(Continued)

OTHER PUBLICATIONS

International Search Report and Written Opinion issued for International Application No. PCT/US2024/059770 on Apr. 16, 2025, 18 pages.

(Continued)

*Primary Examiner* — Christine M Mills
*Assistant Examiner* — Faria F Ahmad
(74) *Attorney, Agent, or Firm* — ROTHWELL, FIGG, ERNST & MANBECK, P.C.

(57) ABSTRACT

A cylinder lock includes tumbler pin assemblies and a secondary locking element associated with at least one of the pin assemblies. The secondary locking element is biased outwardly to engage a locking feature formed in the bore of the housing to prevent the plug from rotating within the bore. A portion of the associated primary pin assembly extends through the secondary locking element and into the keyway and is movable independently of the secondary locking element. The secondary locking element includes at least one control feature that is directly or indirectly engaged by a key inserted into the keyway to cause the secondary locking element to move inwardly toward the plug so that the secondary locking element disengages from the locking feature or to permit the secondary locking element to be
(Continued)

moved inwardly toward the plug so that the secondary locking element can disengage from the locking feature.

43 Claims, 33 Drawing Sheets

(52) U.S. Cl.
CPC .......... *E05B 27/10* (2021.08); *E05B 27/0021* (2013.01); *E05B 27/0053* (2013.01)

(58) Field of Classification Search
CPC ............. E05B 27/0082; E05B 27/0032; E05B 27/0039; E05B 27/0053; E05B 27/0021
See application file for complete search history.

(56) References Cited

U.S. PATENT DOCUMENTS

| | | | | | |
|---|---|---|---|---|---|
| 3,943,739 | A * | 3/1976 | Genakis | E05B 27/0053 | 70/419 |
| 4,103,526 | A * | 8/1978 | Surko, Jr. | E05B 27/0039 | 70/494 |
| 4,356,713 | A * | 11/1982 | Widen | E05B 27/0082 | 70/495 |
| 4,393,673 | A * | 7/1983 | Widen | E05B 27/0082 | 70/495 |
| 4,631,941 | A * | 12/1986 | Sjunnesson | E05B 27/0053 | 70/389 |
| 4,823,575 | A * | 4/1989 | Florian | E05B 27/00 | 70/358 |
| 4,854,146 | A * | 8/1989 | O'Connell | E05B 47/0603 | 70/277 |
| 5,000,019 | A * | 3/1991 | Foster | E05B 27/005 | 70/389 |
| 5,123,268 | A * | 6/1992 | Eizen | E05B 27/0021 | 70/359 |
| 5,222,383 | A * | 6/1993 | Fann | E05B 27/0021 | 70/358 |
| 5,419,168 | A * | 5/1995 | Field | E05B 27/0053 | 70/494 |
| 5,964,111 | A * | 10/1999 | Lambert | E05B 27/083 | 70/381 |
| 5,966,971 | A * | 10/1999 | Keller | E05B 27/0021 | 70/378 |
| 6,477,875 | B2 * | 11/2002 | Field | E05B 27/0053 | 70/494 |
| 6,526,791 | B2 * | 3/2003 | Shvarts | E05B 27/0035 | 70/495 |
| 6,945,082 | B2 * | 9/2005 | Field | E05B 27/0032 | 70/494 |
| 6,981,396 | B1 * | 1/2006 | Kim | E05B 27/0082 | 70/369 |
| 7,162,901 | B2 * | 1/2007 | Williams | E05B 27/00 | 70/358 |
| 7,797,973 | B2 | 9/2010 | Field et al. | | |
| 8,096,155 | B2 * | 1/2012 | Williams | E05B 27/00 | 70/358 |
| 8,186,194 | B2 | 5/2012 | Field et al. | | |
| 8,720,241 | B1 * | 5/2014 | Widen | E05B 19/0023 | 70/494 |
| 9,482,031 | B2 | 11/2016 | Field et al. | | |
| 9,771,738 | B2 | 9/2017 | Field et al. | | |
| 10,087,654 | B2 * | 10/2018 | Nguyen | E05B 27/08 | |
| 10,337,210 | B2 * | 7/2019 | Widén | E05B 27/0039 | |
| 10,422,160 | B2 * | 9/2019 | Widén | E05B 27/0021 | |
| 11,280,111 | B2 | 3/2022 | Benzie et al. | | |
| 11,447,975 | B1 * | 9/2022 | Eden | E05B 19/0023 | |
| 12,018,512 | B2 * | 6/2024 | Eden | E05B 19/0023 | |
| 2011/0219833 | A1 | 9/2011 | Widen | | |

FOREIGN PATENT DOCUMENTS

| | | | | |
|---|---|---|---|---|
| GB | 2410292 | A * | 7/2005 | E05B 47/0044 |
| GB | 2453625 | A | 4/2009 | |
| WO | 2008/112228 | A1 | 9/2008 | |
| WO | 2009/120987 | A1 | 10/2009 | |

OTHER PUBLICATIONS

International Preliminary Report on Patentability and Written Opinion issued for International Application No. PCT/US2024/059770 on Jun. 25, 2026, 11 pages.

* cited by examiner

CYLINDER LOCK WITH SECONDARY LOCKING ELEMENT COUPLED TO A PRIMARY PIN ASSEMBLY

CROSS REFERENCE TO RELATED APPLICATION

This application claims the benefit under 35 U.S.C. § 119(e) of the filing date of U.S. provisional patent application Ser. No. 63/610,334 filed Dec. 14, 2023, the disclosure of which is incorporated herein by reference.

BACKGROUND AND SUMMARY

Traditional cylinder locks having a plug (or cylinder) rotatably disposed within a housing utilize a row of primary pin assemblies (also referred to as tumbler pin assemblies or primary tumbler pin assemblies), each consisting of one or more top drivers and a bottom pin, that extend across a shear line between the plug and the housing to block rotation of the plug within the housing. Each primary pin assembly is spring-biased within the housing and plug into a keyway formed in the plug so that the bottom pins are engaged by a top bitting surface of a key inserted into the keyway. The cuts on the top bitting surface of the key engage the bottom pins of the pin assemblies and position (elevate) each primary pin assembly to position an interface between each of the top drivers and bottom pins (or between two, adjacent top drivers) at the shear line of the plug and housing when a properly cut key is inserted into the keyway of the plug. The bottom pins seat on the cuts of a properly bitted key and push the top drivers upward against a spring force to align the interface with the shear line between the plug and the housing allowing rotation of the plug within the housing.

Other lock designs utilize secondary locking elements (finger pins, lift pins, sliders), in addition to the primary pin assemblies, and these secondary locking elements are controlled by additional features on the key. See, e.g., U.S. Pat. Nos. 11,280,111; 9,771,738; 9,482,031; 8,186,194; and 7,797,973. These secondary elements typically block a sidebar, or some other secondary locking element, but do not interact, engage, or affect the primary pin assemblies in the creation of the primary shear line between the plug and housing.

The lock described herein creates multiple shear lines at the primary row of primary pin assemblies. First, with the top drivers and bottom pins of the primary pin assemblies blocking rotation of the plug within the housing, and second, with a secondary locking element (or "secondary element" or "SE") blocking rotation of the plug within the housing. In this regard, the term "creates" a shear line means the locking element—e.g., the interface between the driver pin and the bottom pin of a primary pin assembly or a secondary locking element—is aligned with the shear line between the plug and the housing so that the locking element does not block rotation of the plug with respect to the housing. The top bitting surface cut on the key (at the SE location) along the row of primary pin assemblies is used to position the primary pin assembly at the SE location, and the key also includes a clearance cut (below the highest point of the top bitting edge of the key or below the top edge of a key blank) to allow proper positioning of the SE at the shear line or a control surface to move the SE to the shear line. Proper positioning of the SE at the shear line may also be controlled by a slider within the plug and a check pin slot formed in the key.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION

Definitions

Figure 1:
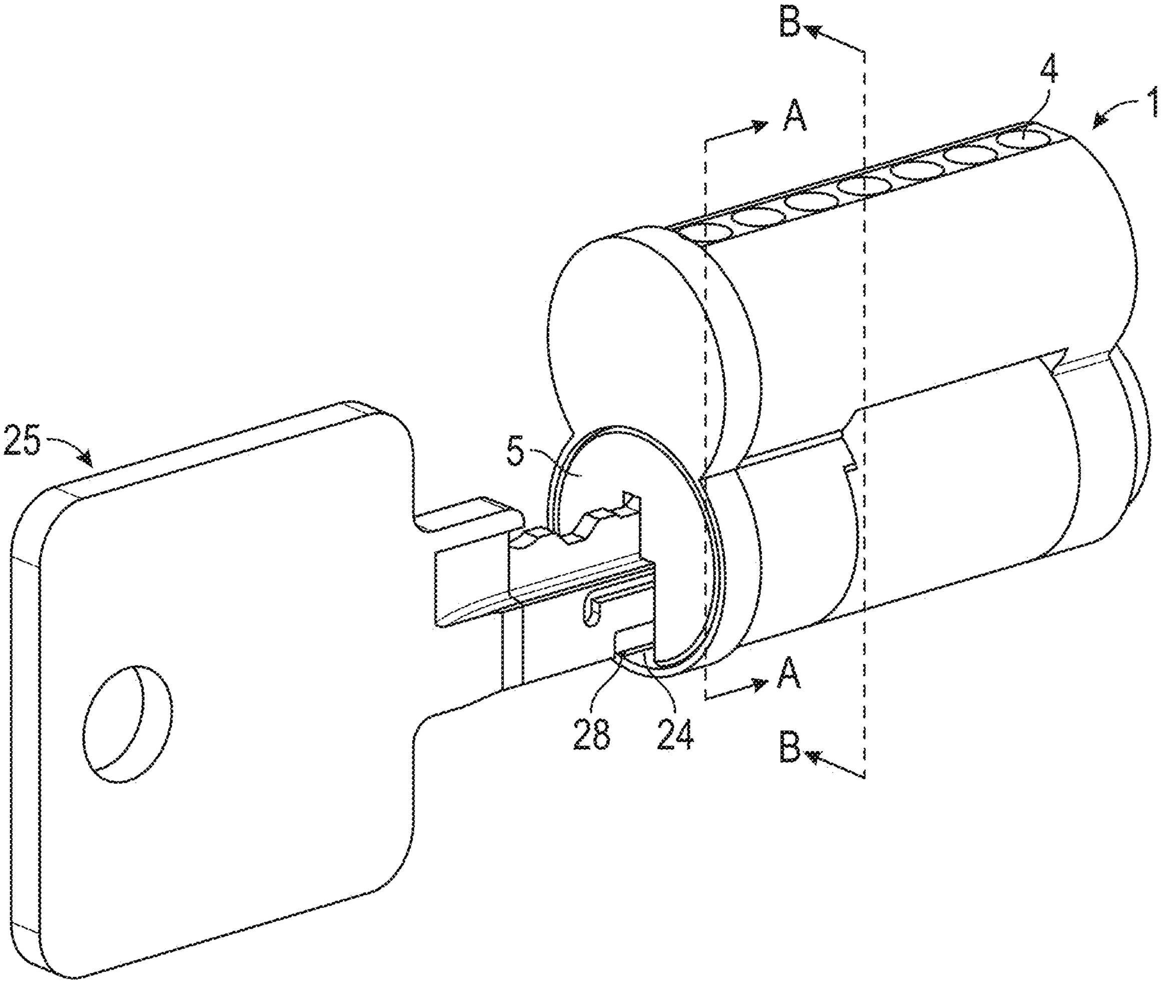
FIG. 1 is a perspective view of a first embodiment of a cylinder lock as described herein with a key partially inserted into the keyway thereof.
Figure 3:
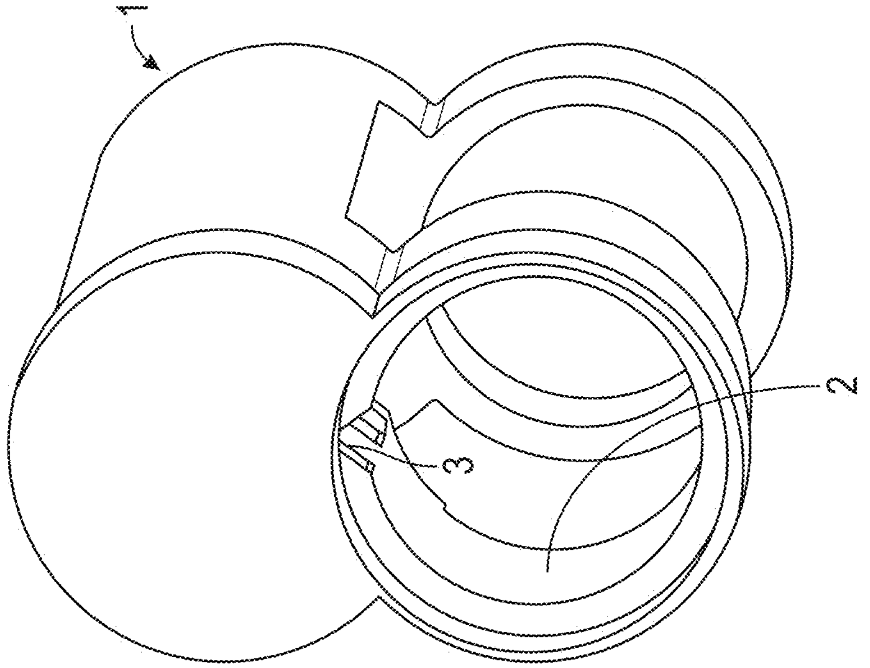
FIG. 3 is a front perspective view of the housing of the cylinder lock of FIG. 1.
Figure 2:
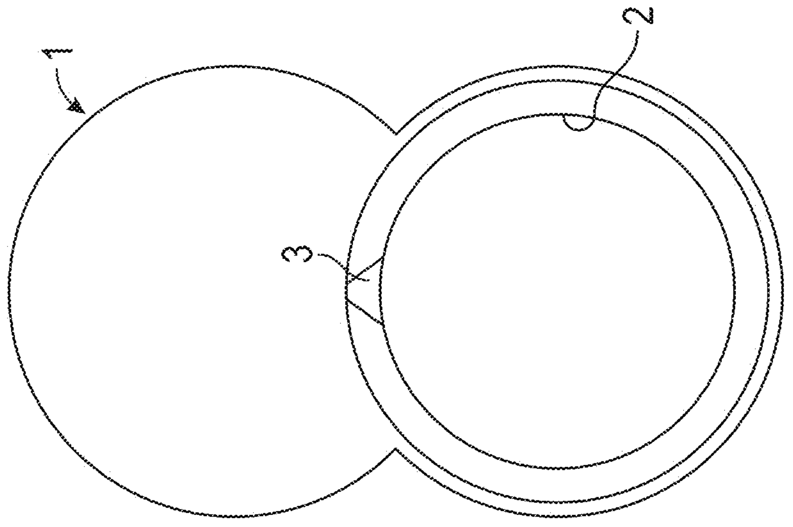
FIG. 2 is a front end of view of a housing of the cylinder lock of FIG. 1.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

References in the specification to "one embodiment," "an embodiment," a "further embodiment," "an example," "an exemplary embodiment," "some aspects," "a further aspect," "aspects," "an example," etc., indicate that the embodiment, example, or aspect described may include a particular feature, structure, or characteristic, but every embodiment encompassed by this disclosure may not necessarily include the particular feature, structure, or characteristic or combination thereof. Moreover, such phrases are not necessarily referring to the same embodiment, example, or aspect. Further, when a particular feature, structure, or characteristic is described in connection with an embodiment, such feature, structure, or characteristic is also a description in connection with other embodiments, examples, or aspects with which it is not incompatible, whether or not explicitly described.

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, forward, backward, sideward, sideways, or similar adjectives, prepositions, or variations thereof, are used for convenience in referring to such component, apparatus, location, feature, or a portion thereof or movement, force, or other dynamic action represented in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Unless otherwise stated, any specific dimensions mentioned in this description are merely representative of an exemplary implementation of a device embodying aspects of the disclosure and are not intended to be limiting.

To the extent used herein, the terms "about" or "approximately" apply to all numeric values and terms indicating specific physical orientations or relationships such as horizontal, vertical, parallel, perpendicular, concentric, or similar terms, specified herein, whether or not explicitly indicated. This term generally refers to a range of numbers, orientations, and relationships that one of ordinary skill in the art would consider as a reasonable amount of deviation to the recited numeric values, orientations, and relationships (i.e., having the equivalent function or result) in the context of the present disclosure. For example, and not intended to be limiting, this term can be construed as including a deviation of ±10 percent of the given numeric value, orientation, or relationship, provided such a deviation does not alter the end function or result of the stated value, orientation, or relationship. Therefore, under some circumstances as would be appreciated by one of ordinary skill in the art a value of about or approximately 1% can be construed to be a range from 0.9% to 1.1%.

To the extent used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

To the extent used herein, the term "adjacent" refers to being near (spatial proximity) or adjoining (physical contact). Adjacent objects or portions thereof can be spaced apart from one another or can be in actual or direct physical contact with one another. In some instances, adjacent objects or portions thereof can be coupled to one another or can be formed integrally with one another.

To the extent used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as stated as well as instances in which the event, circumstance, characteristic, or property occurs to a close approximation, such as accounting for typical tolerance levels or variability of the embodiments described herein.

To the extent used herein, the terms "optional" and "optionally" or the term "may" (e.g., as in the phrase "may include," "may comprise," "may produce," "may provide," or similar phrases) mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

To the extent used herein, the terms "first" and "second" or similar terms preceding the name of an element (e.g., a component, apparatus, location, feature, or a portion thereof or a direction of movement, force, or other dynamic action) are used for identification purposes to distinguish between similar elements, and are not intended to necessarily imply order, nor are the terms "first" and "second" intended to preclude the inclusion of additional similar elements. Furthermore, use of the term "first" preceding the name of an element (e.g., a component, apparatus, location, feature, or a portion thereof or a direction of movement, force, or other dynamic action) does not necessarily imply or require that there be additional, e.g., "second," "third," etc., such element(s).

To the extent used herein, the terms or phrases "configured to," "adapted to," "operable to," "constructed and arranged to," and similar terms or phrases mean that the object of the term or phrases includes, constitutes, or otherwise encompasses the requisite structure(s), mechanism (s), arrangement(s), component(s), material(s), algorithm(s), circuit(s), programming, etc. to perform a specified function, task, or tasks or achieve a specified output or characteristic, either automatically or perpetually or selectively when called upon to do so.

Secondary Locking Element—First Embodiment

A secondary locking element ("SE") as described herein is integrated into a cylinder lock having a plug rotatably disposed within a housing. Referring to FIGS. 1-5, the cylinder lock includes a plug 5 rotatably disposed within a bore 2 of a housing 1. A row of primary pin assemblies are positioned within pin holes 6 formed in the plug 5 and aligned pin holes 4 formed in an upper part of the housing 1 above the bore 2. The pin holes 6 are aligned with a keyway 24 formed in the plug 5. Keyway 24 receives a key 25.

Figure 9:
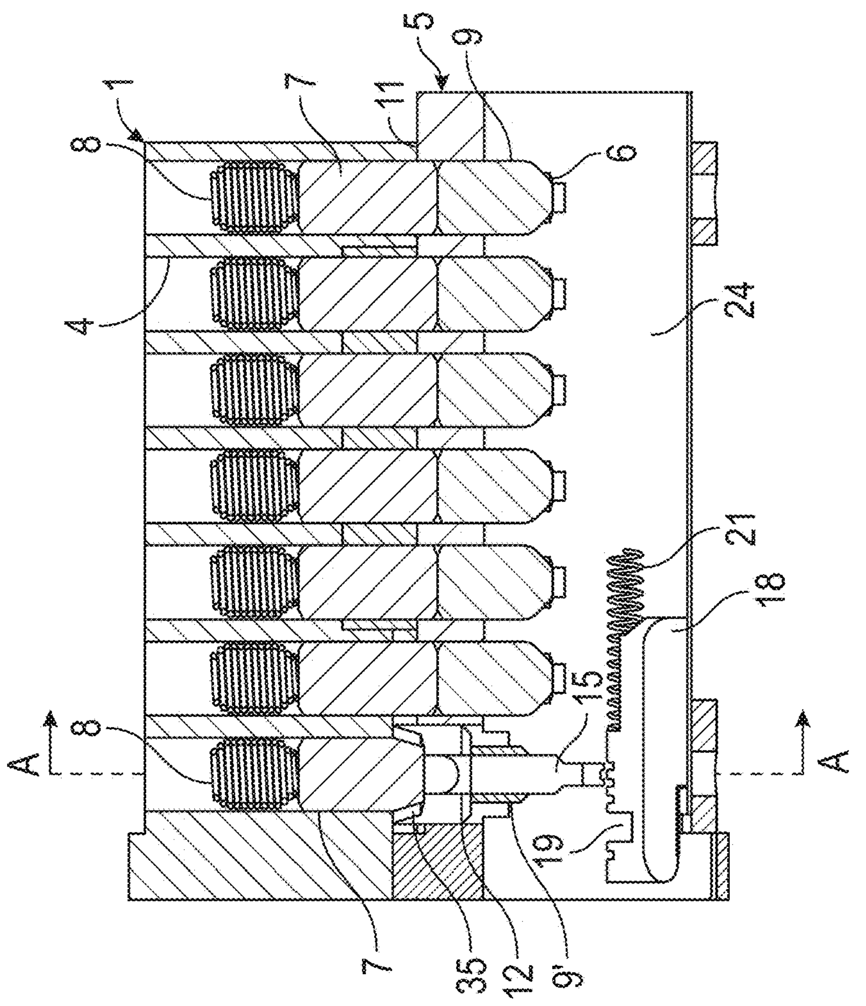
FIG. 9 is a transverse cross-section at line BB of FIGS. 1 and 8 in which the key is omitted.
Figure 8:
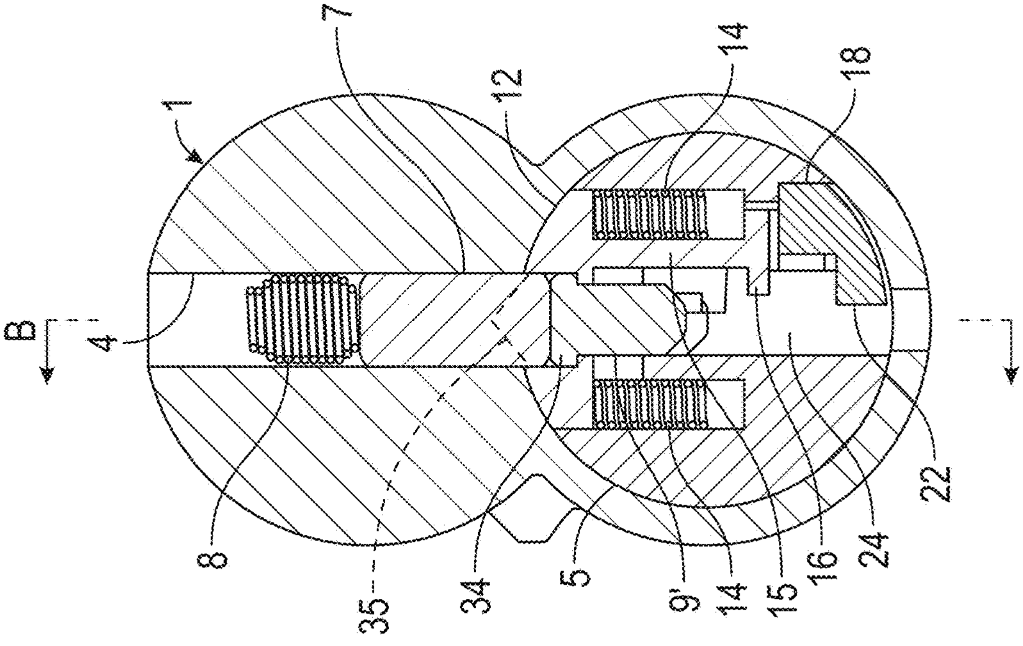
FIG. 8 is a radial cross-section at line A-A of FIGS. 1 and 9 in which the key is omitted.

FIG. 8 is a radial cross-section at line A-A (FIG. 1) in which the key is omitted. FIG. 9 is a transverse cross-section at line BB (FIGS. 1, 8) in which the key is omitted. As shown in FIGS. 8 and 9 each primary pin assembly may comprise a conventional assembly configuration that includes a top driver 7 and a bottom pin 9 to block rotation of the plug 5 within a housing 1. In some examples, top driver 7 may comprise a stack of two or more driver wafers to enable master keying. Each primary pin assembly also includes a spring 8 positioned above the top driver 7 within pin hole 4 within the housing 1 which urges the associated pin assembly downwards so that the associated top driver 7 extends from the housing 1 into pin hole 6 within the plug 5 past a shear line 11 between the plug and housing, thereby blocking the plug from rotating within the housing. The lower ends of the bottom pins 9 of the downwardly biased pin assemblies seat within stops at the bottoms of the pin holes 6 in the plug 5 (see FIG. 9) and extend into the keyway 24 so that a top bitting surface of a key 25 inserted into the keyway engages the lower ends of the bottom pins 9 and elevates each pin assembly so that the interface between the top of the bottom pin 9 and the bottom of the top driver 7 is positioned at the shear line to permit the plug 5 to rotate within the housing 1.

Figure 7:
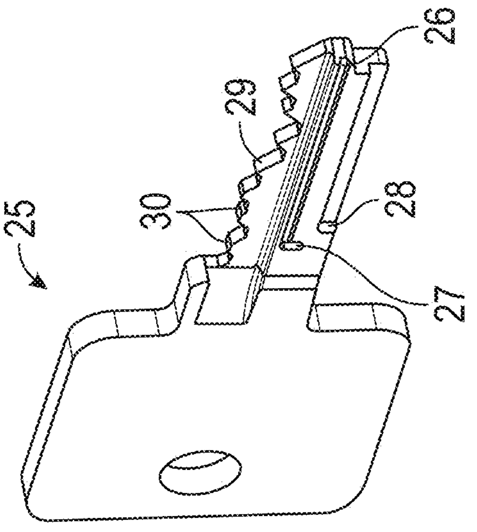
FIG. 7 is a perspective view of the key shown in FIG. 6.
Figure 6:
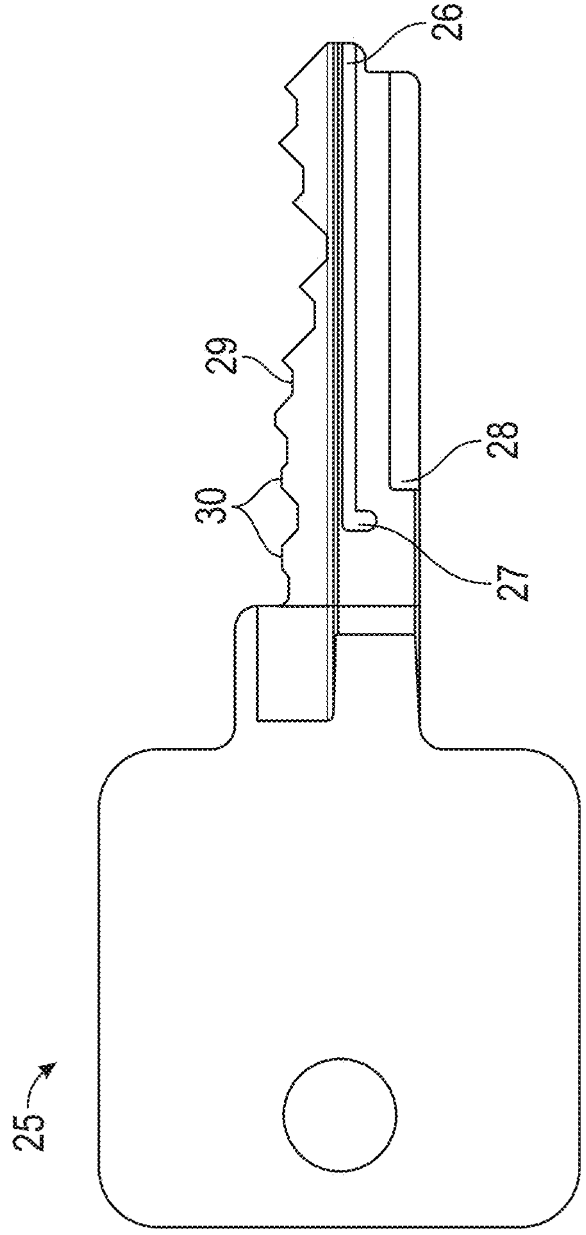
FIG. 6 is a side view of an embodiment of a key operable in a cylinder lock described herein.

Referring to FIGS. 1, 6, and 7, the key 25 for inserting into the keyway 24 of the plug 5 and operating the lock with the SE includes an upper bitting surface 29 of a key blade (the jagged top edge of the key blade), an optional top SE clearance cut 30 that is lower than the highest peak of upper bitting surface 29, a key side bitting 28 for operating a slider within the plug, a first (horizontal) control slot 26, and a second control slot (an SE check pin slot which may be vertically oriented) 27 for receiving a check pin of the SE. Operation of the key 25 and the SE will be described below.

Figure 4:
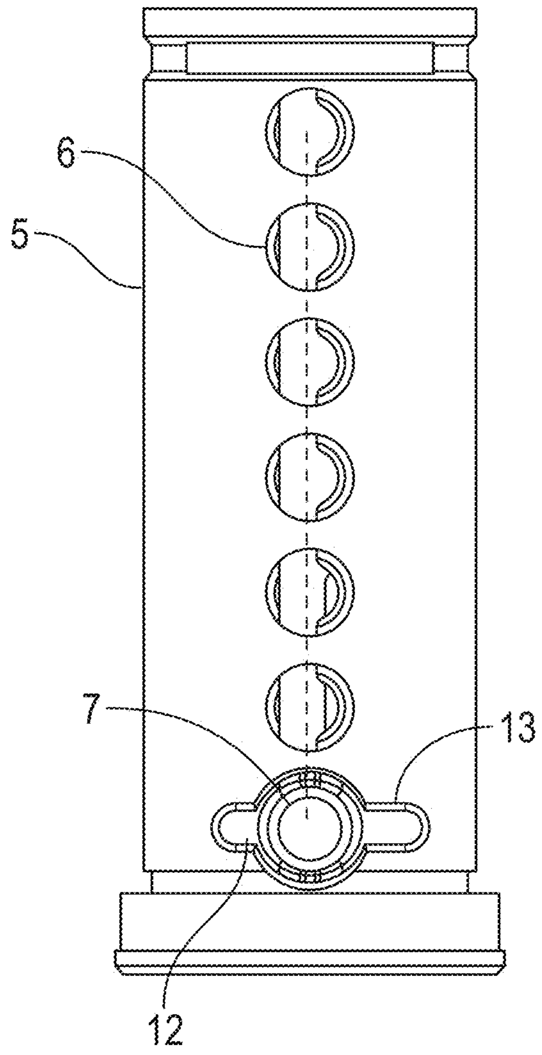
FIG. 4 is a top view of a plug of the cylinder lock of FIG. 1.

In one example, as shown in FIGS. 4, 8, and 9, an SE 12 is housed in a secondary element pocket (or SE pocket) 13 inside the plug 5 and is biased outwardly by springs 14 to engage one or more locking feature(s), such as recess(es) formed in an inner surface of the bore 2, such as a groove 3 (see FIGS. 2 and 3) formed in the housing 1, at the primary shear line 11 between the plug 5 and the housing 1. The SE springs are omitted and the SE 12 is not sectioned in FIG. 9. SE 12 may include one or more locking feature(s), such as projections 35, that are complementary to the one or more locking feature(s) formed in an inner surface of the bore 2. Projections 35 may be angled as shown in hidden lines in FIG. 8 or rounded or any other shape that is complementary to groove 3. When projections 35 of the SE 12 engage the groove 3, the SE prevents rotation of the plug relative to the bore 2. The example illustrated in FIGS. 8 and 9 includes a single SE 12 positioned at and coaxially arranged with respect to the first (i.e., forward-most) primary pin assembly of the lock. Other examples are contemplated in which the SE is associated with a different primary pin assembly or an SE is associated with each of more than one of the pin assemblies.

In the embodiment shown in FIGS. 8, 9, 11, and 12-18, projections 35 of the SE 12 have angled surfaces 17 (see FIG. 14) that are complementary to angled sides of the groove 3, such that a torque applied to the plug 5 by the key 25 will cause the SE 12 to move down and away from the groove 3 (e.g., as with a cam) if the SE 12 is not blocked from vertical movement. In general, projection(s) 35 may be any shape that is complementary with groove(s) 3 to cause the SE 12 to move down and away from the groove(s) 3 (e.g., as with a cam) if the SE 12 is not blocked from vertical movement. In this context, the surfaces of the locking feature(s) of the SE and the locking feature(s) of the housing are said to be "complementary" if the projection(s) of the SE extend to a sufficient extent into the recess(es) formed in the bore of the housing to prevent relative rotation between the plug and the housing until each projection is removed from its associated recess and the contours of the surface(s) of each projection sufficiently conform to the contours of the surface(s) of each associated recess such that a lateral force applied to the SE, e.g., by applying torque to the plug in which the SE is housed, will urge each projection out of its associated recess by a camming action between the complementary surfaces of each projection and its associated recess.

Figure 5:
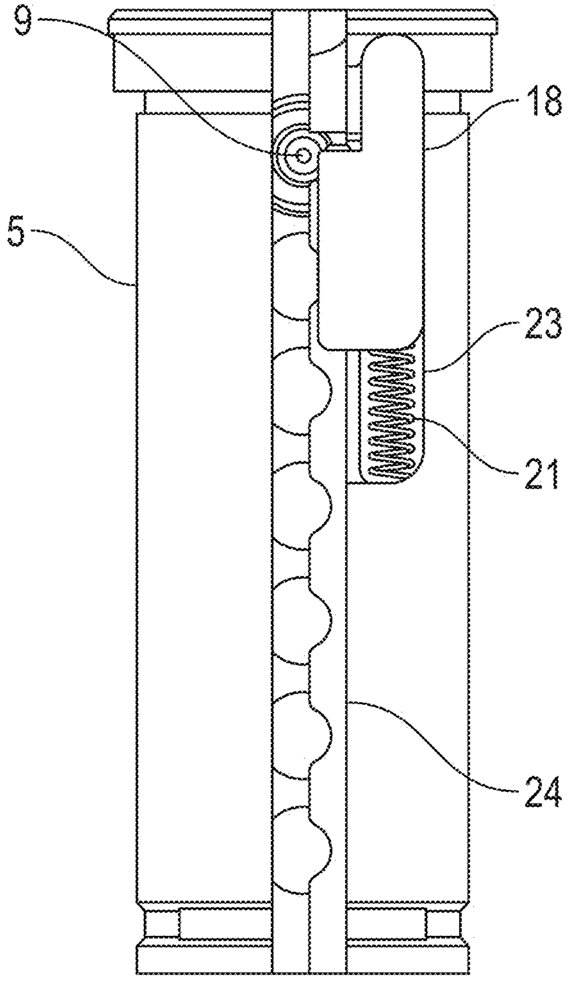
FIG. 5 is a bottom view of the plug of FIG. 4.

As shown in FIGS. 5, 8, and 9, a spring-biased slider 18 located in a slider pocket 23 in the bottom of the plug 5 is arranged for travel within the pocket 23 in a direction parallel to the length of the keyway 24 in the plug 5. The slider 18 is spring-biased by slider spring 21 towards the front of the cylinder plug 5. The slider 18 and slider spring 21 are not sectioned in FIG. 9. The forward travel of the slider may be limited by a machined feature in the plug.

Figure 10:
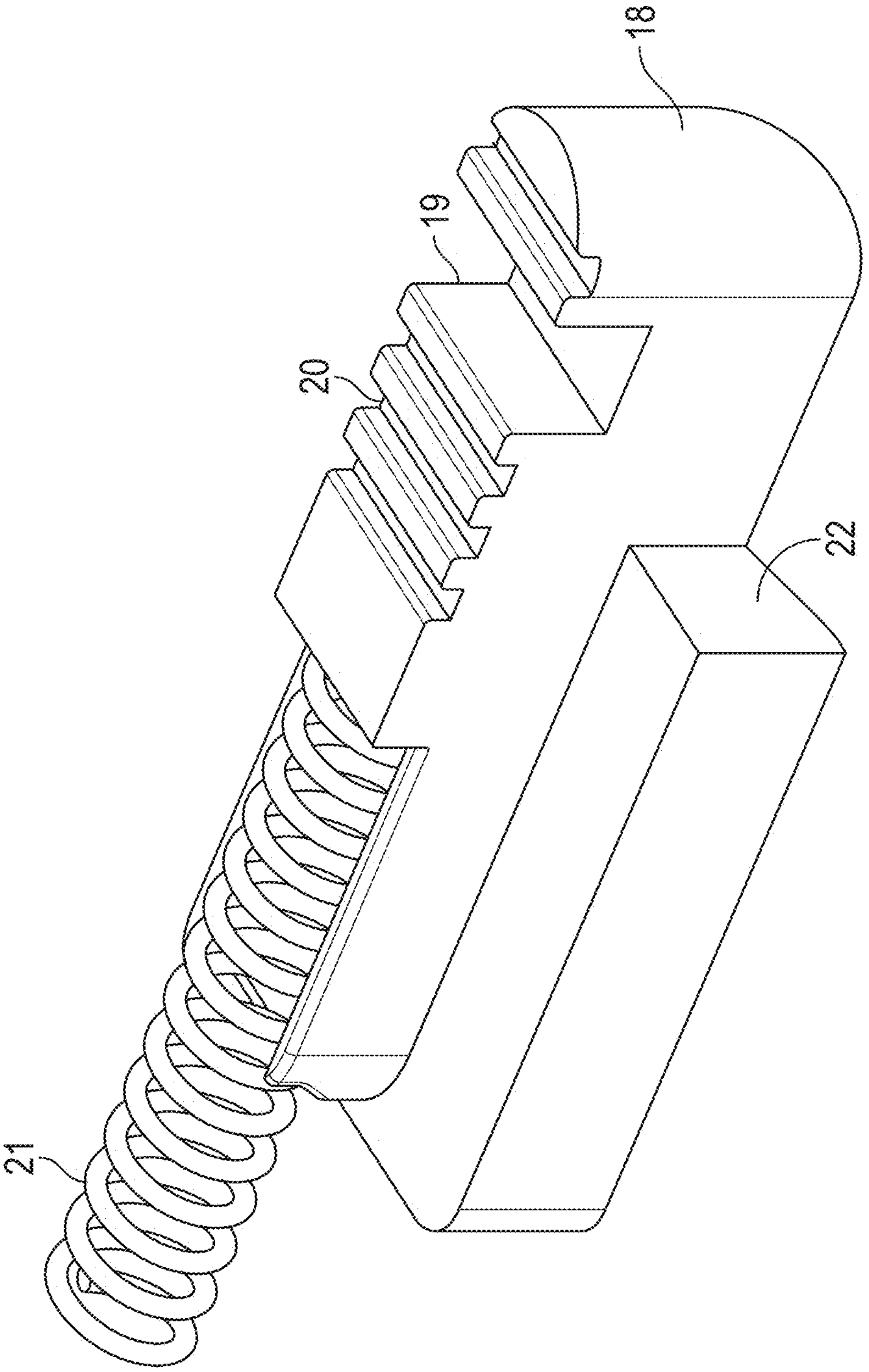
FIG. 10 is a perspective view of a slider of an embodiment of a cylinder lock describe herein.

Referring to FIG. 10, slider 18 has a feature (drive tab 22) that extends into the keyway 24 of the plug 5 to be engaged by the key side bitting 28. The slider drive tab 22 is engaged by the key side bitting 28 when the key is inserted into the keyway 24 so that further insertion of the key 25 pushes the slider 18 backwards against the force of spring 21 along a portion of the length of the keyway in the plug. In the illustrated embodiment, the key side bitting 28 comprises the end of a relief extending along a portion of the length of the blade of the key 25, and the slider drive tab 22 extends into the relief and is contacted by the key side bitting 28 as the key is inserted into the keyway 24, thus moving the slider 18. In one alternate example, key side bitting 28 comprises the end of a slot extending along a portion of the length of the blade of the key 25, and the slider drive tab 22 extends into the slot and is contacted by the key side bitting 28 as the key is inserted into the keyway 24, thus moving the slider 18. In an alternate example, the key side bitting surface comprises a tab or rib projecting from the side of the blade of the key that is received in a relief formed in a side of the slider, and the slider is moved by the key when the tab or rib contacts a terminal end of the relief.

Figure 11:
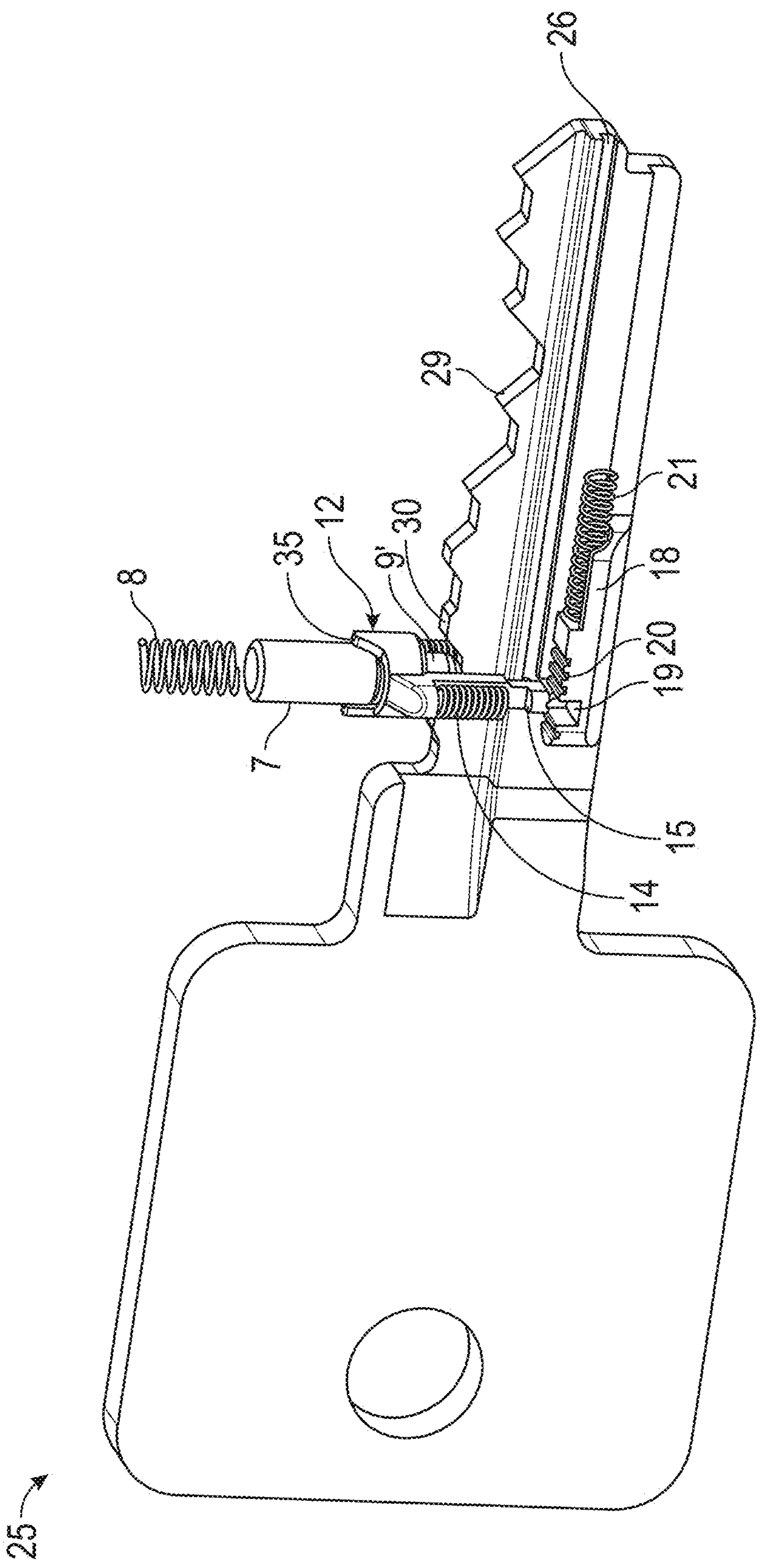
FIG. 11 is a perspective view of a key, a slider, a secondary element ("SE"), and a primary pin assembly associated with the SE of an embodiment of a cylinder lock described herein with the SE in a locked position unengaged with the slider.
Figure 12:
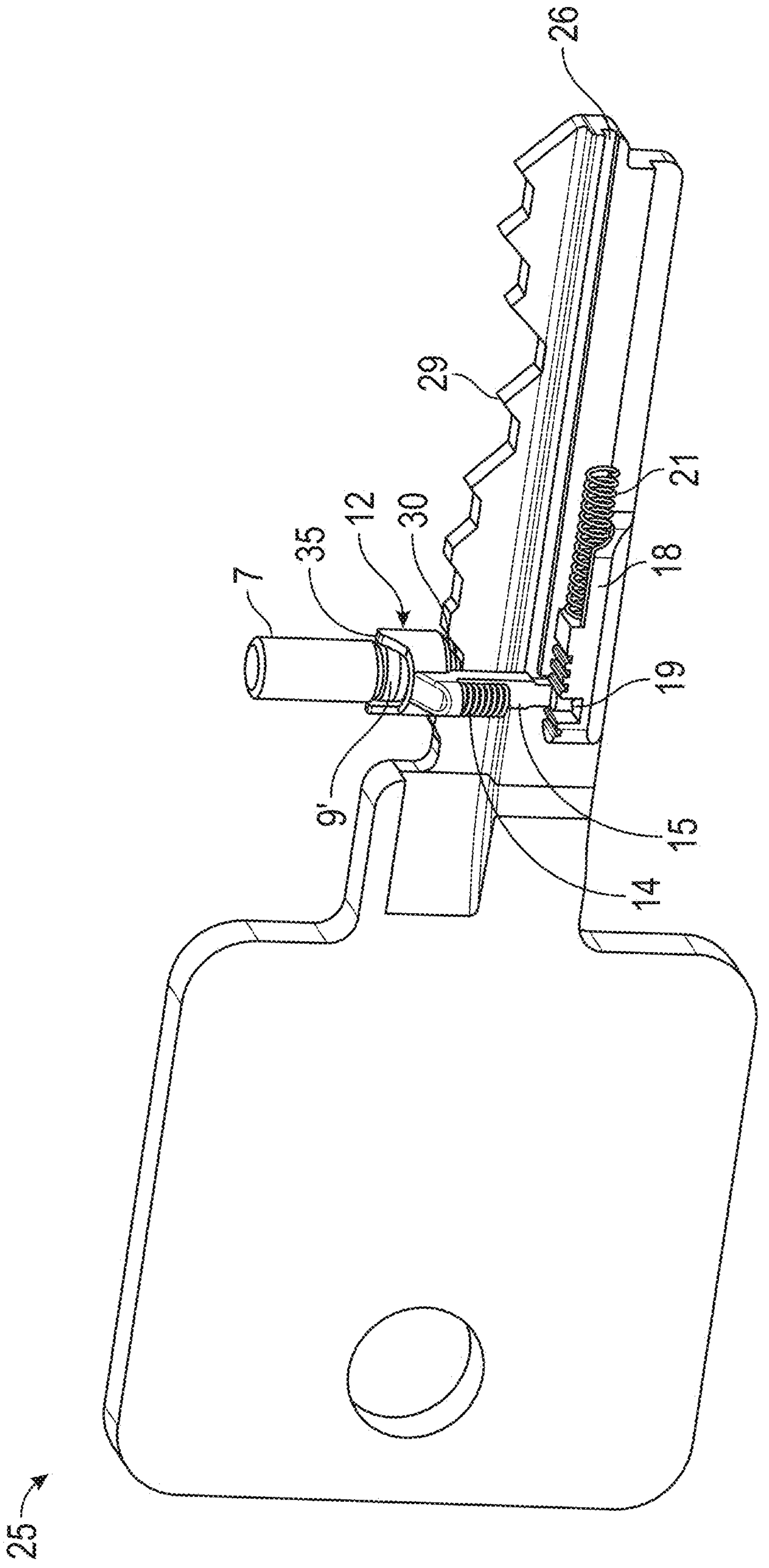
FIG. 12 is a perspective view of the key, the slider, the SE, and the associated primary pin assembly with the SE in an unlocked position engaged with a cutout in the slider as a result of rotation of the plug of the cylinder lock.
Figure 13:
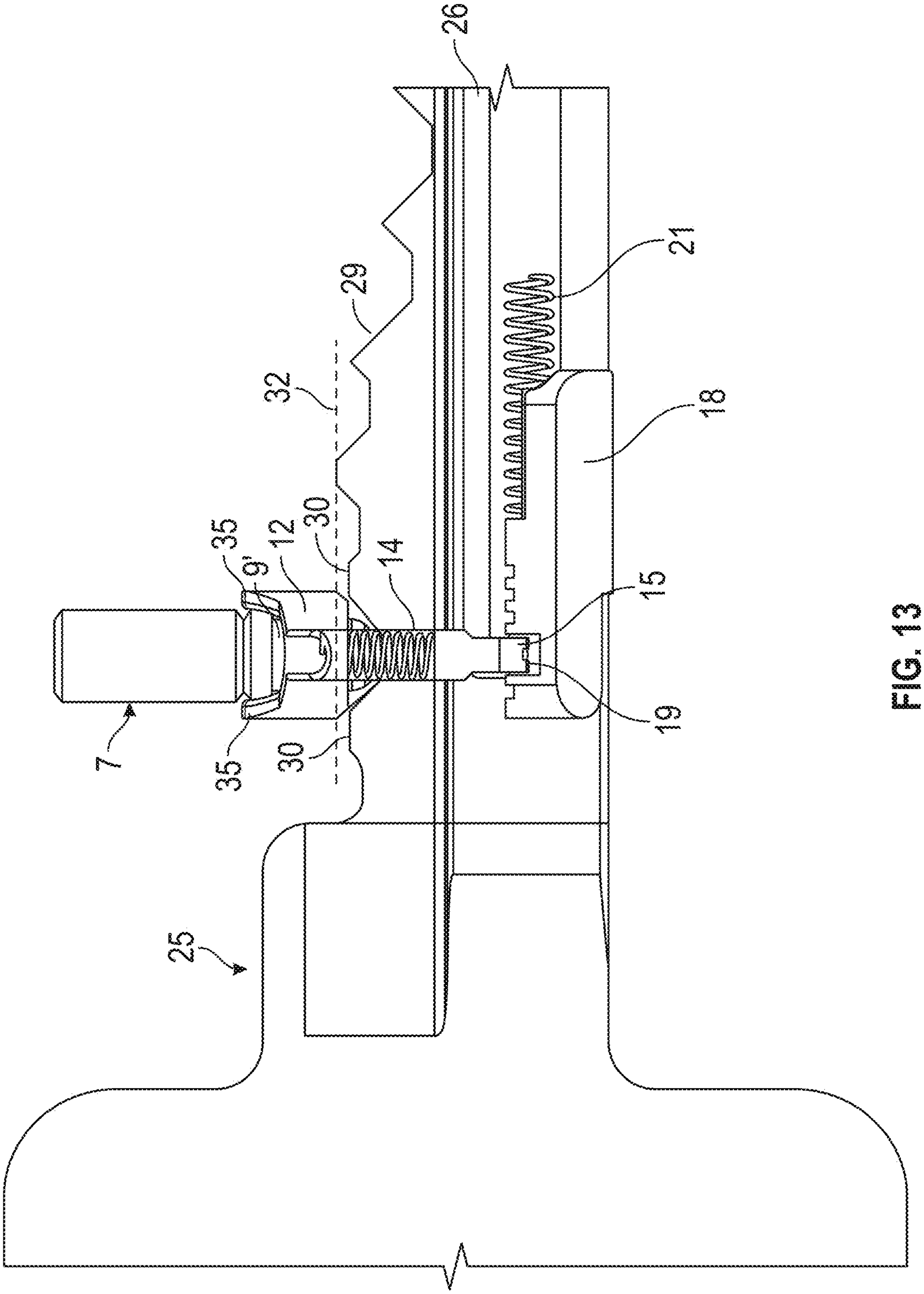
FIG. 13 is a partial side view of the key, the slider, the SE, and the associated primary pin assembly with the SE in the unlocked position engaged with the cutout in the slider as a result of rotation of the plug of the cylinder lock.
Figure 15:
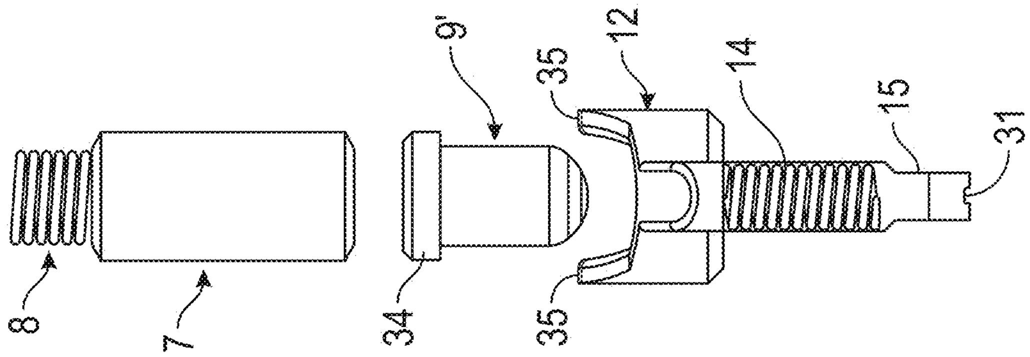
FIG. 15 is an exploded view of the SE and the associated primary pin assembly viewed in a transverse direction.
Figure 14:
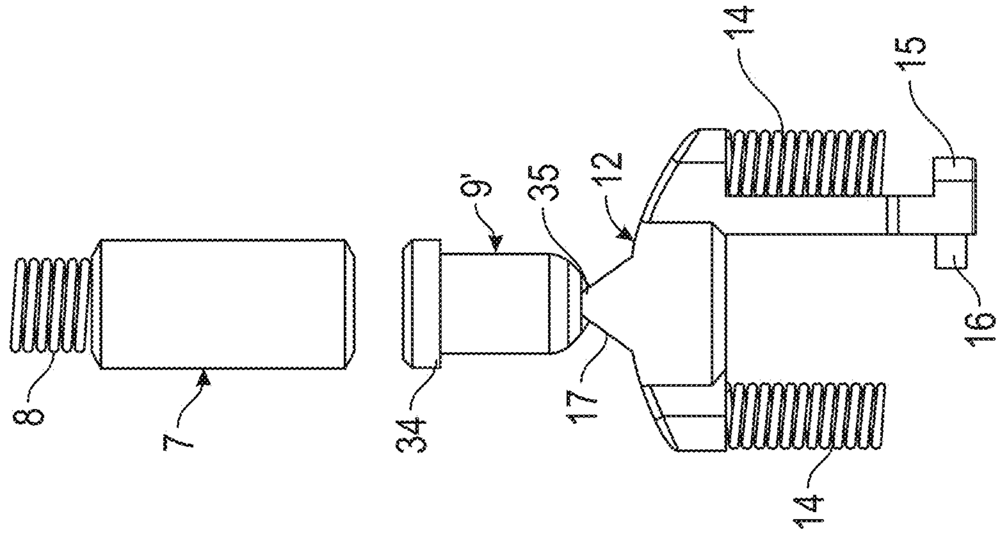
FIG. 14 is an exploded view of the SE and an associated primary pin assembly viewed in an axial direction.

The projection 35 of the SE 12 remains engaged with the groove 3, and away from the slider 18, as the key is inserted due to the upward spring force applied to the SE by SE springs 14. As shown in FIGS. 14 and 15, SE 12 has a control feature (leg 15) that extends downward within the plug adjacent to one of the SE springs 14. Referring to FIGS. 10 and 11, slider 18 has an SE cutout 19 located on the top surface of the slider that is positioned directly in line with the SE leg 15 when the slider is moved to the proper unlocked position by the key side bitting 28 on the key 25. The SE leg 15 will engage the slider 18 when the SE 12 is moved downward and away from the housing 1 as a result of rotation of the plug and the interaction of the projection 35 of the SE 12 with the complimentary sides of the groove 3. As shown in FIGS. 12 and 13, the SE cutout 19 provides clearance for a lower end of the SE leg 15 to permit the SE 12 to move down into the plug when the projection of SE is moved to the primary shear line outside of the housing 1 as the cylinder plug 5 is rotated. If the slider 18 is not moved far enough, or is moved too far (i.e., is not in an unlocked position), so that the cutout 19 is not aligned with the SE leg 15 (e.g., before the key 25 is inserted or because the key has an improperly positioned key side bitting 28), the SE leg 15 contacts the top of the slider 18, and the SE 12 is blocked from moving down and out of engagement with the groove 3, thereby preventing rotation of the plug within the housing 1. Thus, the SE leg 15 is indirectly engaged by the key 25 via the slider 18 to permit the SE 12 to move so that the projections 35 of the SE 12 can disengage from the groove 3 when the cutout 19 is aligned with the leg 15.

Figure 19:
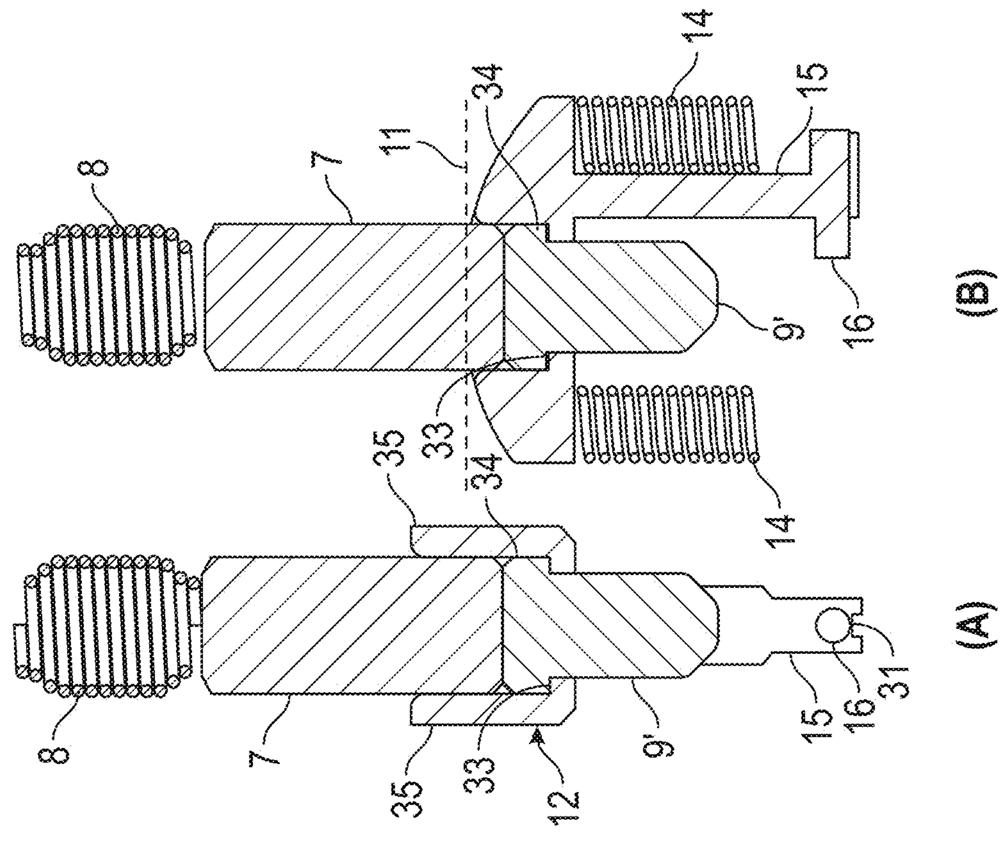
FIG. 19(A) is a transverse cross section of the SE and its associated primary pin assembly with a pin driver of the associated primary pin assembly below a shear line of the cylinder lock.
FIG. 19(B) is an axial cross section of the SE and its associated primary pin assembly with the pin driver of the associated primary pin assembly below the shear line of the cylinder lock.

The top surface of the slider 18 may contain shallow cutouts (false cutouts 20) that are not deep enough to provide relief for the SE leg 15 and allow the SE 12 its full travel to achieve the primary shear line. When the SE leg 15 engages false cutouts 20 as torque is applied to the plug 5, the leg 15 prevents further movement of the slider 18, thereby providing pick resistance. These are sometimes referred to as “false slots” or “pick grooves.” SE leg 15 may include a slot 31 formed in a bottom end thereof—see FIGS. 15, 19A), 20(A), and 21(A)—to capture ridges between consecutive cutouts 20.

Variations in the positioning of the drive tab 22 on the slider 18 and the position of the corresponding key side bitting 28 relative to the tip of the key allows for variations in key coding.

When the plug is returned to the home rotational position, the projection 35 of the SE 12 extends by force of springs 14 back into engagement with the groove 3 in the housing 1, and SE leg 15 moves out of cutout 19 of the slider 18. As the key 25 is withdrawn from the keyway 24, the slider spring 21 moves the slider 18 back towards the front of the plug 5 to its normal locked position. The lock is now returned to the locked position.

Figure 16:
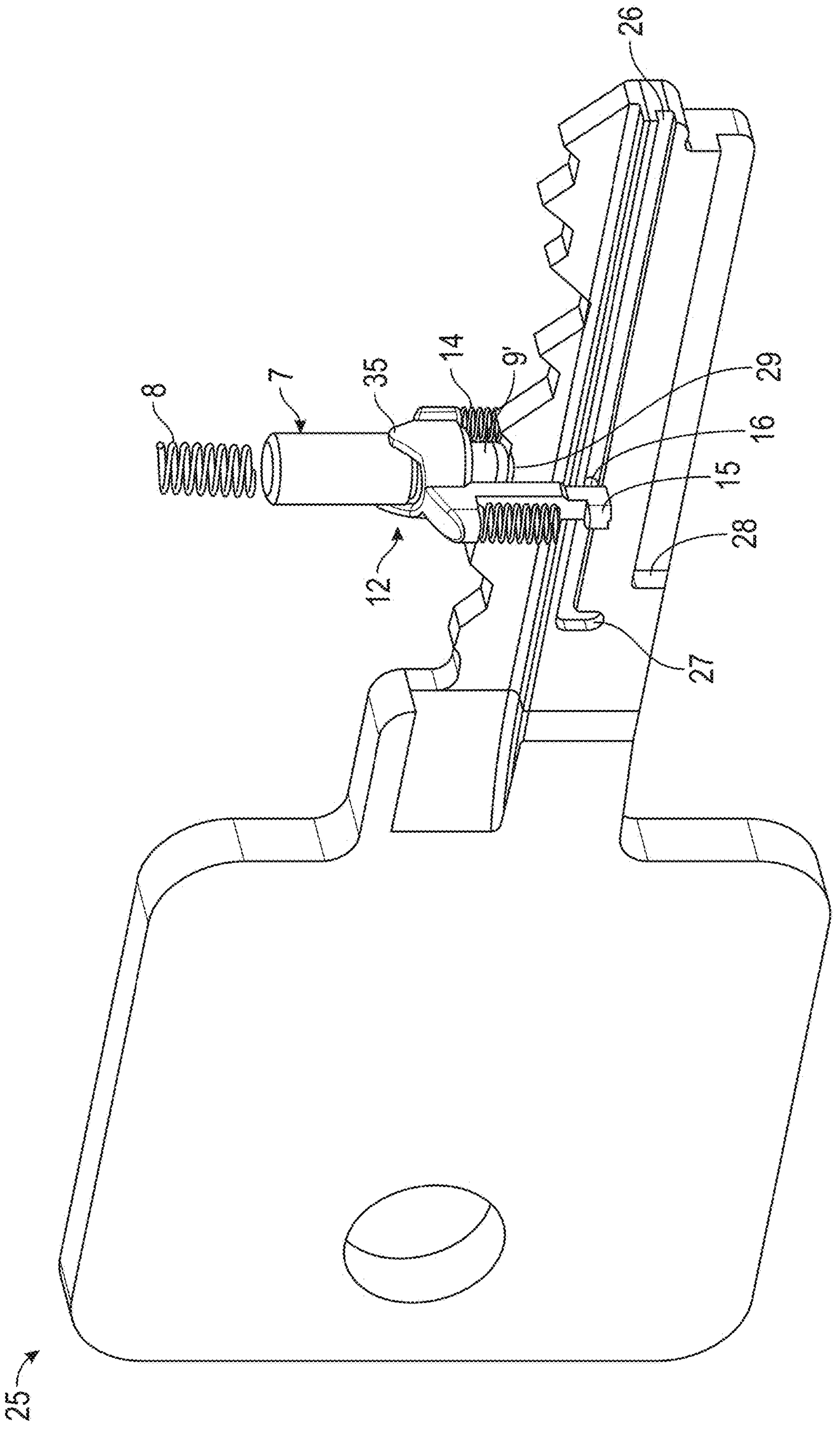
FIG. 16 is a perspective view of the key, the SE, and an associated primary pin assembly with a check pin of the SE engaged with a first control slot of the key.

SE Pin/Key Mating Description:

As shown in FIG. 14, the SE 12 may have an additional (or alternative) control feature (check pin 16) on the SE leg 15 that extends into the keyway 24 of the plug 5. The SE check pin 16 is positioned within the keyway 24 to align with the horizontal control slot 26 on the side of the key 25 (see FIG. 6). As shown in FIG. 16, the horizontal control slot 26 on the side of the key allows the key to be inserted without being blocked by the SE check pin 16. If a key without a horizontal control slot 26 were inserted into the keyway 24, or a key with an incorrectly-located horizontal control slot 26 were inserted into the keyway 24, the key will contact the SE check pin 16, thereby preventing the incorrect key from being inserted into the keyway 24.

Figure 17:
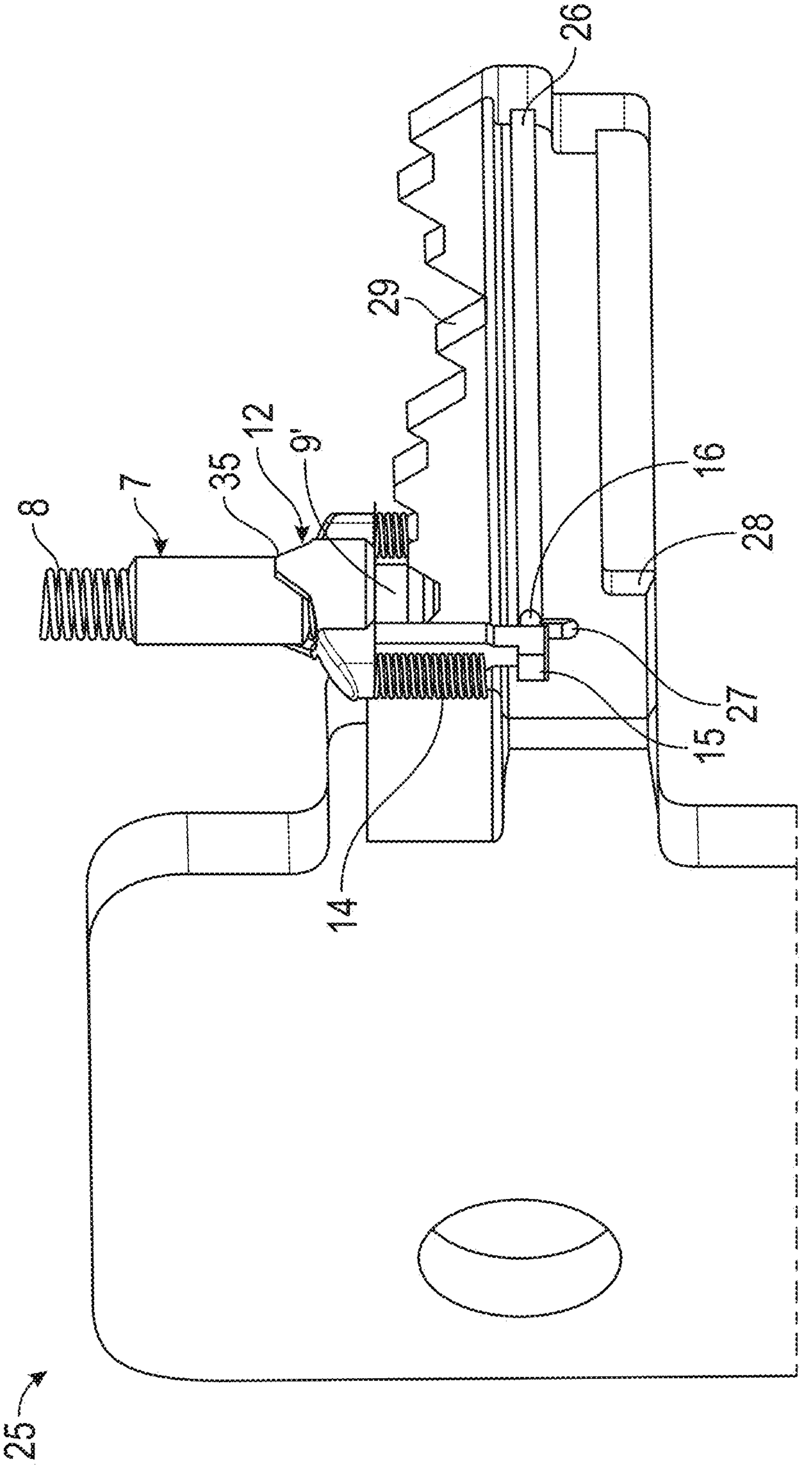
FIG. 17 is a perspective view of the key, the SE, and the associated primary pin assembly with the SE in a locked position and the check pin of the SE aligned with a check pin slot of the key.
Figure 18:
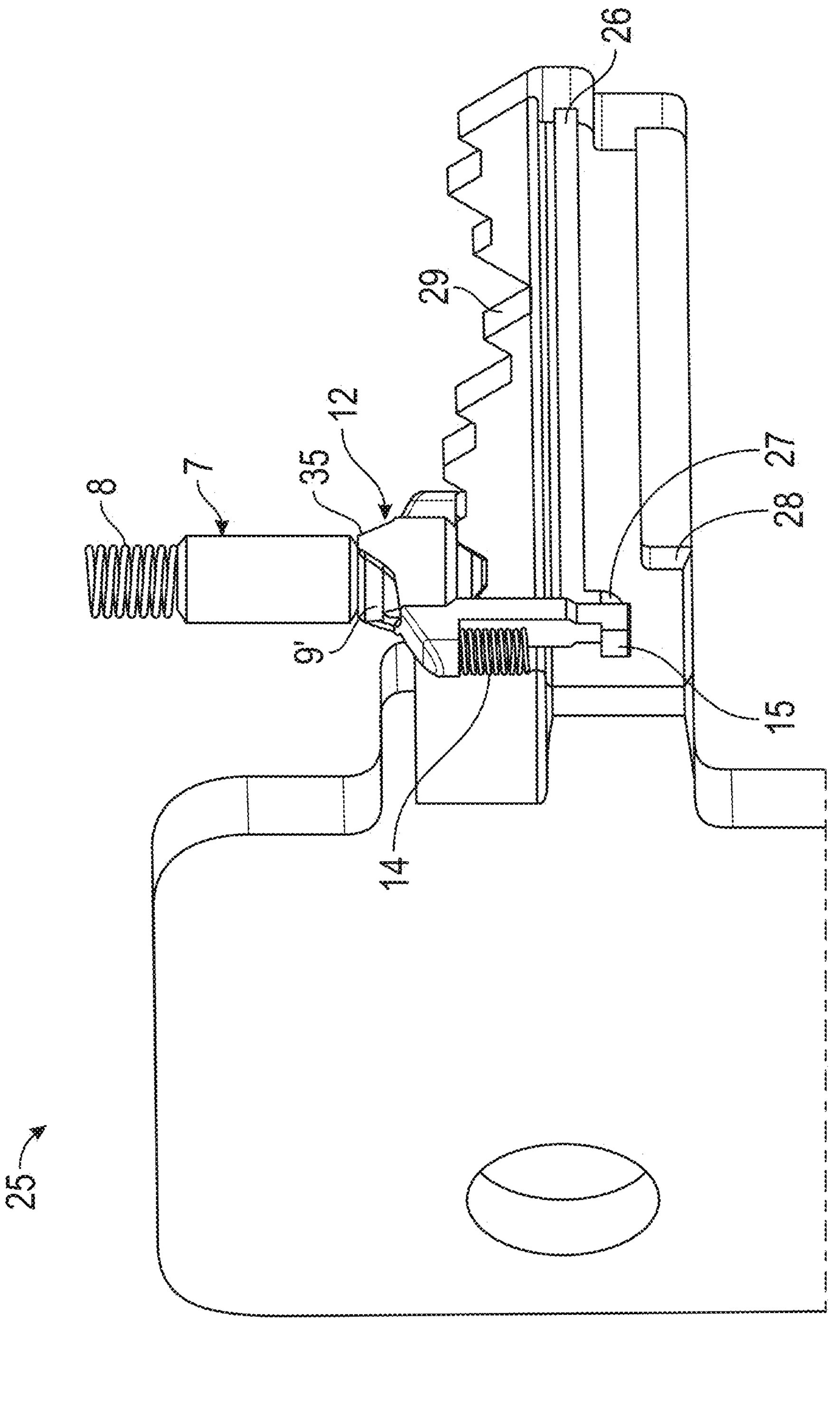
FIG. 18 is a perspective view of the key, the SE, and the associated primary pin assembly with the SE in an unlocked position and the check pin of the SE engaged with the check pin slot as a result of rotation of the plug of the cylinder lock.

After a key with a correctly located horizontal control slot 26 is inserted into keyway 24, when the SE 12 is moved downward within the plug 5 during rotation of the plug 5 (assuming the slider 18 is in the unlocked position with SE cutout 19 aligned with SE leg 15), the SE check pin 16 also moves downward with the SE within the plug. As shown in FIGS. 17 and 18 vertical check pin control slot 27 aligned with the SE position allows the SE check pin 16 to move downward, thereby allowing the SE 12 to move downward. Thus, the check pin 16 is directly engaged by the key 25 control slots 26, 27 to permit the SE 12 to move so that the projections 35 of the SE 12 can disengage from the groove 3.

If the vertical check pin control slot 27 is not present on the key or is in the wrong position along the length of the key—i.e., not aligned with the SE check pin 16 when the key is fully inserted—the SE check pin 16 contacts the sides of the horizontal control slot 26 and prevents the SE 12 from moving down to move the projection 35 of the SE 12 out of engagement with the groove 3, even if the slider 18 is in the unlocked position. In the illustrated example, the SE check pin 16 is positioned on the key 25 at a location corresponding to the first (forward-most) primary pin assembly. If the SE is provided at a different primary pin assembly, the SE check pin control slot would be moved to a location on the key corresponding to the primary pin assembly associated with the SE, and if multiple SEs were provided, the key would include multiple SE check pin control slots at locations corresponding to the primary pin assemblies associated with the SEs.

When the plug 5 is returned to the home rotational position and the spring-biased SE 12 reengages the groove 3 in the housing 1, the SE check pin 16 is moved back to align with the horizontal control slot 26 on the side of the key 25, thereby allowing the key to be withdrawn from the keyway 24.

Primary Pin Description:

The SE 12 also controls the positioning of the primary pin assembly associated with the SE 12, but allows the primary pin assembly to be positioned independently by the cuts on the top bitting surface 29 of the key 25.

Figure 20:
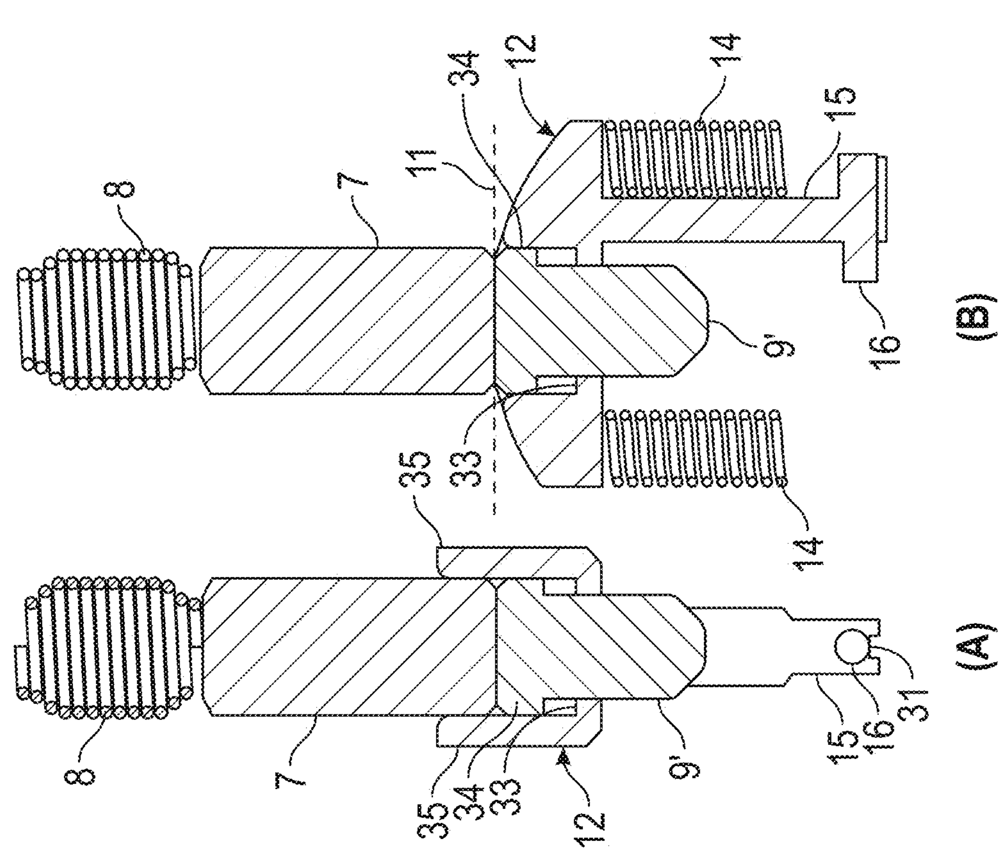
FIG. 20(A) is a transverse cross section of the SE and its associated primary pin assembly with the pin driver and a bottom pin of the associated primary pin assembly at the shear line of the cylinder lock.
FIG. 20(B) is an axial cross section of the SE and its associated primary pin assembly with the pin driver and the bottom pin of the associated primary pin assembly at the shear line of the cylinder lock.
Figure 21:
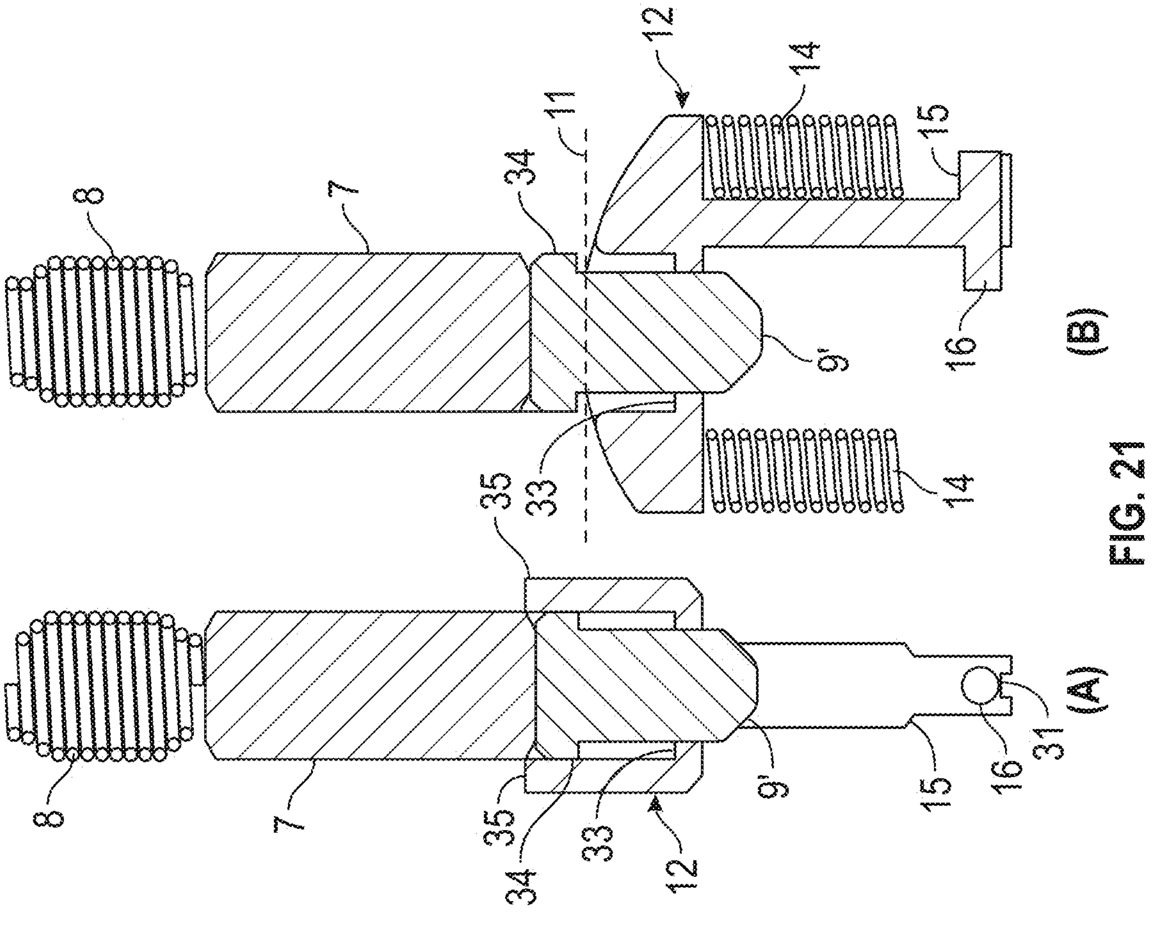
FIG. 21(A) is a transverse cross section of the SE and its associated primary pin assembly with the bottom pin of the associated primary pin assembly above the shear line of the cylinder lock.
FIG. 21(B) is an axial cross section of the SE and its associated primary pin assembly with the bottom pin of the associated primary pin assembly above the shear line of the cylinder lock.

FIG. 14 is an exploded view of the SE and an associated primary pin assembly viewed in an axial direction relative to the plug 5, and FIG. 15 is an exploded view of the SE and the associated primary pin assembly viewed in a transverse direction relative to the plug 5. The primary pin assembly associated with the SE may include a top driver 7 and a spring 8, as with the primary pin assemblies not associated with the SE, and a bottom pin 9' that differs from the bottom pins 9 of the primary pin assemblies not associated with the SE. As shown in FIGS. 14 and 15, the SE 12 includes a center cup structure with projections 35 extending from opposite sides thereof. The primary pin 9' is received within the center cup of the SE 12 and, unlike the bottom pins 9 of the primary pin assemblies not associated with the SE, includes a head 34 that is wider than a lower portion of the pin and is captured by a rim 33 within the SE (see FIGS. 19-21) to prevent the pin 9' from passing completely through the SE. See also FIGS. 11-13 showing the primary pin 9' received within the center cup of the SE 12. The head 34 may have a diameter corresponding to the diameter of the top driver 7, and a spring 8 is positioned above the top driver 7. The lower end of the primary bottom pin 9' extends through the center cup of the SE 12 and into the keyway 24. The primary pin assembly is movable independently “within” the SE away from the keyway and is biased downwardly (toward the keyway) by spring 8 contacting the top driver 7 so that the head 34 of primary pin 9' seats in the interior surface (rim 33) of the center cup of the SE 12. SE springs 14 are stronger than primary pin assembly spring 8. As a result, the stronger spring force of the SE 12 pushing up overcomes the weaker spring force pushing down on the top driver pin such that the primary pin's downward travel is controlled by the position of the SE, and the bottom pin 9' cannot go any lower than the SE 12 allows. With the bottom pin 9' seated on the SE rim surface, the driver pin 7 extends into the SE and past the shear line 11 between the housing 1 and the plug 5, which prevents rotation of the plug 5 within the bore 2 of the housing 1.

The primary pin assembly is free to move upward with respect to the SE 12 and is not obstructed by the SE. When a bitted key 25 is inserted, the position of the primary pins is controlled by the cuts on the top bitting surface 29 of the key independently of the SE.

An incorrectly-bitted key will not position the primary pin assembly so that the interface between the top driver 7 and the bottom primary pin 9 (or the bottom primary pin 9') is at the shear line 11 between the inner surface of the bore 2 of the housing 1 and the plug 5, and the plug 5 will not be able to rotate within the bore 2. FIGS. 19(A), 20(A), and 21(A) are transverse cross sections of the SE and its associated primary pin assembly at three different primary pin positions with respect to the shear line, and FIGS. 19(B), 20(B), and 21(B) are axial cross sections of the SE and its associated primary pin assembly at three different primary pin positions with respect to the shear line. As shown in FIGS. 19(A) and (B), if the cut on the bitting surface 29 of the key 25 is too deep at the location of the SE 12, the bottom pin 9' will be set too low, and the top driver pin 7 will drop down inside the SE 12 below the shear line 11. This will cause a locked condition. As shown in FIGS. 21(A) and (B), if the cut on the bitting surface 29 of the key 25 is too shallow at the location of the SE 12, the bottom pin 9' will be set too high and will extend above the shear line 11. This will also cause a locked condition. As shown in FIGS. 20(A) and (B), if the cut on the bitting surface 29 of the key 25 is at the proper depth at the location of the SE 12, the interface between the top driver pin 7 and the bottom pin 9' will align with the shear line 11 so that the primary pin assembly does not prevent rotation of the plug 5.

In the illustrated embodiment, a portion of the SE 12 (i.e., the bottom of the center cup) is required to be moved downward to a position lower than the top of the key top bitting surface 29 (i.e., lower the than the highest peak of the top surface bitting 29) to position the projection 35 of the SE 12 at the shear line between the plug 5 and the housing 1. The top SE clearance cut 30 on the top surface of the key (see FIG. 6) at the SE position allows the SE to be moved down far enough to position the projection 35 of the SE 12 at the shear line. In the illustrated example, the clearance cut 30 is positioned at the first (forward-most) primary pin assembly. If the SE is provided at a different primary pin assembly, the clearance cut 30 would be moved to a location corresponding to the primary pin assembly associated with the SE, and if multiple SEs were provided, the key may include multiple clearance cuts 30 at locations corresponding to the primary pin assemblies associated with the SEs.

Figure 22:
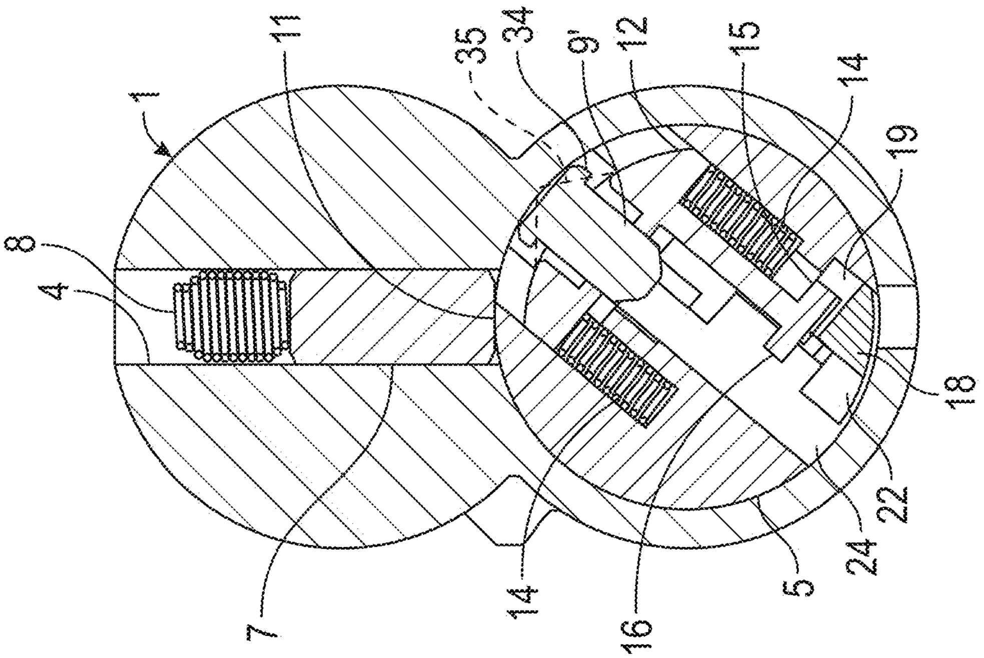
FIG. 22 is an axial cross section of the lock assembly with the plug rotated within the housing.

Thus, for a key 25 to operate the lock of the first embodiment, the horizontal key control slot 26 must be properly positioned to receive the SE check pin 16 to permit the key 25 to be inserted into the keyway 24. When the key 25 is fully inserted into the keyway, the top bitting surface 29 of the key 25 must be configured to properly position each primary pin assembly so that the interface between the top driver and the bottom primary pin of each primary pin assembly is at the shear line 11 between the bore 2 of the housing 1 and the plug 5. In addition, the key side bitting 28 must be properly configured to move the slider 18 so that the SE cutout 19 of the slider is aligned with the SE leg 15 of the SE 12, and the vertical check pin control slot 27 must be properly positioned to receive the check pin 16 of the SE 12. The plug 5 can then be rotated by applying torque to the plug with the key 25. The angled sides of the groove 3 will, by a camming interaction with the angled surfaces 17 of the projections 35, push the projection 35 of the SE 12 out of the groove 3 and below the shear line 11, thereby allowing the plug 5 to rotate. (See FIG. 22, which is an axial cross section of the lock assembly with the plug rotated within the housing and the projection 35 of the SE 12 shown in hidden lines).

In a variation of the first embodiment that includes the slider 18 but does not include the SE check pin 16, it is not necessary that the key have a horizontal control slot or a vertical control slot, and the key will operate the lock if the top bitting surface 29 of the key 25 is configured to properly position each primary pin assembly so that the interface between the top driver and the bottom primary pin is at the shear line 11 between the bore 2 of the housing 1 and the plug 5 and the key side bitting 28 is properly configured to move the slider 18 so that the SE cutout 19 of the slider is aligned with the SE leg 15 of the SE 12. The plug 5 can then be rotated by applying torque to the plug with the key 25. The angled sides of the groove 3 will, by a camming interaction, push the projection 35 of the SE 12 out of the groove 3, thereby allowing the plug 5 to rotate.

In a variation of the first embodiment that includes the SE check pin 16 but does not include the slider 18, it is not necessary that the key have key side bitting 28, and the key will operate the lock if the top bitting surface 29 of the key 25 is configured to properly position each primary pin assembly so that the interface between the top driver and the bottom primary pin is at the shear line 11 between the bore 2 of the housing 1 and the plug 5, the horizontal control slot 26 is positioned to receive the check pin 16 and permit the key to be inserted, and the check pin control slot 27 is positioned at the SE to receive the check pin 16 and permit the SE to move down into the plug. The plug 5 can then be rotated by applying torque to the plug with the key 25. The angled sides of the groove 3 will, by a camming interaction, push the projection 35 of the SE 12 out of the groove 3, thereby allowing the plug 5 to rotate.

Secondary Locking Element—Second Embodiment

An alternate embodiment of a secondary locking element ("SE") integrated into a cylinder lock having a plug rotatably disposed within a housing is shown in FIGS. 23-42. Referring to FIGS. 23-27, the cylinder lock includes a plug 105 rotatably disposed within a bore 102 of a housing 101. Primary pin assemblies are positioned within pin holes 106 formed in the plug 105 and aligned pin holes 104 formed in an upper part of the housing 101 above the bore 102. The pin holes 106 are aligned with a keyway 124 formed in the plug 105. Keyway 124 receives a key 125.

Figure 31:
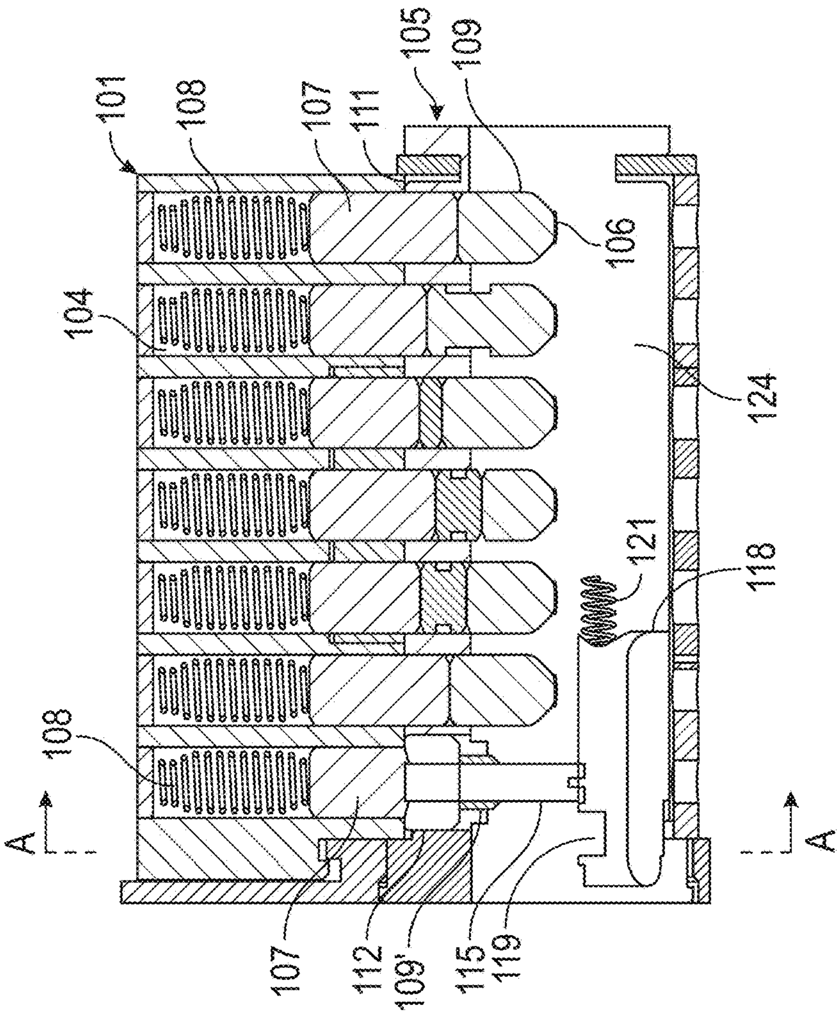
FIG. 31 is a transverse cross-section at line BB of FIGS. 23 and 30 in which the key is omitted.
Figure 30:
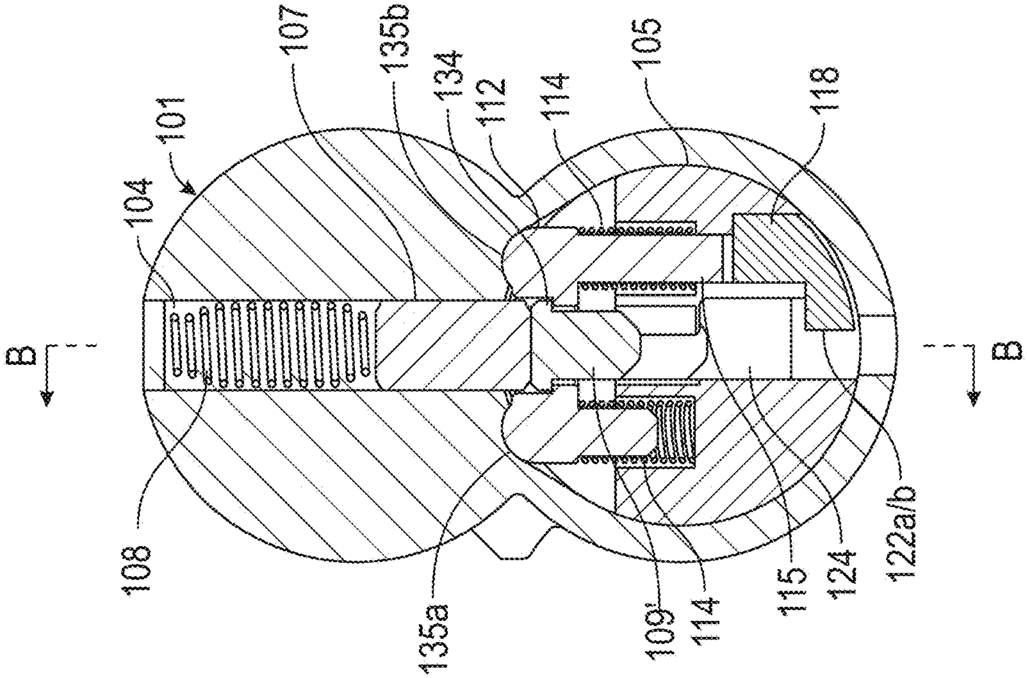
FIG. 30 is a radial cross-section at line A-A of FIGS. 23 and 31 in which the key is omitted.

FIG. 30 is a radial cross-section at line A-A (FIGS. 23, 31) in which the key is omitted. FIG. 31 is a transverse cross-section at line BB (FIGS. 23, 30) in which the key is omitted. As shown in FIGS. 30 and 31 each primary pin assembly may comprise a conventional assembly configuration that includes a top driver 107 and a bottom pin 109 to block rotation of the plug 105 within a housing 101. Top driver 107 and a bottom pin 109 may be the same as top driver 7 and a bottom pin 9, respectively, described above. In some examples, top driver 107 may comprise a stack of two or more driver wafers to enable master keying. Each primary pin assembly also includes a spring 108 positioned above the top driver 107 within pin hole 104 within the housing 101 which urges the associated pin assembly downwards so that the associated top driver 107 extends from the housing 101 into pin hole 106 within the plug 105 past a shear line 111 between the plug and housing, thereby blocking the plug from rotating within the housing. The lower ends of the bottom pins 109 of the downwardly biased pin assemblies seat within stops at the bottoms of the pin holes 106 in the plug 105 (see FIG. 31) and extend into the keyway 124 so that a top bitting surface of a key 125 inserted into the keyway engages the lower ends of the bottom pins 109 and elevates each pin assembly so that the interface between the top of the bottom pin 109 and the bottom of the top driver 107 is positioned at the shear line to permit the plug 105 to rotate within the housing 101.

Figure 23:
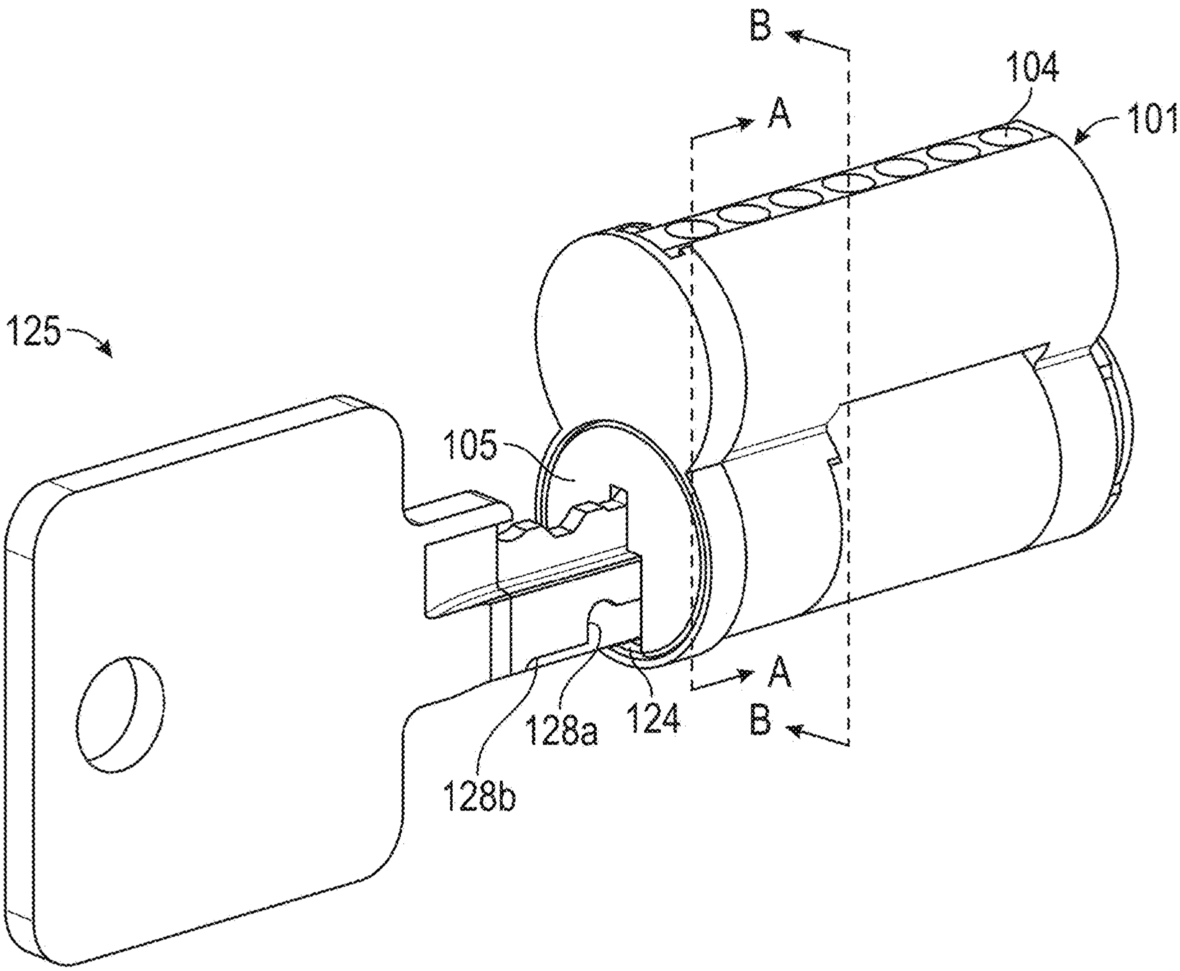
FIG. 23 is a perspective view of a second embodiment of a cylinder lock as described herein with a key partially inserted into the keyway thereof.
Figure 25:
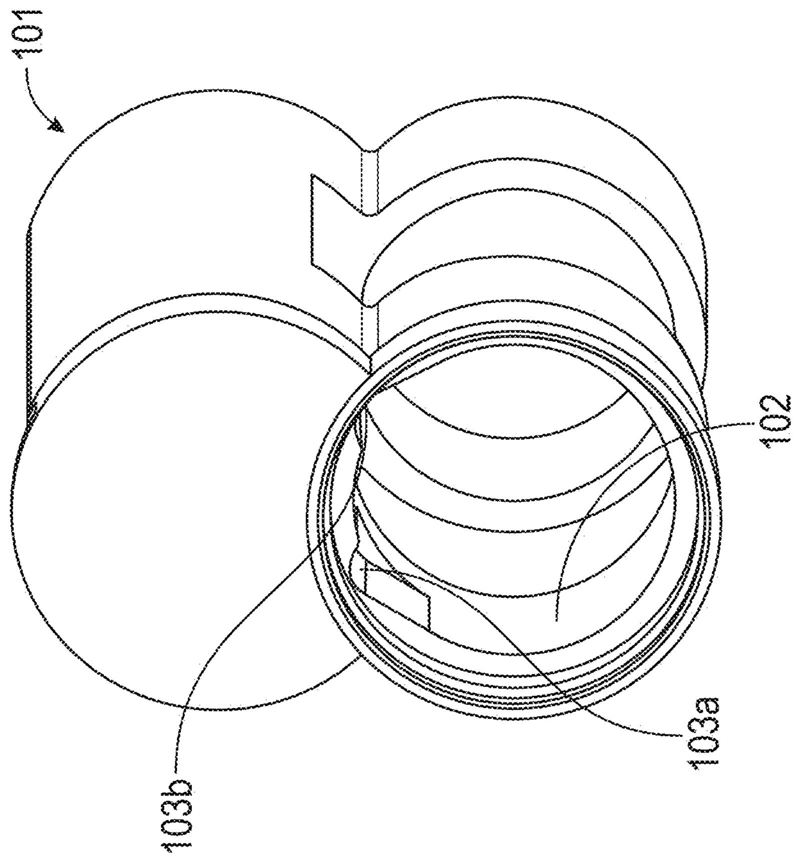
FIG. 25 is a front perspective view of the housing of FIG. 24.
Figure 24:
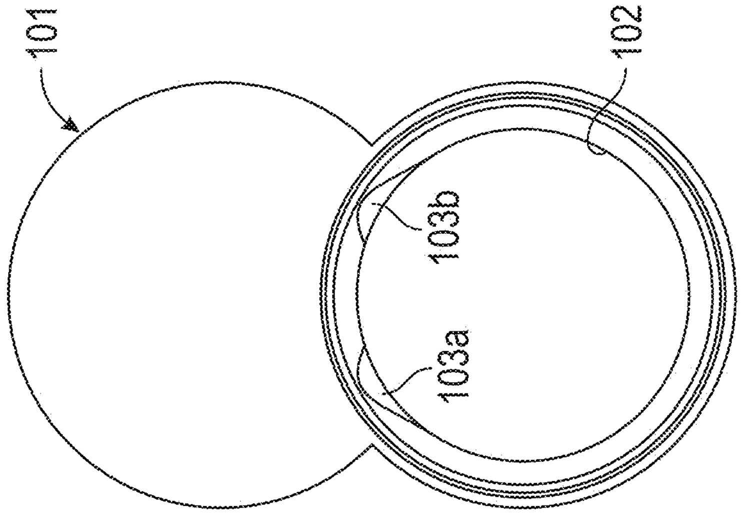
FIG. 24 is a front end view of a housing of the cylinder lock of FIG. 23.
Figure 28:
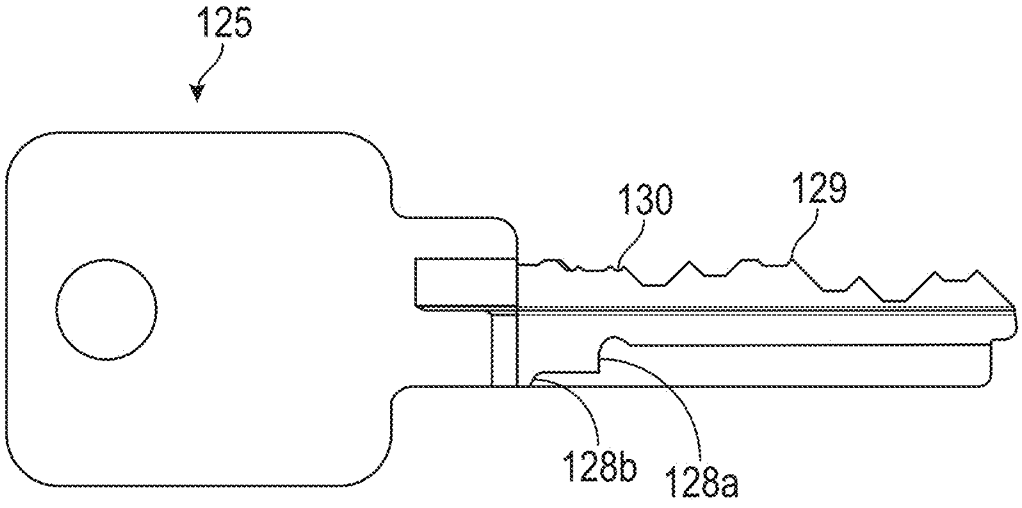
FIG. 28 is a side view of an embodiment of a key operable in a cylinder lock described herein.
Figure 29:
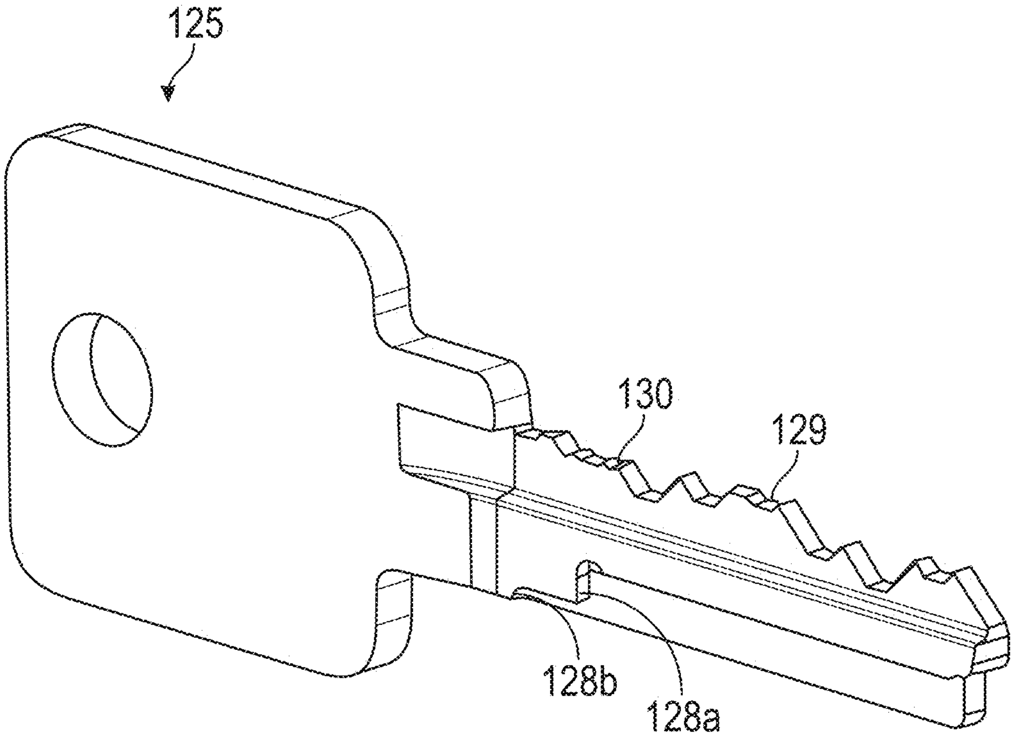
FIG. 29 is a perspective view of the key shown in FIG. 28.

Referring to FIGS. 23, 28, and 29, the key 125 for inserting into the keyway 124 of the plug 105 and operating the lock with the SE includes an upper bitting surface 129, a clearance cut 130 that is lower than the highest peak of upper bitting surface 129, and key side bittings 128*a*, 128*b* for operating a slider within the plug. Although not shown in FIGS. 23, 28, and 29, key 125 may include, a first (horizontal) control slot 26, and a second control slot 27 for receiving a check pin of the SE, as included in key 25 shown in FIGS. 6 and 7. Operation of the key 125 and the SE will be described below.

Figure 26:
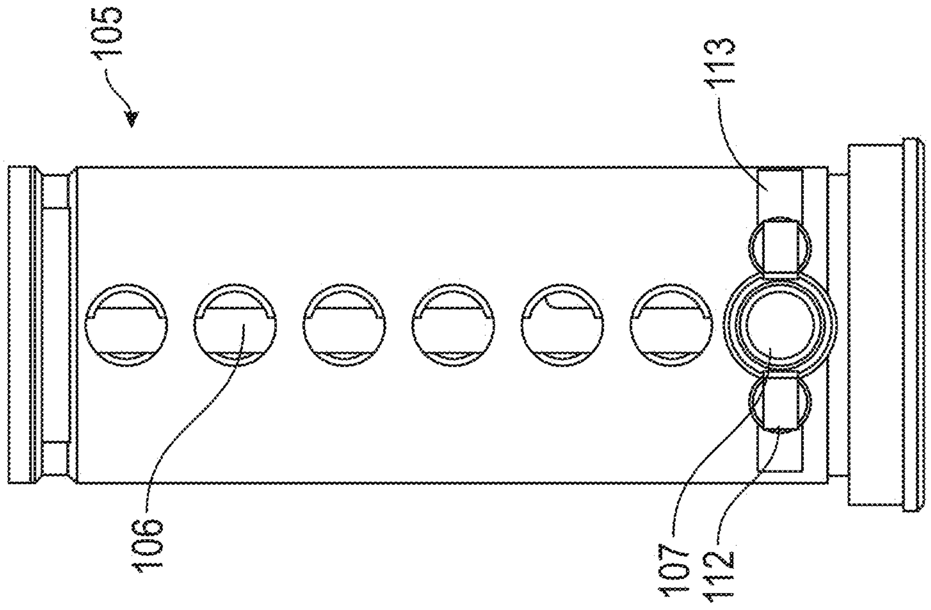
FIG. 26 is a top view of a plug of the cylinder lock of FIG. 23.
Figure 36:
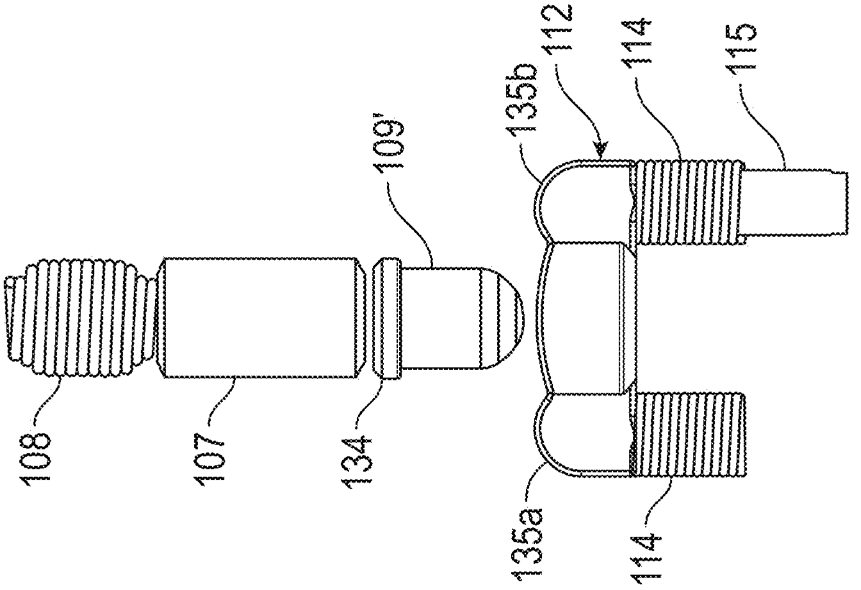
FIG. 36 is an exploded view of the SE of FIG. 33 and an associated primary pin assembly viewed in an axial direction.
Figure 38:
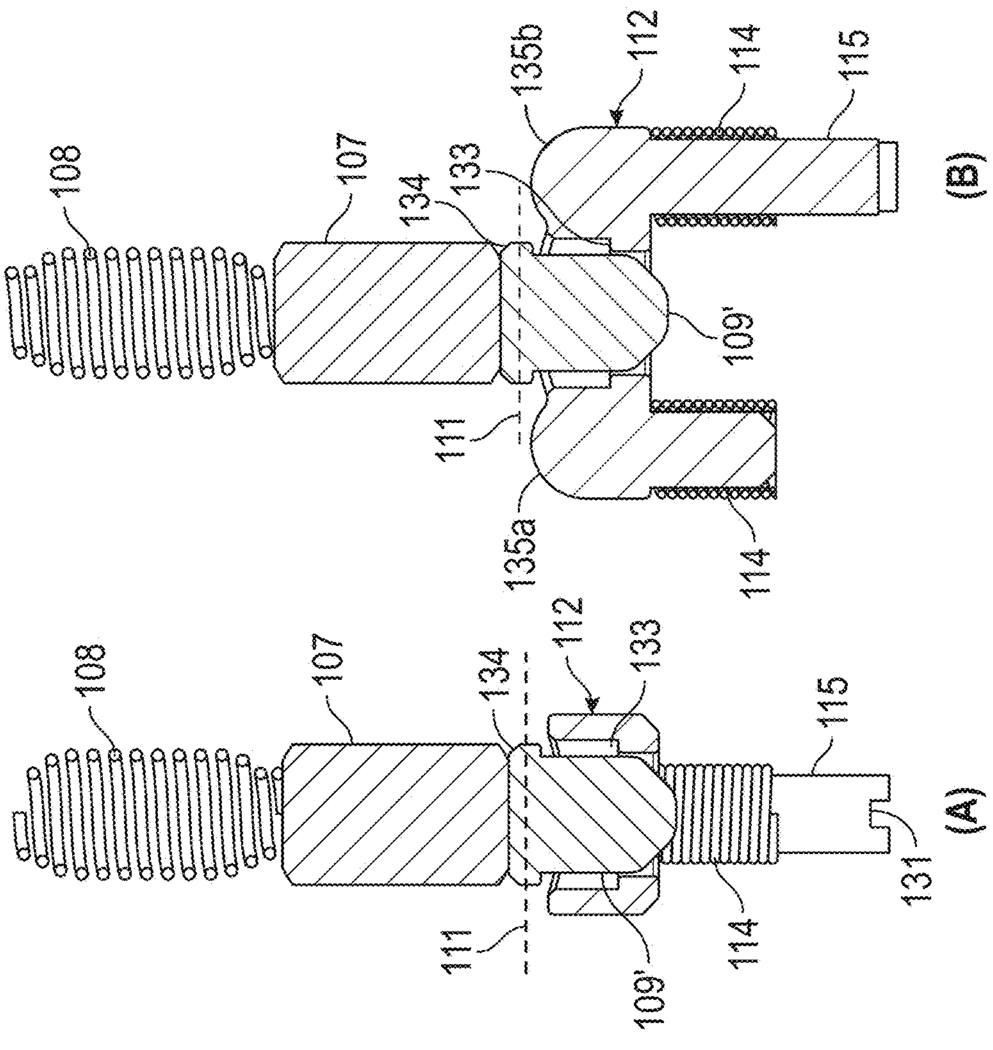
FIG. 38(A) is a transverse cross section of the SE of FIG. 33 and its associated primary pin assembly with the bottom pin of the associated primary pin assembly above the shear line of the cylinder lock.
FIG. 38(B) is an axial cross section of the SE of FIG. 33 and its associated primary pin assembly with the bottom pin of the associated primary pin assembly above the shear line of the cylinder lock.
Figure 39:
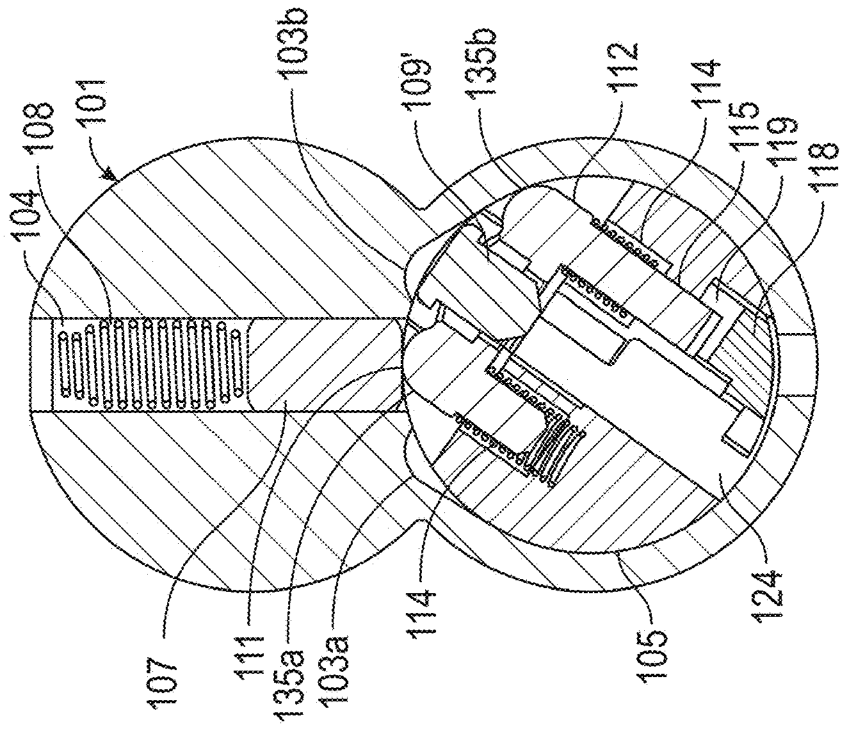
FIG. 39 is an axial cross section of the lock assembly with the SE of FIG. 33 with the plug rotated within the housing.

In one example, as shown in FIGS. 26, 30, and 31, an SE 112 is housed in a secondary element pocket (or SE pocket) 113 inside the plug 105 and is biased outwardly by springs 114 to engage one or more locking feature(s), such as recess(es) 103*a*, 103*b* formed in an inner surface of the bore 102 (see FIGS. 24 and 25) in the housing 101, at the primary shear line 111 between the plug 105 and the housing 101. The SE springs are omitted and the SE 112 is not sectioned in FIG. 31. SE 112 may include one or more locking feature(s), such as projections 135*a*, 135*b*, that are complementary to the one or more locking feature(s), such as recesses 103*a*, 103*b*, formed in an inner surface of the bore 102. Projections 135*a*, 135*b* may be angled as shown in hidden lines in FIG. 8 (see projection 35) or rounded, as shown in FIGS. 30 and 36, or any other shape that is complementary to recesses 103*a*, 103*b*. When projections 135*a*, 135*b* of the SE 112 engage the recesses 103*a*, 103*b*, the SE 112 prevents rotation of the plug 105 relative to the bore 102. The example illustrated in FIGS. 30 and 31 includes a single SE 112 positioned at and coaxially arranged with respect to the first (i.e., forward-most) primary pin assembly of the lock. Other examples are contemplated in which the SE is associated with a different primary pin assembly or an SE is associated with two or more pin assemblies.

In the embodiment shown in FIGS. 30, 33, 36, 38(B), 39-42, projections 135*a*, 135*b* of the SE 112 have rounded surfaces (see FIG. 36) that are complementary to rounded recesses 103*a*, 103*b* (see FIGS. 24, 25, 30), such that a torque applied to the plug 105 by the key 125 will urge the SE 112 down and away from the recesses 103*a*, 103*b* (e.g., as with a cam) if the SE 112 is not blocked from vertical movement. In general, projection(s) 135*a*, 135*b* may be any shape that is complementary with recess(s) 103*a*, 103*b* to urge the SE 112 to move down and away from the bore 102 to disengage the locking feature(s) of the SE from the associated locking feature(s) of the housing (e.g., as with a cam) if the SE 112 is not blocked from vertical movement.

Figure 27:
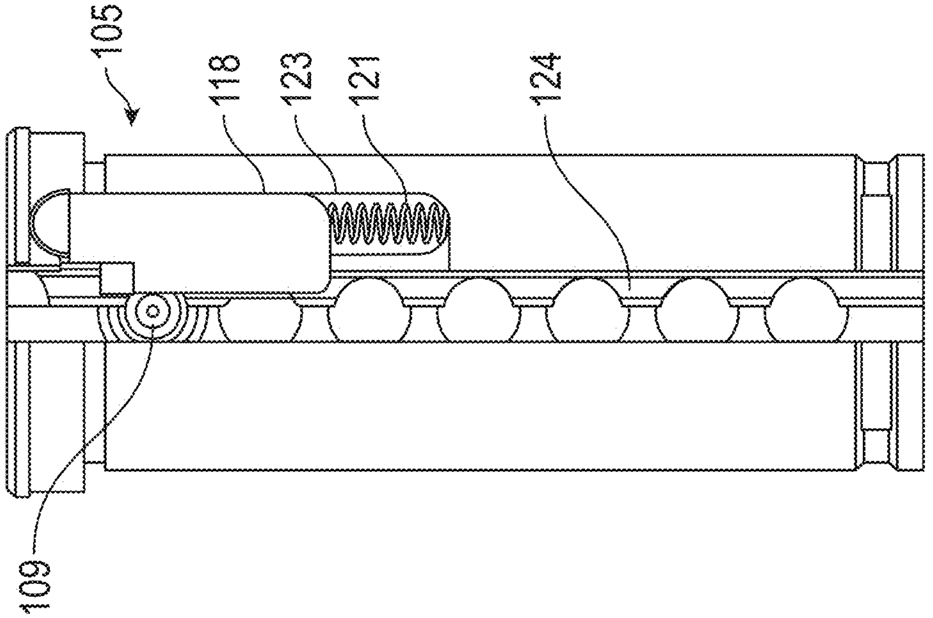
FIG. 27 is a bottom view of the plug of FIG. 26.

As shown in FIGS. 27, 30, and 31, a spring-biased slider 118 located in a slider pocket 123 in the bottom of the plug 105 is arranged for travel within the pocket 123 in a direction parallel to the length of the keyway 124 in the plug 105. The slider 118 is spring-biased by slider spring 121 towards the front of the cylinder plug 105. The slider 118 and slider spring 121 are not sectioned in FIG. 31. The forward travel of the slider may be limited by a machined feature in the plug.

Figure 32:
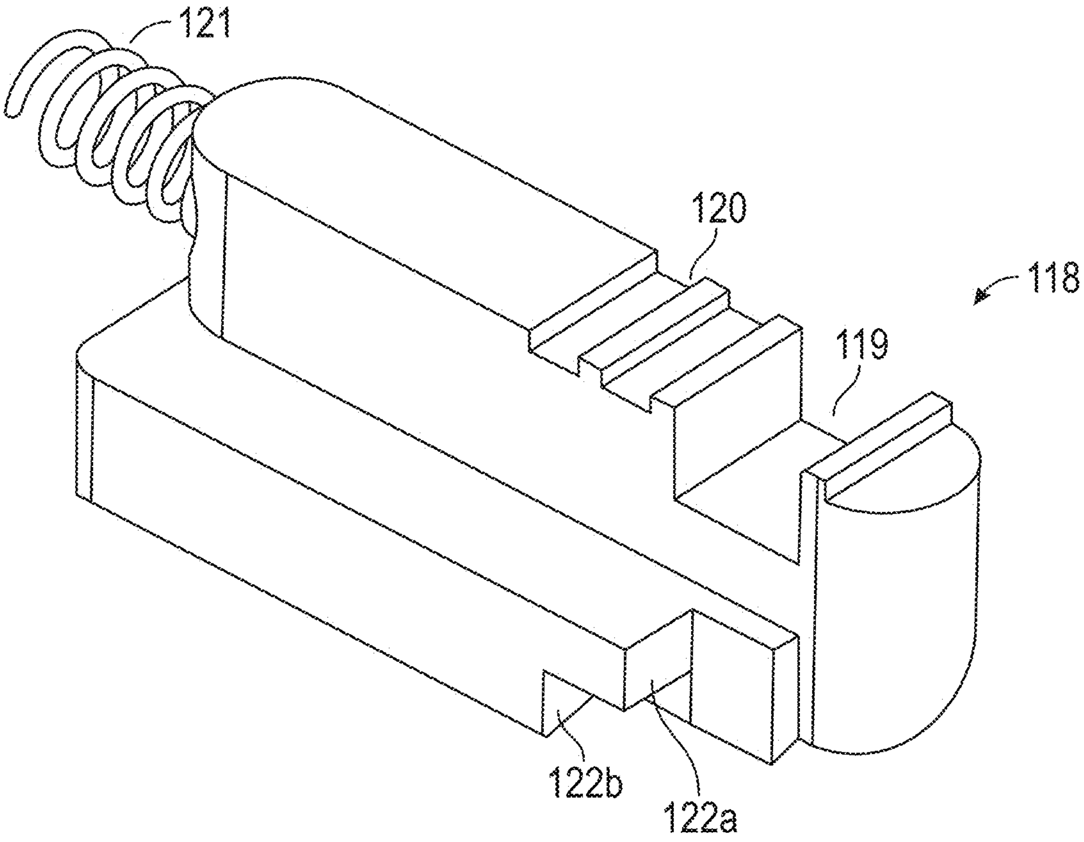
FIG. 32 is a perspective view of a slider of an embodiment of a cylinder lock describe herein.

Referring to FIG. 32, slider 118 has a feature (drive tabs 122*a*, 122*b*) that extend into the keyway 124 of the plug 105 to be engaged by the key side bitting 128*a*, 128*b*. Depending on key coding, slider drive tab 122*a* is engaged by the key side bitting 128*a* or slider drive tab 122*b* is engaged by the key side bitting 128*b*, when the key 125 is inserted into the keyway 124 so that further insertion of the key 125 pushes the slider 118 backwards against the force of spring 121 along a portion of the length of the keyway in the plug. In the illustrated embodiment, as shown in FIGS. 28 and 29, the key side bittings 128*a*, 128*b* comprise two ends of a relief extending along a portion of the length of the blade of the key 125, and the slider drive tabs 122*a*, 122*b* extend into the relief and one of the slider drive tabs is contacted by the associated key side bittings 128*a*, 128*b* as the key is inserted into the keyway 124, thus moving the slider 118. Having two drive tabs 122*a*, 122*b* (or more) on the slider 118 actuated by two key side bittings 128*a*, 128*b* (or more) on the key 125, as opposed to a single drive tab 22 on slider 18 actuated by a single key side bitting 28 as described above, allows for more coding options for the lock assembly and also facilitates implementation of a master key for opening multiple locks. In an alternative embodiment, slider 118 may have a single drive tab engaged by a single side bitting of the key 125, e.g., as shown in FIGS. 6, 7, 10.

Figure 33:
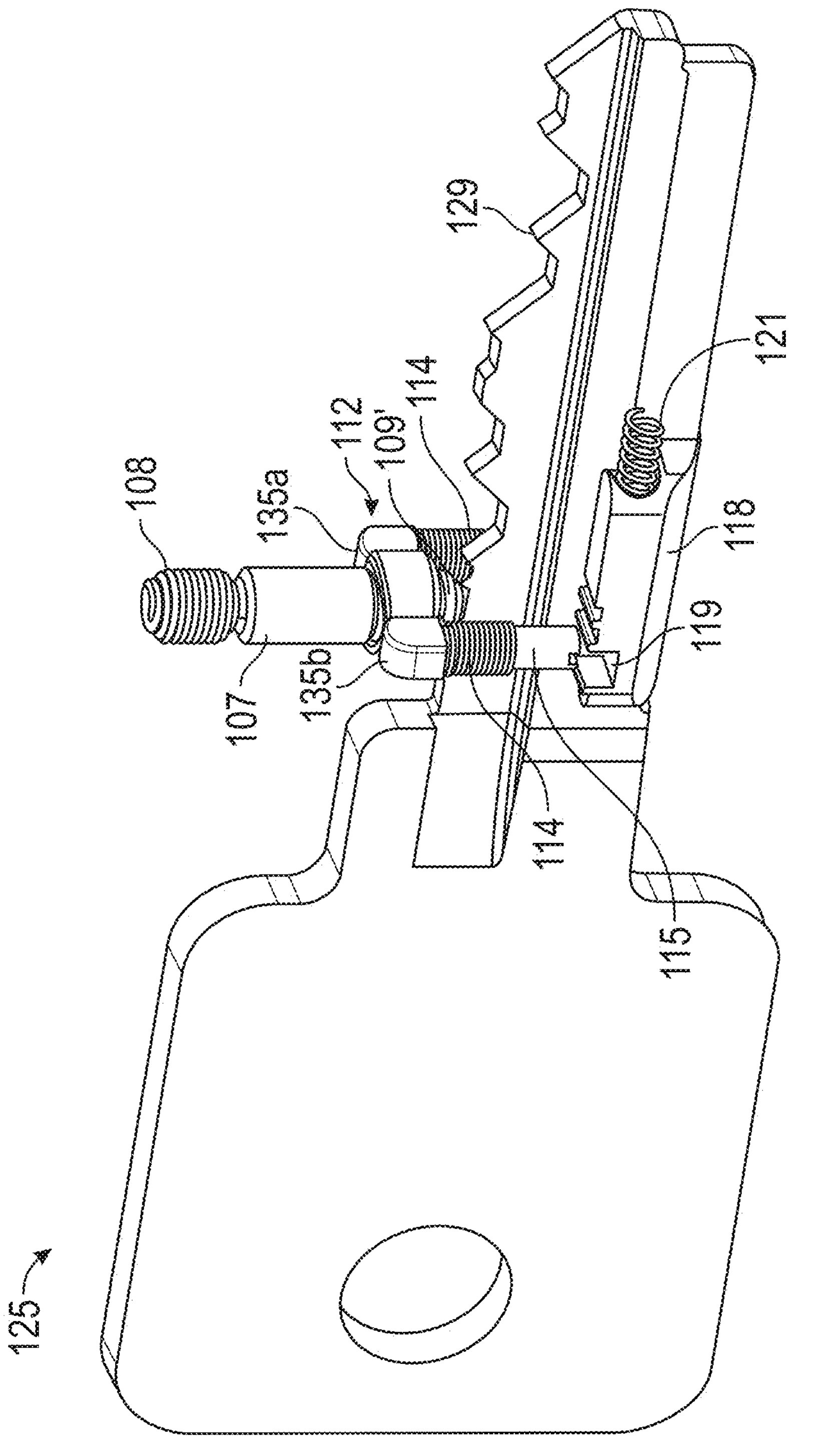
FIG. 33 is a perspective view of a key, a slider, the second embodiment of the secondary element ("SE"), and a primary pin assembly associated with the SE with the bottom pin of primary pin assembly at the shear line and the SE in a locked position unengaged with the slider prior to rotation of the plug of the cylinder lock.
Figure 34:
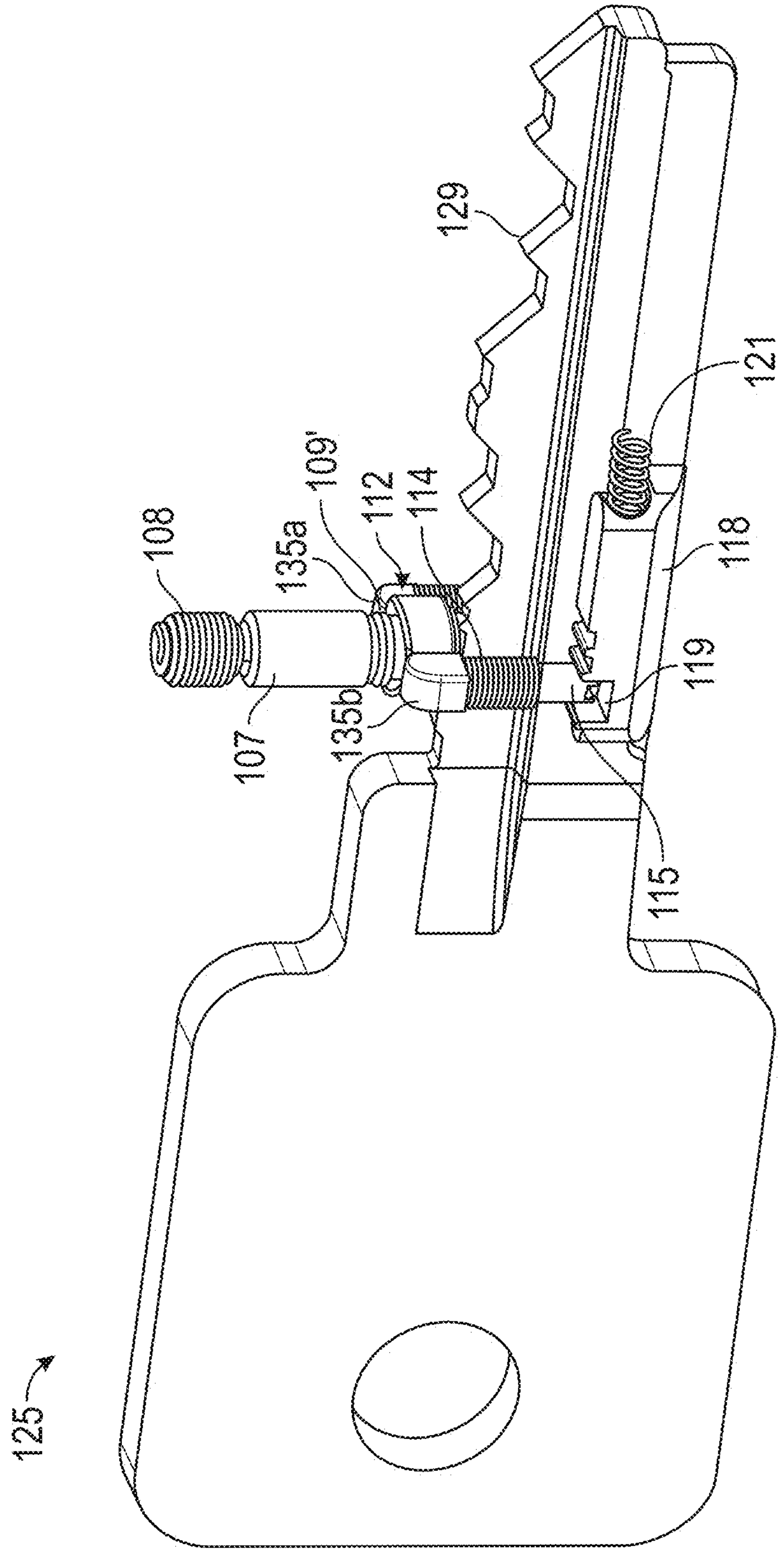
FIG. 34 is a perspective view of the key, the slider, the SE of FIG. 33, and the associated primary pin assembly with the bottom pin of the primary pin assembly at the shear line and the SE in an unlocked position engaged with a cutout in the slider as a result of rotation of the plug of the cylinder lock.
Figure 35:
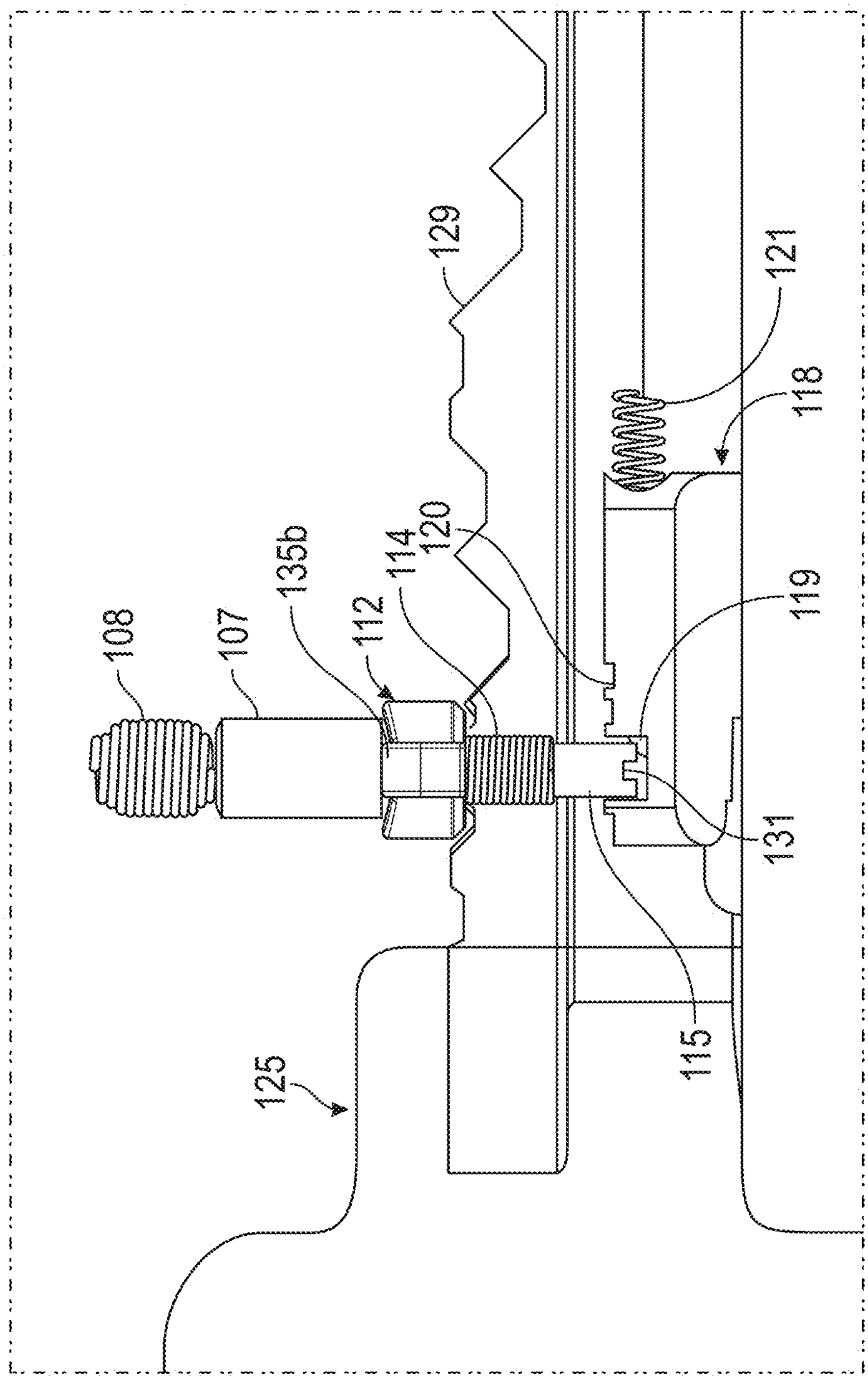
FIG. 35 is a partial side view of the key, the slider, the SE of FIG. 33, and the associated primary pin assembly with the SE in the unlocked position engaged with the cutout in the slider as a result of rotation of the plug of the cylinder lock.
Figure 37:
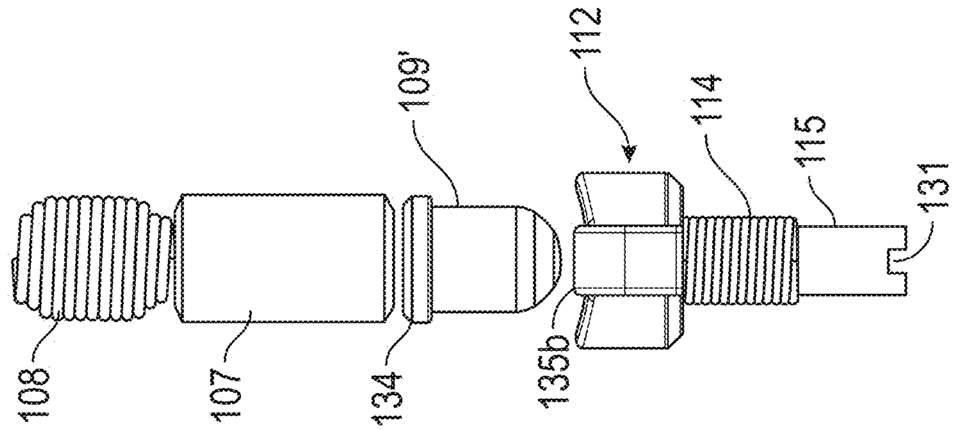
FIG. 37 is an exploded view of the SE of FIG. 33 and the associated primary pin assembly viewed in a transverse direction.

The projections 135*a*, 135*b* of the SE 112 remain engaged with the recesses 103*a*, 103*b*, and away from the slider 118, as the key is inserted due to the upward spring force applied to the SE by SE springs 114. As shown in FIGS. 36 and 37, SE 112 has a control feature (leg 115) that extends downward within the plug. One of the SE springs 114 surrounds leg 115. Referring to FIGS. 32 and 33, slider 118 has an SE cutout 119 located on the top surface of the slider that is positioned directly in line with the SE leg 115 when the slider is moved to the proper unlocked position by the key side bittings 128*a*, 128*b* on the key 125. As shown in FIG. 34, SE leg 115 will engage the SE cutout 119 of the slider 118 when the SE 112 is moved downward and away from the housing 101 as a result of rotation of the plug and the interaction of the projections 135*a*, 135*b* of the SE 112 with the complimentary sides of the recesses 103*a*, 103*b*. As shown in FIGS. 34 and 35, the SE cutout 119 provides clearance for a lower end of the SE leg 115 to permit the SE 112 to move down into the plug when the projections of SE are moved to the primary shear line outside of the housing 101 as the cylinder plug 105 is rotated. If the slider 118 is not moved far enough, or is moved too far (i.e., is not in an unlocked position), so that the cutout 119 is not aligned with the SE leg 115 (e.g., before the key 25 is inserted or because the key has one or more improperly positioned key side bittings 128*a*, 128*b*), the SE leg 115 contacts the top of the slider 118, and the SE 112 is blocked from moving down and out of engagement with the recesses 103*a*, 103*b*, thereby preventing rotation of the plug within the housing 101. Thus, the SE leg 115 is indirectly engaged by the key 125 via the slider 118 to permit the SE 112 to move so that the projections 135*a*, 135*b* of the SE 112 can disengage from the recesses 103*a*, 103*b* when the cutout 119 is aligned with the leg 115.

In the illustrated embodiment, a portion of the SE 112 (i.e., the bottom of the center cup) is required to be moved downward to a position lower than the top of the key top bitting surface 129 (i.e., lower the than the highest peak of the top surface bitting 129) to position the projection 135*a*, 135*b* of the SE 112 at the shear line 111 between the plug 105 and the housing 101. The top SE clearance cut 130 on the top surface of the key 125 (see FIGS. 28, 29) at the SE position allows the SE to be moved down far enough to position the projection 135*a*, 135*b* of the SE 112 at the shear line 111. In the illustrated example, the clearance cut 130 is positioned at the first (forward-most) primary pin assembly. If the SE 112 is provided at a different primary pin assembly, the clearance cut 130 would be moved to a location corresponding to the primary pin assembly associated with the SE, and if multiple SEs were provided, the key may include multiple clearance cuts 130 at locations corresponding to the primary pin assemblies associated with the SEs 112.

The top surface of the slider 118 may contain shallow cutouts (false cutouts 120) that are not deep enough to provide relief for the SE leg 115 and allow the SE 112 its full travel to achieve the primary shear line. When the SE leg 115 engages false cutouts 120 as torque is applied to the plug 105, the leg 115 prevents further movement of the slider 118, thereby providing pick resistance. These are sometimes referred to as “false slots” or “pick grooves.” SE leg 115 may include a slot 131 formed in a bottom end thereof—see FIGS. 37, 38(A)—to capture ridges between consecutive cutouts 120.

Variations in the positioning of the drive tabs 122*a*, 122*b* on the slider 118 and the position of the corresponding key side bitting 128*a*, 128*b* relative to the tip of the key allows for variations in key coding.

When the plug is returned to the home rotational position, the projections 135*a*, 135*b* of the SE 112 extend by force of springs 114 back into engagement with the recesses 103*a*, 103*b* in the housing 101, and SE leg 115 moves out of cutout 119 of the slider 118. As the key 125 is withdrawn from the keyway 124, the slider spring 121 moves the slider 118 back towards the front of the plug 105 to its normal locked position. The lock is now returned to the locked position.

SE Pin/Key Mating Description:

SE 112 may have an additional (or alternative) control feature(s) such as a check pin (see check pin 16 shown in FIGS. 14, 16-21) on the SE leg 115 that extends into the keyway 124 of the plug 105. The SE check pin is positioned within the keyway 124 to align with a horizontal control (such as slot 26 on the side of the key 25 in FIG. 6). As shown in FIG. 16 and previously described, the horizontal control slot 26 on the side of the key allows the key to be inserted without being blocked by the SE check pin 16. If a key without a horizontal control slot 26 were inserted into the keyway 124, or a key with an incorrectly-located horizontal control slot 26 were inserted into the keyway 124, the key will contact the SE check pin 16, thereby preventing the incorrect key from being inserted into the keyway 124.

Primary Pin Description:

The SE 112 also controls the positioning of the primary pin assembly associated with the SE 112, but allows the primary pin assembly to be positioned independently by the cuts on the top bitting surface 129 of the key 125.

FIG. 36 is an exploded view of the SE and an associated primary pin assembly viewed in an axial direction relative to the plug 105, and FIG. 37 is an exploded view of the SE and the associated primary pin assembly viewed in a transverse direction relative to the plug 105. The primary pin assembly associated with the SE may include a top driver 107 and a spring 108, as with the primary pin assemblies not associated with the SE, and a bottom pin 109' that differs from the bottom pins 109 of the primary pin assemblies not associated with the SE. As shown in FIGS. 36 and 37, the SE 112 includes a center cup structure with projections 135*a*, 135*b* located on opposite lateral sides thereof. The primary pin 109' is received within the center cup of the SE 112 and, unlike the bottom pins 109 of the primary pin assemblies not associated with the SE, includes a head 134 that is wider than a lower portion of the pin and is captured by a rim 133 within the SE (see FIG. 38) to prevent the pin 109' from passing completely through the SE. See also FIGS. 33-35 showing the primary pin 109' received within the center cup of the SE 112. The head 134 may have a diameter corresponding to the diameter of the top driver 107, and a spring 108 is positioned above the top driver 107. The lower end of the primary bottom pin 109' extends through the center cup of the SE 112 and into the keyway 124. The primary pin assembly is movable independently “within” the SE away from the keyway and is biased downwardly (toward the keyway) by spring 108 contacting the top driver 107 so that the head 134 of primary pin 109' seats in the interior surface (rim 133) of the center cup of the SE 112. SE springs 114 are stronger than primary pin assembly spring 108. As a result, the stronger spring force on the SE 112 pushing up overcomes the weaker spring force pushing down on the top driver pin such that the primary pin's downward travel is controlled by the position of the SE, and the bottom pin 109' cannot go any lower than the SE 112 allows. With the bottom pin 109' seated on the SE rim surface, the driver pin 107 extends into the SE and past the shear line 111 between the housing 101 and the plug 105, which prevents rotation of the plug 105 within the bore 102 of the housing 101.

The primary pin assembly is free to move upward with respect to the SE 112 and is not obstructed by the SE. When a bitted key 125 is inserted, the position of the primary pins is controlled by the cuts on the top bitting surface 129 of the key independently of the SE.

Figures 40, 41, 42:
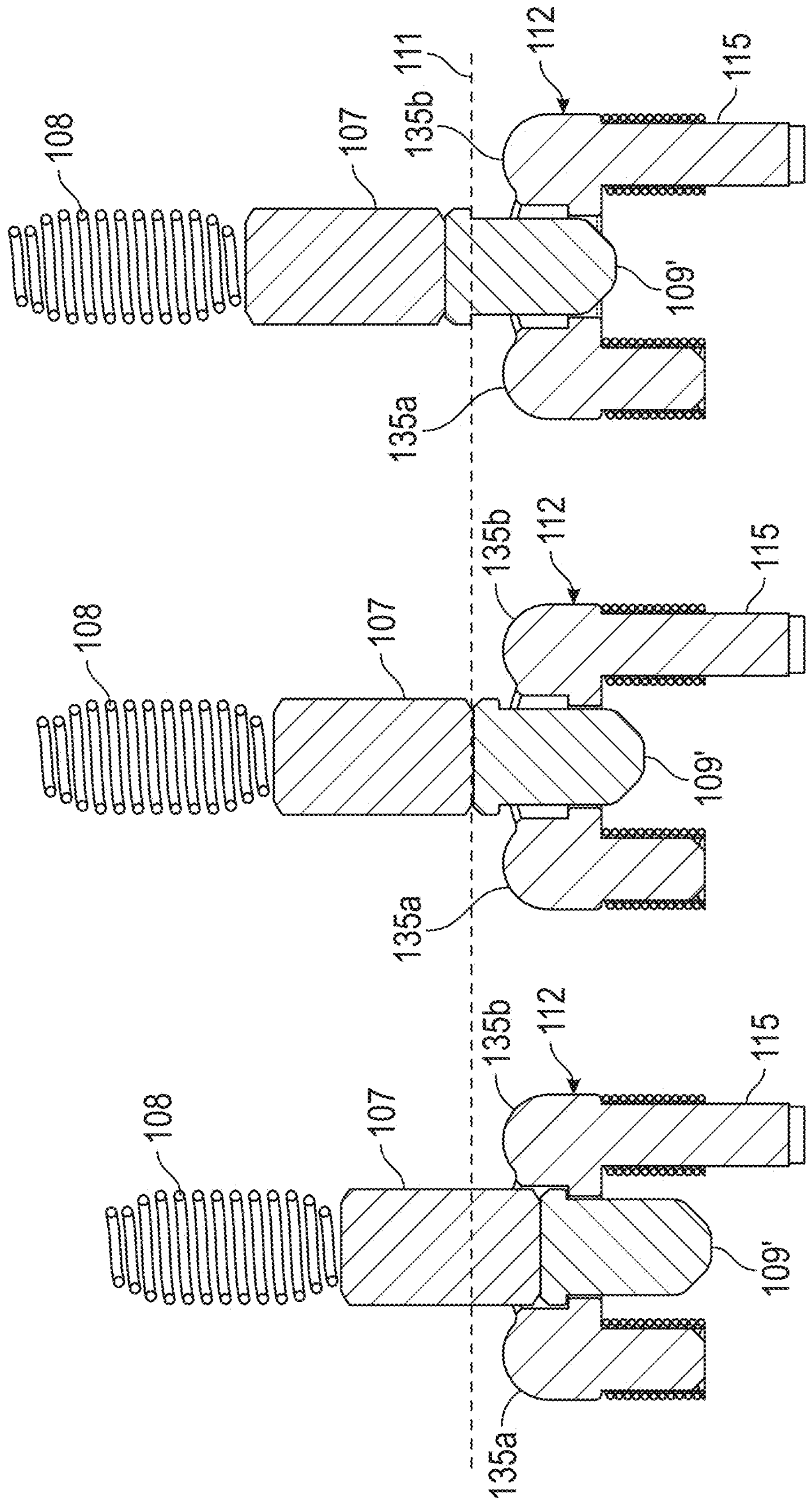
FIG. 40 is an axial cross section of the SE and its associated primary pin assembly of the second embodiment with the pin driver of the associated primary pin assembly below the shear line of the cylinder lock.
FIG. 41 is an axial cross section of the SE and its associated primary pin assembly of the second embodiment with the pin driver and the bottom pin of the associated primary pin assembly at the shear line of the cylinder lock.
FIG. 42 is an axial cross section of the SE and its associated primary pin assembly of the second embodiment with the bottom pin of the associated primary pin assembly above the shear line of the cylinder lock.

An incorrectly-bitted key will not position the primary pin assembly so that the interface between the top driver 107 and the bottom primary pin 109 (or the bottom primary pin 109') is at the shear line 111 between the inner surface of the bore 102 of the housing 101 and the plug 105, and the plug 105 will not be able to rotate within the bore 102. FIGS. 40, 41, 42 are axial cross sections of the SE and its associated primary pin assembly at three different primary pin positions with respect to the shear line. As shown in FIG. 40, if the cut on the bitting surface 129 of the key 125 is too deep at the location of the SE 112, the bottom pin 109' will be set too low, and the top driver pin 107 will drop down inside the SE 112 below the shear line 111. This will cause a locked condition. As shown in FIG. 42, if the cut on the bitting surface 129 of the key 125 is too shallow at the location of the SE 112, the bottom pin 109' will be set too high and will extend above the shear line 111. This will also cause a locked condition. As shown in FIG. 41, if the cut on the bitting surface 129 of the key 125 is at the proper depth at the location of the SE 112, the interface between the top driver pin 107 and the bottom pin 109' will align with the shear line 111 so that the primary pin assembly does not prevent rotation of the plug 105.

Thus, for a key 125 to operate the lock of the second embodiment, when the key 125 is fully inserted into the keyway, the top bitting surface 129 of the key 125 must be configured to properly position each primary pin assembly so that the interface between the top driver and the bottom primary pin of each primary pin assembly is at the shear line 111 between the bore 102 of the housing 101 and the plug 105. If the SE 112 includes a check pin, such as check pin 16 shown in, e.g., FIG. 14, key 125 must include a horizontal key control slot, such as horizontal control slot 26 shown in FIG. 6, that is properly positioned to receive the SE check pin to permit the key 125 to be inserted into the keyway 124.

In addition, the key side bittings 128*a*, 128*b* must be properly configured to move the slider 118 so that the SE cutout 119 of the slider is aligned with the SE leg 115 of the SE 112. If the SE 112 includes a check pin, such as check pin 16 shown in, e.g., FIG. 14, key 125 must include a vertical check pin control slot, such as vertical check pin control slot 27 shown in FIG. 6, that is properly positioned to receive the SE check pin. The plug 105 can then be rotated by applying torque to the plug with the key 125. The complementary surfaces of the recesses 103*a*, 103*b* will, by a camming interaction with the complementary surfaces of the projections 135*a*, 135*b*, push the projections 135*a*, 135*b* of the SE 112 out of the recesses 103*a*, 103*b* and below the shear line 111, thereby allowing the plug 105 to rotate. (See FIG. 39, which is an axial cross section of the lock assembly with the plug rotated within the housing and the projections 135*a*, 135*b* of the SE 112 displaced from the recesses 103*a*, 103*b*).

In a variation of the second embodiment of the SE 112 that includes the SE check pin 16 but does not include the slider 118, it is not necessary that the key 125 have key side bittings 128*a*, 128*b*, and the key will operate the lock if the top bitting surface 129 of the key 125 is configured to properly position each primary pin assembly so that the interface between the top driver and the bottom primary pin is at the shear line 111 between the bore 102 of the housing 101 and the plug 105, the horizontal control slot 26 is positioned to receive the check pin 16 and permit the key to be inserted, and the check pin control slot 27 is positioned at the SE to receive the check pin 16 and permit the SE to move down into the plug. The plug 105 can then be rotated by applying torque to the plug with the key 125. The complementary surfaces of the recesses 103*a*, 103*b* will, by a camming interaction, push the projections 135*a*, 135*b* of the SE 112 out of the recesses 103*a*, 103*b*, thereby allowing the plug 105 to rotate.

Secondary Locking Element—Third Embodiment

Figure 45:
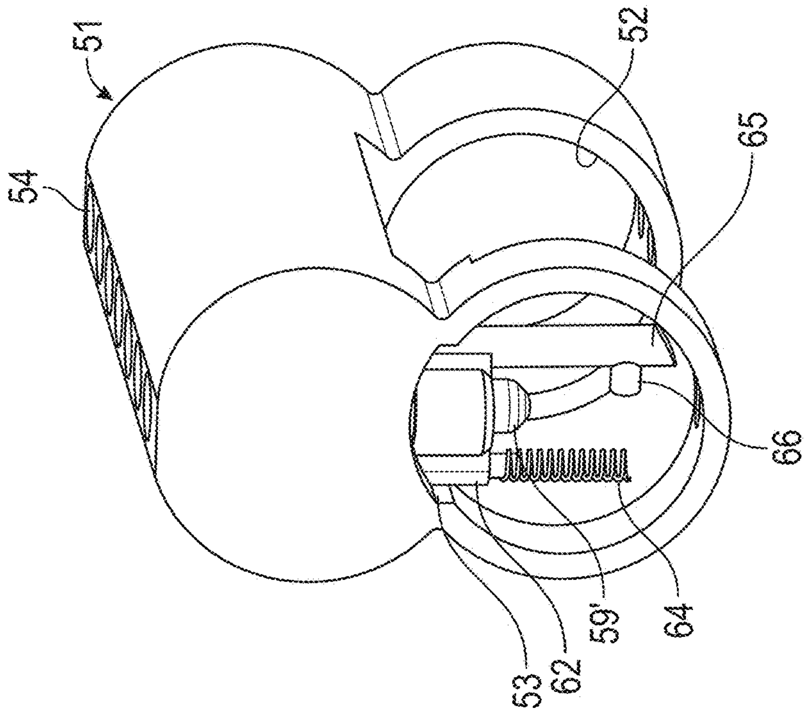
FIG. 45 is a perspective view of the SE and the housing of the third embodiment, with the SE in a locked position engaged with a cutout in the housing.
Figure 44:
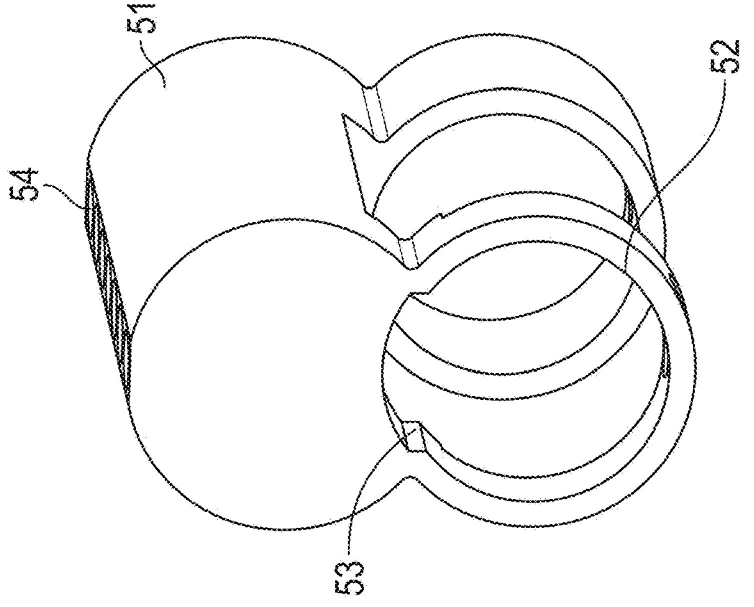
FIG. 44 is a perspective view of a housing of the cylinder lock of the third embodiment.
Figure 43:
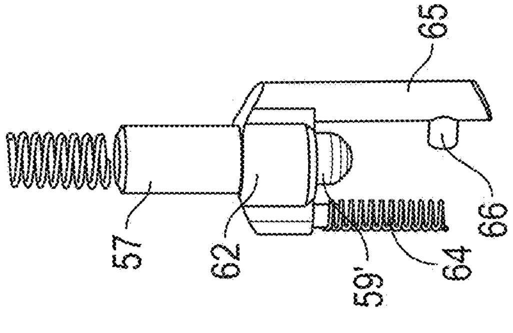
FIG. 43 is a perspective view of a secondary element and an associated primary pin assembly of a third embodiment of a cylinder lock described herein.

In another embodiment, as shown in FIGS. 43, 44 and 45, the SE 62 is spring-biased up into a housing 51 with mating surfaces, such as a feature on the top of the SE that engages a locking feature formed in an inner surface of the bore 52 of the housing 51, such as a cutout 53 in the housing, that provide a deadlock. The feature on top of the SE and the cutout 53 are not angled as with the SE 12 and groove 3 of the first embodiment, so that rotation of the plug does not cause the SE to move down by interaction between a groove in the housing and the projection of the SE. Instead, a side bitting on the key engages the SE and pulls it down, out of engagement with the housing so that the SE does not prevent rotation of the plug.

Figure 47:
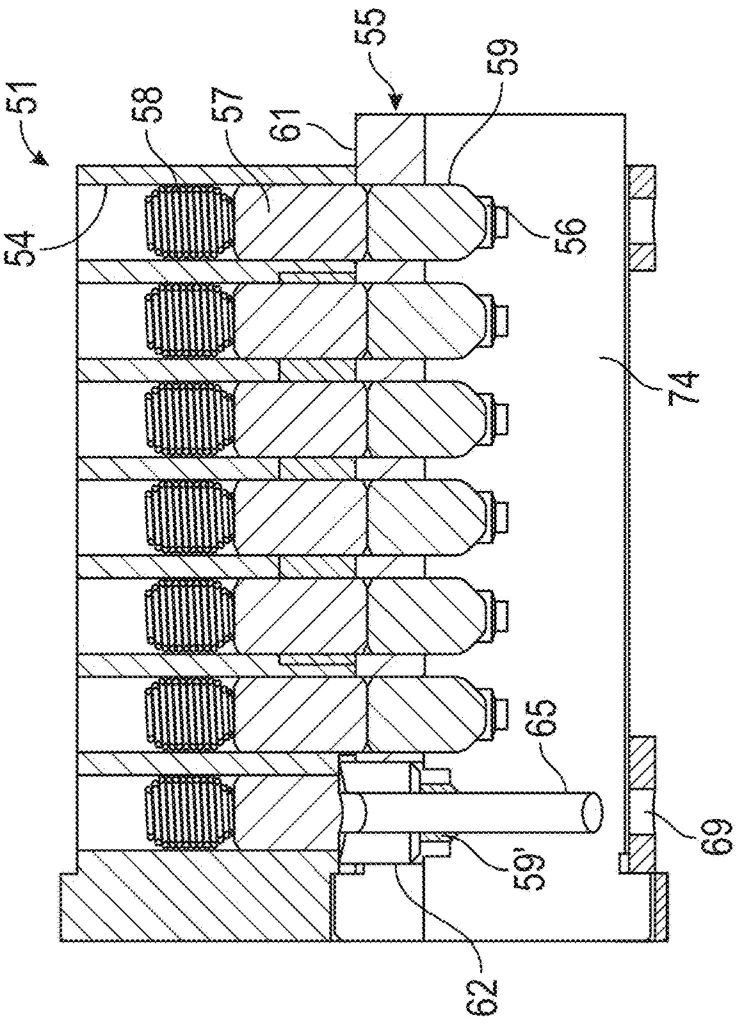
FIG. 47 is a transverse cross-section of the lock assembly of the third embodiment in which the key is omitted.
Figure 46:
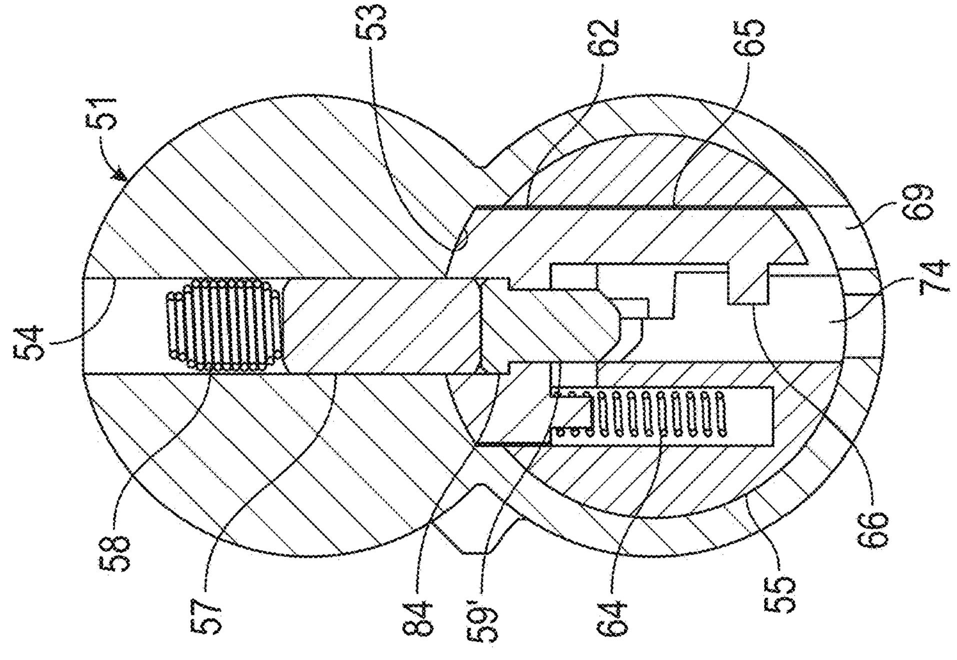
FIG. 46 is a radial cross-section of the lock assembly of the third embodiment in which the key is omitted.

As shown in FIGS. 43 and 45, the top of the SE 62 remains engaged with the cutout 53 due to the upward spring force applied to the SE 62 by an SE spring 64. SE 62 has a control feature (leg 65) that extends downward within the plug and a drive pin 66 extends laterally from the leg 65. FIG. 46 is a radial cross-section of the lock assembly of the third embodiment in which the key is omitted, and FIG. 47 is a transverse cross-section of the lock assembly of the third embodiment in which the key is omitted. As shown in FIGS. 46 and 47, SE 62 is housed in a secondary element pocket (or SE pocket) inside the plug 55 and is biased outwardly by spring 64 to engage cutout 53 in the housing 51 at a primary shear line between the plug 55 and a bore 52 of the housing 51. An SE over-travel hole 69 (see FIG. 46) is formed in the bottom of the housing 51 and is aligned with a hole formed in the plug 55 in which leg 65 is disposed to receive a lower end of the leg 65 when the SE 62 is moved too far down within the plug 55.

A row of primary pin assemblies are positioned within pin holes formed in the plug 55 and aligned pin holes 54 formed in an upper part of the housing 51 above the bore 52. The pin holes formed in the plug 55 are aligned with a keyway 74 formed in the plug 55. As shown in FIG. 47, each primary pin assembly may comprise a conventional assembly configuration that includes a top driver 57 and a bottom pin 59 to block rotation of the plug 55 within a housing 51. In some examples, top driver 57 may comprise a stack of two or more driver wafers to enable master keying. Each primary pin assembly includes a spring 58 positioned above the top driver 7 within pin hole 54 within the housing 51 which urges the associated pin assembly downwards so that the associated top driver 57 extends from the housing 51 into a pin hole 56 within the plug 55 past a shear line between the plug and housing, thereby blocking the plug from rotating within the housing. The lower ends of the bottom pins 59 of the downwardly biased pin assemblies seat within stops at the bottoms of the pin hole 56 (see FIG. 47) and extend into the keyway 74 so that a top bitting surface of a key inserted into the keyway engages the lower ends of the bottom pins 59 and elevates each pin assembly so that the interface between the top of the bottom pin 59 and the bottom of the top driver 57 is positioned at the shear line to permit the plug 55 to rotate within the housing 51.

The example illustrated in FIGS. 26 and 27 includes a single SE 62 positioned at and coaxially arranged with respect to the first (i.e., forward-most) primary pin assembly of the lock. Other examples are contemplated in which the SE is associated with a different primary pin assembly or an SE is associated with each of two or more pin assemblies.

Figure 48:
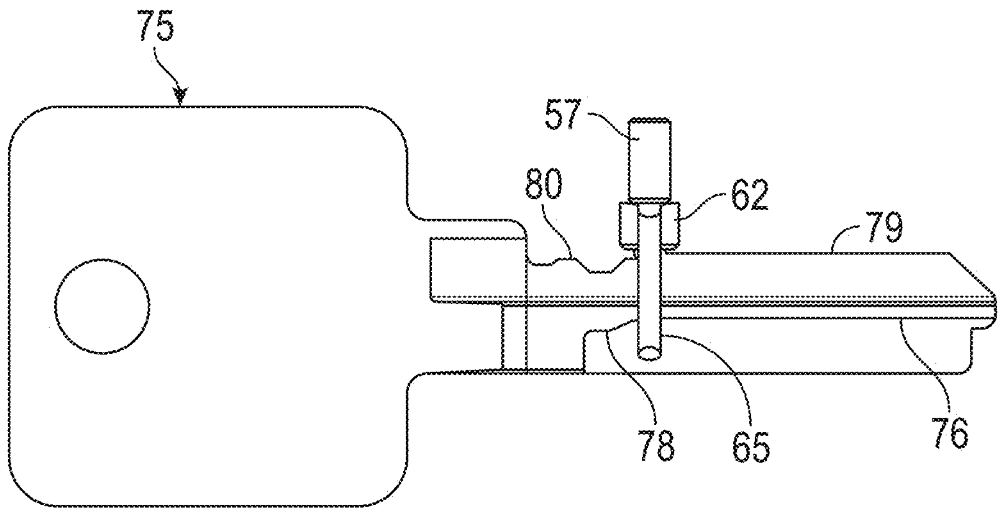
FIG. 48 is a side view of a key and a secondary element ("SE") of the third embodiment, with the SE in a locked position and engaged with a non-actuating control surface of the key.
Figure 49:
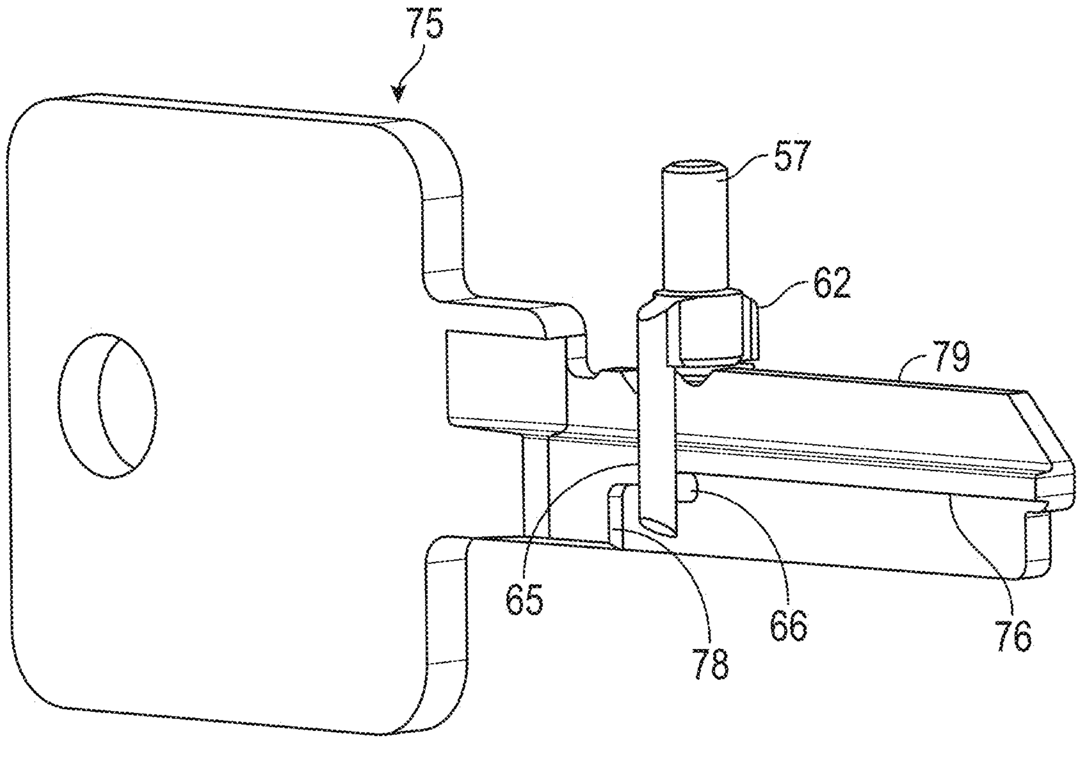
FIG. 49 is a perspective view of the key and the SE of the third embodiment, with the SE in the locked position and engaged with the non-actuating control surface of the key.

As shown in FIGS. 48 and 49, a key blank 75 (in use, key blank 75 would be cut into a functional key with top edge bittings for lifting primary pin assemblies) includes a top bitting 79 surface (FIGS. 48 and 49 show an uncut top bitting surface of a key blank), a first side (horizontal, downwardly facing) non-actuating control surface 76, an actuating control surface 78, and an optional top SE clearance cut 80, preferably formed in the blade of the key blank.

As shown in FIGS. 43 and 52-54, the SE 62 includes a center cup structure. The primary pin assembly associated with the SE may include a top driver 57 and a spring 58, as with the primary pin assemblies not associated with the SE, and a bottom pin 59' that differs from the bottom pins 59 of the primary pin assemblies not associated with the SE. The primary bottom pin 59' is received within the center cup of the SE 62 and, unlike the bottom pins 59 of the primary pin assemblies not associated with the SE, includes a head 84 that is wider than a lower portion of the pin and is captured by a rim 83 within the SE (see FIGS. 32-34) to prevent the pin 59' from passing completely through the SE 62. The head 84 may have a diameter corresponding to the diameter of the top driver 57, and a spring 58 is positioned above the top driver 57. The lower end of the primary bottom pin 59' extends through the center cup of the SE 62 and into the keyway. The primary pin assembly is movable independently "within" the SE 62 away from the keyway and is biased downwardly (toward the keyway) by spring 58 contacting the top driver 57 so that the head 84 of primary pin 59' seats in the interior surface (rim 83) of the center cup of the SE 62. SE spring 64 is stronger than primary pin assembly spring 58. As a result, the stronger spring force of the SE 62 pushing up, overcomes the weaker spring force pushing down on the top driver pin such that the primary pin's downward travel is controlled by the position of the SE, and the bottom pin 59' cannot go any lower than the SE 62 allows. With the bottom pin 59' seated on the SE rim surface, the driver pin 57 extends into the SE and past the shear line 61 between the housing 51 and the plug 55, which prevents rotation of the plug 55 within the bore 52 of the housing 51.

An incorrectly-bitted key will not position the primary pin assembly so that the interface between the top driver 57 and the bottom primary pin 59 (or bottom primary pin 59') is at the shear line 61 between the inner surface of the bore 52 of the housing 51 and the plug 55, and the plug 55 will not be able to rotate within the bore 52. FIGS. 52(A), 53(A), and 54(A) are transverse cross sections of the SE of the third embodiment and its associated primary pin assembly at three different primary pin positions with respect to the shear line, and FIGS. 52(B), 53(B), and 54(B) are axial cross sections of the SE and its associated primary pin assembly at three different primary pin positions with respect to the shear line. As shown in FIGS. 52(A) and (B), if the cut on the bitting surface of the key is too deep at the location of the SE 62, the bottom pin 59' will be set too low, and the top driver pin 57 will drop down inside the SE 62 below the shear line 61. This will cause a locked condition. As shown in FIGS. 54(A) and (B), if the cut on the bitting surface of the key is too shallow at the location of the SE 62, the bottom pin 59' will be set too high and will extend above the shear line 61. This will also cause a locked condition. As shown in FIGS. 53(A) and (B), if the cut on the bitting surface of the key is at the proper depth at the location of the SE 62, the interface between the top driver pin 57 and the bottom pin 59' will align with the shear line 61 so that the primary pin assembly does not prevent rotation of the plug 55.

Figure 50:
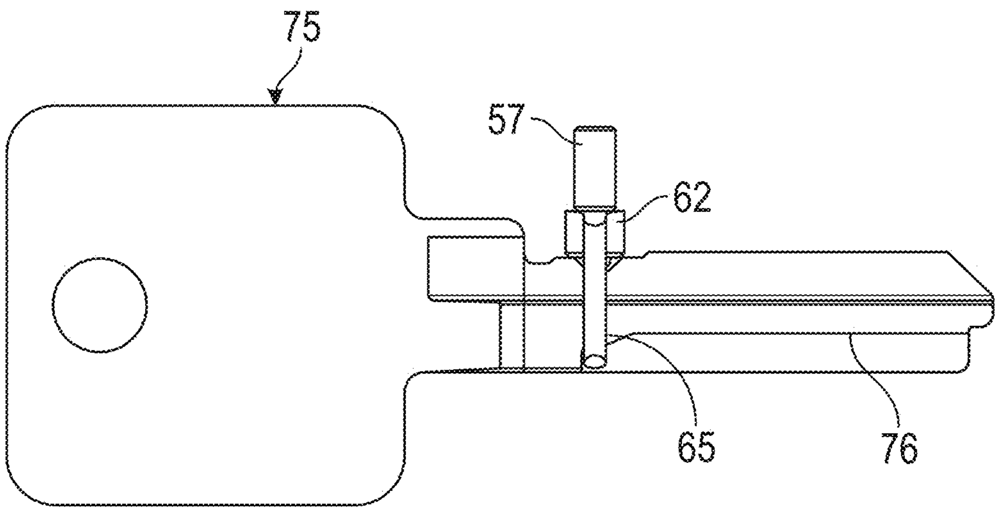
FIG. 50 is a side view of the key and the SE of the third embodiment, with the SE in an unlocked position and engaged with an actuating control surface of the key.
Figure 51:
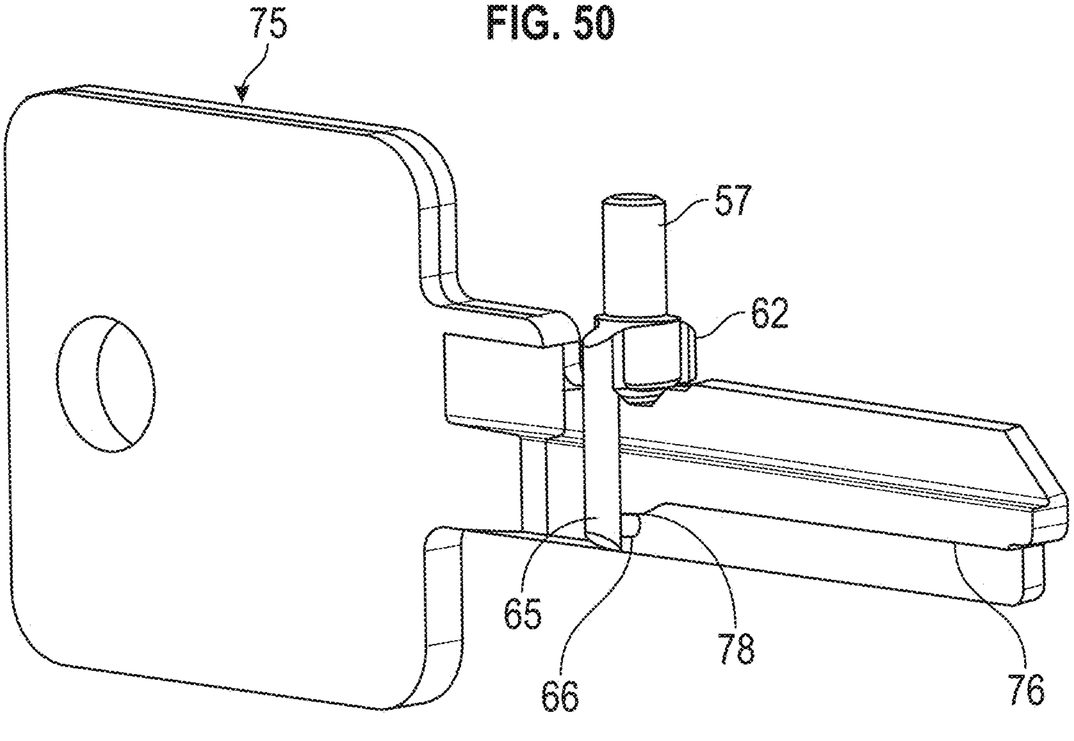
FIG. 51 is a perspective view of the key and the SE of the third embodiment, with the SE in the unlocked position and engaged with the actuating control surface of the key.
Figure 53:
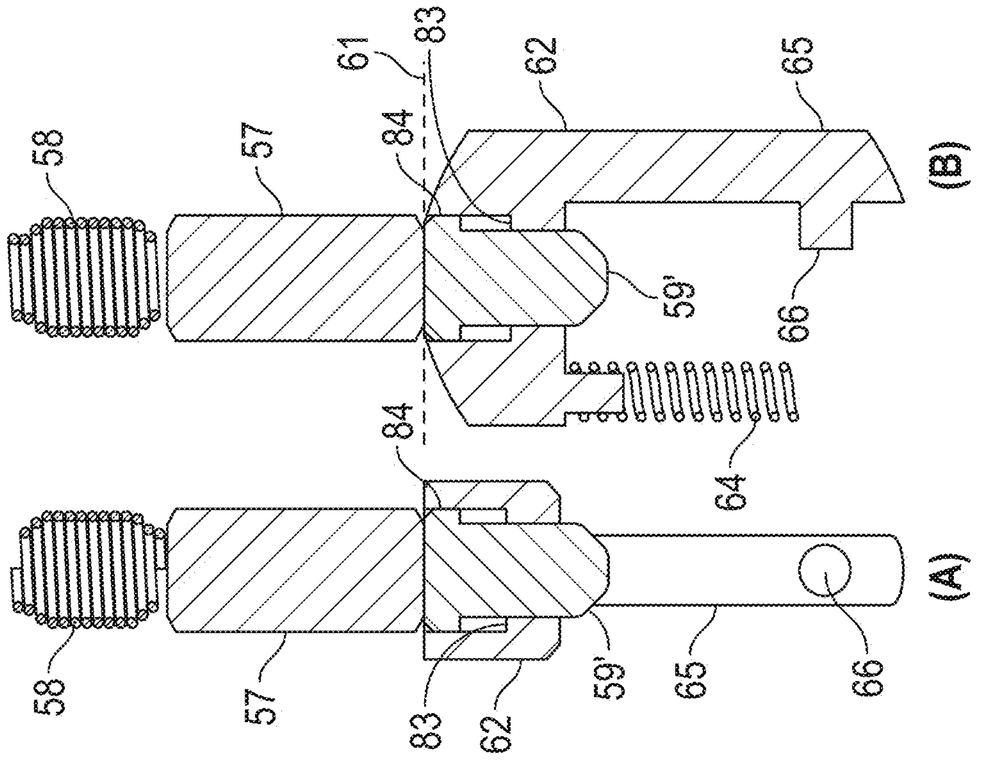
FIG. 53(A) is a transverse cross section of the SE and its associated primary pin assembly of the third embodiment with the pin driver and a bottom pin of the associated primary pin assembly at the shear line of the cylinder lock.
FIG. 53(B) is an axial cross section of the SE and its associated primary pin assembly of the third embodiment with the pin driver and the bottom pin of the associated primary pin assembly at the shear line of the cylinder lock.
Figure 52:
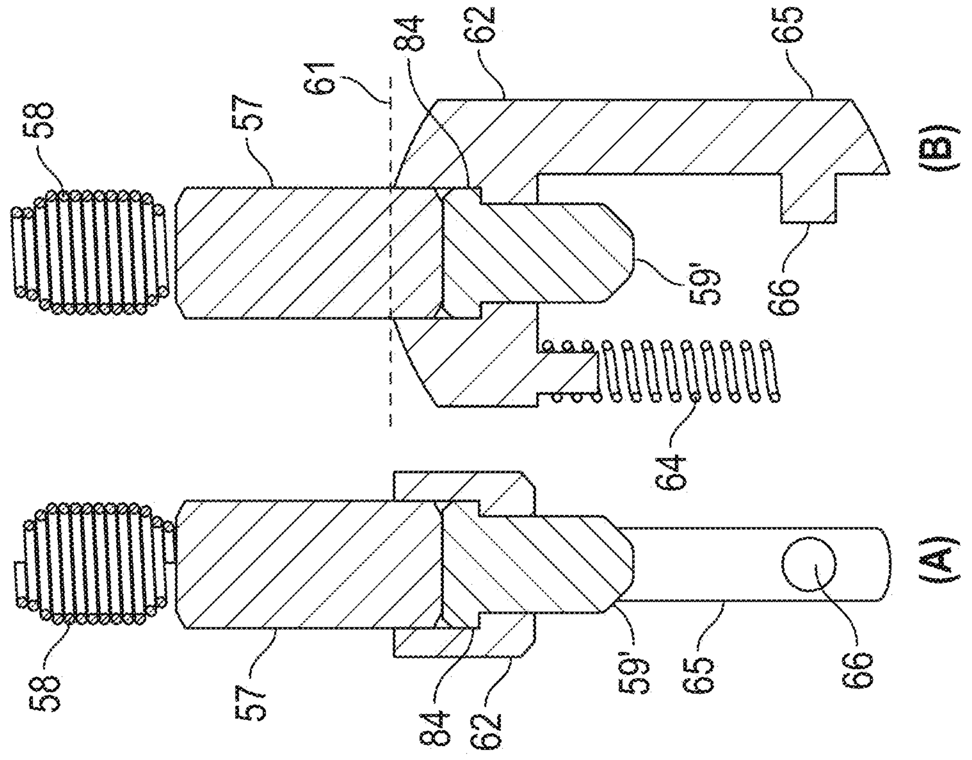
FIG. 52(A) is a transverse cross section of the SE and its associated primary pin assembly of the third embodiment with a pin driver of the associated primary pin assembly below a shear line of the cylinder lock.
FIG. 52(B) is an axial cross section of the SE and its associated primary pin assembly of the third embodiment with the pin driver of the associated primary pin assembly below the shear line of the cylinder lock.
Figure 54:
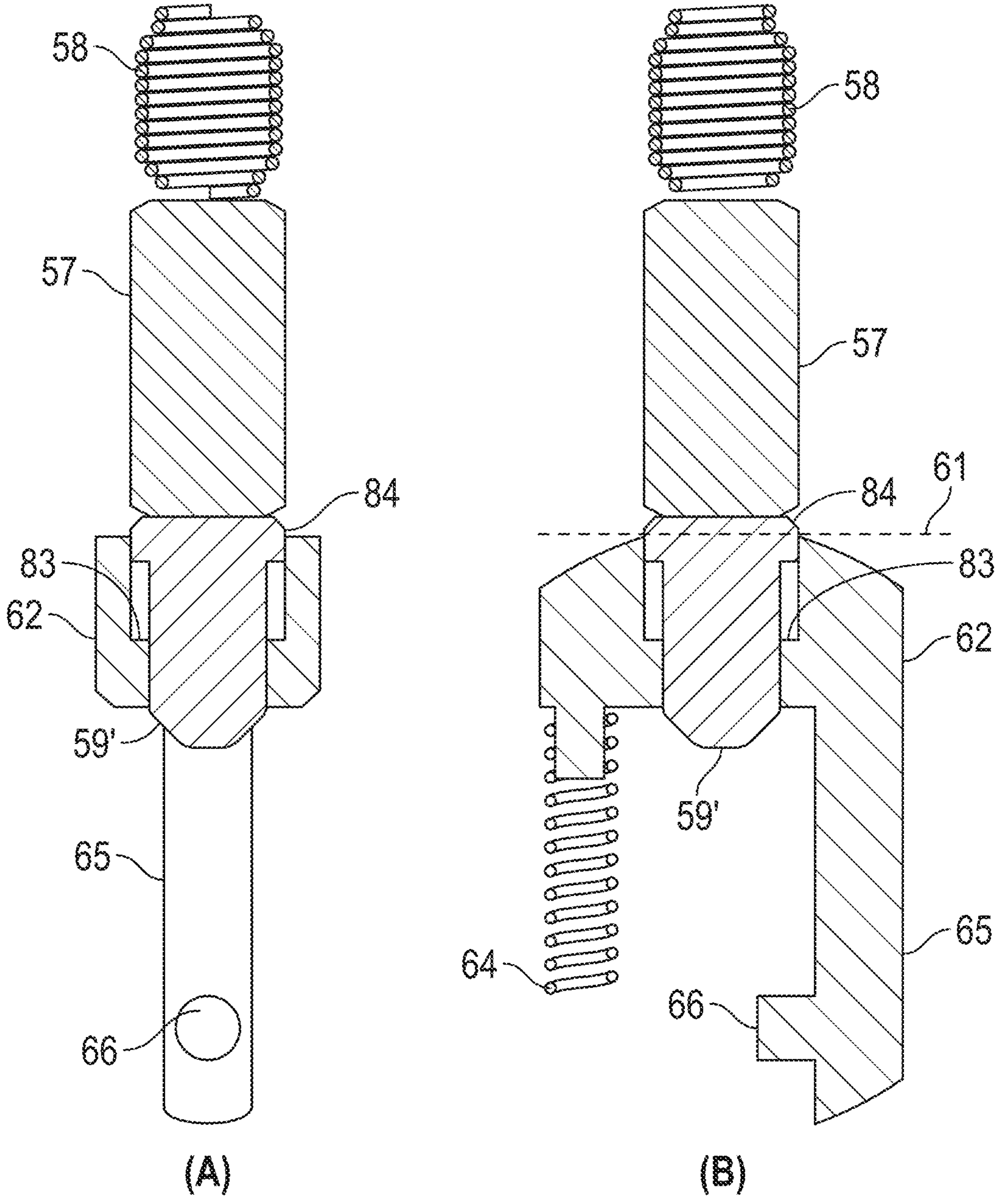
FIG. 54(A) is a transverse cross section of the SE and its associated primary pin assembly of the third embodiment with the bottom pin of the associated primary pin assembly above the shear line of the cylinder lock.
FIG. 54(B) is an axial cross section of the SE and its associated primary pin assembly of the third embodiment with the bottom pin of the associated primary pin assembly above the shear line of the cylinder lock.

In order for the cylinder plug to be able to rotate, the top of the SE 62 must first be moved out of engagement with the cutout 53 in the housing 51. This is controlled by the SE drive pin feature 66 engaging control surfaces on the key cut from key blank 75. The key side actuating control surface 78 provides transitions, or ramps, in specific increments toward the bottom of the key. As the key is inserted, the SE drive pin 66 follows horizontal, non-actuating control surface 76 on the key, as shown in FIGS. 48 and 49, without moving the SE 62. As the key cut from key blank 75 is fully inserted, the SE drive pin 66 engages the ramp of the actuating control surface 78, as shown in FIGS. 50 and 51 (showing the uncut key blank rather than a cut key as would be used in practice), and moves the SE 62 down and out of engagement with the cutout 53 of the housing 51, allowing rotation of the plug 55. (Assuming the primary pins are at the shear line and the SE is moved the correct distance.) The SE 62 and SE drive pin 66 extending from leg 65 are biased upwardly by spring 64, causing the drive pin 66 of the SE 62 to stay in contact with the actuating control surface 78 of the key.

In one alternate example, the non-actuating control surface 76 comprises a straight slot extending horizontally along a portion of the length of the blade of the key which transitions into a downwardly extending slot that functions as the actuating control surface that moves the SE 62 down as the drive pin 66 follows the downwardly extending slot.

There are multiple bitting increments on the side bitting 78 of the key and multiple positions of the SE drive pin 66 on different SE types. Thus, multiple codings may be achieved by varying the vertical position of the drive pin 66.

If the SE is not moved far enough due to the positioning of the drive pin 66 by actuating control surface 78, the SE 62 will continue to engage the cutout 53 in the housing 51. If the SE is moved too far, the bottom of the SE leg 65 will extend into the over-travel hole 69 in the bottom of the housing 51 and prevent rotation of the plug.

The top SE clearance cut 80 on the top surface of the key blank (see FIG. 48) at the SE position allows the SE 62 to be moved down far enough to position SE 62 outside the cutout 53. In the illustrated example, the clearance cut 80 is positioned at the first (forward-most) primary pin assembly. If the SE is provided at a different primary pin assembly, the clearance cut 80 would be moved to a location corresponding to the primary pin assembly associated with the SE, and if multiple SEs were provided, the key may include multiple clearance cuts 80 at locations corresponding to the primary pin assemblies associated with the SEs.

Thus, for a key cut from key blank 75 to operate the lock of the third embodiment, the non-actuating control surface 76 must be properly positioned above the SE drive pin 66 to permit the key to be inserted into the keyway without moving the SE 62. When the key is fully inserted into the keyway, the top bitting surface 79 of the key must be configured to properly position each primary pin assembly so that the interface between the top driver and the bottom primary pin is at the shear line 61 between the bore 52 of the housing 51 and the plug 55. In addition, the actuating control surface 78 must be properly configured to engage the drive pin 66 and to move the SE 62 so that the top of the SE 62 is withdrawn from the cutout 53 without moving the SE 62 too far down so that the leg 65 engages the over-travel hole 69.

In another embodiment (not shown), a lock assembly could combine SE 62 having a drive pin 66 with a slider 18 having at least one drive tab 22 extending into the keyway and a cutout 19 formed in the top thereof. A key (not shown) for operating such a lock would include a non-actuating control surface 76 and an actuating control surface 78 as shown in FIGS. 48 and 29, and at least one side bitting 28 for actuating the slider, as shown in FIGS. 6, 7, 28, 29.

Thus, for a key to operate such a lock embodiment, the non-actuating control surface 76 must be properly positioned above the SE drive pin 66 to permit the key to be inserted into the keyway without moving the SE 62. When the key is fully inserted into the keyway, a top bitting surface of the key must be configured to properly position each primary pin assembly so that the interface between the top driver and the bottom primary pin is at the shear line between the bore of the housing and the plug. In addition, the actuating control surface 78 must be properly configured to engage the drive pin 66 and to move the SE 62 so that the top of the SE 62 is withdrawn from the cutout 53. In addition, the key side bitting 28 must be properly configured to move the slider 18 so that the SE cutout 19 of the slider is aligned with the SE leg 65 of the SE 62.

Features and Characteristics

Examples described herein may embody one more of the following features or characteristics.

A common shear line between the plug and the housing for the SE and the primary pin assemblies at the primary shear line. The shear line is the primary shear line of the cylinder lock, not a secondary shear line as in cylinder locks with conventional secondary locking elements not associated with a primary pin assembly, such as, finger pins or sidebars.

The SE must be moved down (into the plug) to achieve a shear line while at the same time the primary pin assemblies must be pushed up (away from the plug) along the row of primary pin assemblies.

Rotation of the plug within the housing is prevented if one or more of the following conditions is satisfied:

The SE cannot move down due to the slider being out of position and blocking it.

The SE cannot move down due to the SE check pin not engaging the vertical control slot on the key (for an SE that includes a check pin).

The bottom primary pin of the primary pin assembly associated with the SE (or any other primary pin) is too low causing the top driver to block the shear line.

The bottom primary pin of the primary pin assembly associated with the SE (or any other primary pin) is too high causing the bottom primary pin to block the shear line.

The SE cannot move down to the shear line because a clearance cut is not present on the top bitting surface of the key.

The control surfaces/side bittings on the key do not pull the SE down, out of the cutout in the housing, or the control surfaces/side bittings on the key pull the SE too far down and the SE over-travel hole formed in the housing.

A top clearance cut on the key for the SE can be combined with normal top bittings to control the position of the primary pin assembly at the SE position.

A key described herein may include a first (e.g., horizontal) control groove and a second (e.g., vertical) groove for an SE check pin (for an SE that includes a check pin).

A slider is used to prevent the SE from moving to the shear line only during rotation of the plug.

The slider has multiple drive tabs to match the multiple side bitting surfaces on the key to provide coding variations of the key.

The SE encapsulates the primary pin assembly at the SE location and controls downward position of primary pin assembly but allows free upward movement when primary pin assembly is engaged with a top bitting surface of the key and is pushed up.

The bottom pin of the primary pin assembly at the SE location may be seated on an interior rim of the SE.

The spring(s) of the SE is (are) stronger than the spring of the primary pin assembly at the SE location, thus preventing the primary assembly from moving the SE downward into the plug.

An SE described herein controls the primary shear line based on the key side cut (side bittings) engaging with the slider. Typical side cuts on keys do not control the top primary shear lines.

A key operable with a lock system described herein may have a clearance cut below a top edge of the key (below the top edge of the key blank from which the key was made) e.g., as represented by dashed line "32" in FIG. 13 to permit the SE to travel to shear line.

A key operable with a lock system described herein may have side bittings to engage and move the slider to the correct position to allow the SE to travel to the shear line.

A key operable with a lock system described herein may have a first control slot to allow the SE check pin to travel the length of the key and a second control slot to allow the SE check pin to move downward and allow the SE to move to the shear line (for an SE that includes a check pin).

An SE described herein ramps down and out of engagement with the housing as a result of rotation of the plug if the slider is in the correct position and the primary pin assemblies are at the shear line.

The secondary locking element (SE) prevent rotation of the plug in the housing and interacts with a traditional primary pin assembly to create a common shear line between the SE, primary pin assembly, plug, and housing along the primary row of pins.

Blocking and torque strength—in addition to that provided by the primary pin assemblies—is provided between the plug and the housing by the SE, which is biased upward from the plug and into engagement with the housing by a spring force. A key with the correct top cuts to align the top drivers and bottom pins of the primary pin assemblies will not operate the plug unless the SE is moved or allowed to move into the correct position at the shear line. Conversely, if the SE is positioned to the correct position at the shear line but the primary pin assemblies are not positioned at the shear line by the correct cuts on the top surface of the key, the plug will not rotate.

All possible combinations of elements and components described in the specification or recited in the claims are contemplated and considered to be part of this disclosure. It should be appreciated that all combinations of the foregoing concepts and additional concepts discussed in greater detail herein (provided such concepts are not mutually inconsistent) are contemplated as being part of the inventive subject matter described herein. In particular, all combinations of claimed subject matter appearing at the end of this disclosure are contemplated as being part of the inventive subject matter disclosed herein.

While the subject matter of this disclosure has been described and shown in considerable detail with reference to certain illustrative examples, including various combinations and sub-combinations of features, those skilled in the art will readily appreciate other variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

What is claimed is:

1. A lock assembly comprising:

a housing;

a plug rotatably disposed within a bore formed in the housing, with a keyway extending axially into the plug;

a plurality of primary pin assemblies, each primary pin assembly comprising at least one top driver, a bottom pin, and a spring, wherein each primary pin assembly is disposed within aligned holes formed in the housing and the plug and wherein the spring contacts the at least one top driver within the hole formed in the housing to bias the primary pin assembly with an end of the bottom pin extending into the keyway, and wherein the primary pin assemblies are engageable by a primary bitting surface of a key inserted into the keyway to position each primary pin assembly such that an interface between the at least one top driver and the bottom pin coincides with a shear line between the bore of the housing and the plug; and at least one secondary locking element disposed within a pocket formed in the plug, each secondary locking element being associated with one of the primary pin assemblies, wherein each secondary locking element is biased outwardly from the plug to engage a locking feature formed in an inner surface of the bore of the housing to prevent the plug from rotating within the bore of the housing, wherein a portion of the bottom pin of the associated primary pin assembly extends through the secondary locking element and into the keyway, and wherein the associated primary pin assembly is movable independently of the secondary locking element in a direction away from the keyway, and wherein each secondary locking element includes at least one control feature that is directly or indirectly engaged by a key inserted into the keyway to cause the secondary locking element to move inwardly toward the plug so that the secondary locking element disengages from the locking feature or to permit the secondary locking element to be moved inwardly toward the plug so that the secondary locking element can disengage from the locking feature.

2. The lock assembly of claim 1, wherein each secondary locking element includes a feature that prevents the bottom pin from passing completely through the secondary locking element.

3. The lock assembly of claim 1, wherein the at least one control feature comprises a leg extending into the plug, away from the locking feature, and wherein the lock assembly further comprises a slider movably disposed within a slider pocket formed in the plug, wherein the slider includes a cutout formed in a top surface thereof and wherein the slider is movable between a first position in which the cutout is not aligned with the leg so that the leg contacts a top surface of the slider to prevent the secondary locking element from moving inwardly and prevent the secondary locking element from disengaging from the locking feature and a second position in which the cutout is aligned with the leg so that the leg may be received within the cutout to permit the secondary locking element to move inwardly and disengage from the locking feature, and wherein the slider includes a drive tab that extends into the keyway and is contacted by a side bitting of a key inserted into the keyway to move the slider from the first position to the second position.

4. The lock assembly of claim 1, wherein each secondary locking element includes one or more projections and the locking feature comprises a recess associated with each projection formed in the inner surface of the bore of the housing, wherein each recess has a surface that is complementary to a surface of the associated projection so that when a key is inserted into the keyway and each primary pin assembly is positioned such that the interface between the at least one top driver and the bottom pin coincides with the shear line between the bore of the housing and the plug, the slider is moved from the first position to the second position by the key, and torque is applied to the plug, the complementary surfaces of each projection of the secondary locking element and the associated recess cause each projection to move out of the associated recess and to the shear line.

5. The lock assembly of claim 4, wherein the one or more projections comprise a projection with angled surfaces and each recess comprises a groove having angled surfaces that are complementary to the angled surfaces of the associated projection.

6. The lock assembly of claim 4, wherein the one or more projections comprise two projections, each with a rounded surface, and each recess comprises a rounded surface that is complementary to the rounded surface of the associated projection.

7. The lock assembly of claim 1, wherein the at least one control feature comprises a leg extending into the plug, away from the locking feature, and a check pin extending laterally from the leg into the keyway, wherein the check pin is received within a first control slot formed on a side of a key inserted into the keyway to prevent the secondary locking element from moving inwardly and prevent the secondary locking element from disengaging from the locking feature, and wherein the check pin is received within a second control slot when the key is fully inserted into the keyway, wherein the second control slot allows movement of the check pin that permits the secondary locking element to move inwardly and disengage from the locking feature.

8. The lock assembly of claim 7, wherein each secondary locking element includes one or more projections and the locking feature comprises a recess associated with each projection formed in the inner surface of the bore of the housing, wherein each recess has a surface that is complementary to a surface of the associated projection so that when a key is inserted into the keyway and each primary pin assembly is positioned such that the interface between the at least one top driver and the bottom pin coincides with the shear line between the bore of the housing and the plug, the slider is moved from the first position to the second position by the key, and torque is applied to the plug, the complementary surfaces of each projection of the secondary locking element and the associated recess cause each projection to move out of the associated recess and to the shear line.

9. The lock assembly of claim 8, wherein the one or more projections comprise a projection with angled surfaces and each recess comprises a groove having angled surfaces that are complementary to the angled surfaces of the associated projection.

10. The lock assembly of claim 8, wherein the one or more projections comprise two projections, each with a rounded surface, and each recess comprises a rounded surface that is complementary to the rounded surface of the associated projection.

11. The lock assembly of claim 3, wherein the at least one control feature further comprises a check pin extending laterally from the leg into the keyway, wherein the check pin is received within a first control slot formed on a side of a key inserted into the keyway to prevent the secondary locking element from moving inwardly and prevent the secondary locking element from disengaging from the locking feature, and wherein the check pin is received within a second control slot when the key is fully inserted into the keyway, wherein the second control slot allows movement of the check pin that permits the secondary locking element to move inwardly and disengage from the locking feature.

12. The lock assembly of claim 11, wherein each secondary locking element includes a projection with angled surfaces and the locking feature comprises a groove formed in the inner surface of the bore of the housing, wherein the groove has angled surfaces that are complementary to the angled surfaces of the projection of the secondary locking element so that when a key is inserted into the keyway and each primary pin assembly is positioned such that the interface between the at least one top driver and the bottom pin coincides with the shear line between the bore of the housing and the plug, the slider is moved from the first position to the second position by the key, the check pin is received within the second control slot on the key, and torque is applied to the plug, the complementary angled surfaces of the projection of the secondary locking element and the groove cause the projection of the secondary locking element to move out of the groove and to the shear line.

13. The lock assembly of claim 1, wherein the at least one control feature comprises a leg extending into the plug, away from the locking feature, and a drive pin extending laterally from the leg into the keyway, wherein the drive pin is engaged by a non-actuating control surface formed on a side of a key inserted into the keyway without causing movement of the secondary locking element, and wherein the drive pin engages an actuating control surface on the key when the key is fully inserted into the keyway to cause the secondary locking element to move inwardly and disengage from the locking feature.

14. The lock assembly of claim 3, wherein the at least one control feature comprises a drive pin extending laterally from the leg into the keyway, wherein the drive pin is engaged by a non-actuating control surface formed on the side of the key inserted into the keyway without causing movement of the secondary locking element, and wherein the drive pin engages an actuating control surface on the key when the key is fully inserted into the keyway to cause the secondary locking element to move inwardly and disengage from the locking feature.

15. A method for operating a lock assembly, wherein the lock assembly comprises (i) a housing, (ii) a plug rotatably disposed within a bore formed in the housing, with a keyway extending axially into the plug, (iii) a plurality of primary pin assemblies, each primary pin assembly comprising at least one top driver, a bottom pin, and a spring, wherein each primary pin assembly is disposed within aligned holes formed in the housing and the plug and wherein the spring contacts the at least one top driver within the hole formed in the housing to bias the primary pin assembly with an end of the bottom pin extending into the keyway, and (iv) at least one secondary locking element disposed within a pocket formed in the plug, each secondary locking element being associated with one primary pin assembly, wherein each secondary locking element is biased outwardly from the plug to engage a locking feature formed in an inner surface of the bore of the housing to prevent the plug from rotating within the bore of the housing, wherein a portion of the bottom pin of the associated primary pin assembly extends through the secondary locking element and into the keyway, and wherein the associated primary pin assembly is movable independently of the secondary locking element in a direction away from the keyway, and wherein each secondary locking element includes at least one control feature, wherein the method comprises:

A. contacting a tip of the bottom pin of each primary pin assembly to manipulate each primary pin assembly into a position such that an interface between the at least one top driver and the bottom pin coincides with a shear line between the bore of the housing and the plug; and B. engaging the control feature of each secondary locking element to (i) cause the secondary locking element to move inwardly toward the plug so that the secondary locking element disengages from the locking feature or (ii) to permit the secondary locking element to be moved inwardly toward the plug so that the secondary locking element can disengage from the locking feature.

16. The method of claim 15, wherein the at least one control feature comprises a leg extending into the plug, away from the locking feature, and wherein the lock assembly further comprises a slider movably disposed within a slider pocket formed in the plug, wherein the slider includes a cutout formed in a top surface thereof, and wherein step B comprises moving the slider from (i) a first position in which the cutout is not aligned with the leg so that the leg contacts a top surface of the slider to prevent the secondary locking element from moving inwardly and prevent the secondary locking element from disengaging from the locking feature to (ii) a second position in which the cutout is aligned with the leg so that the leg may be received within the cutout to permit the secondary locking element to move inwardly and disengage from the locking feature.

17. The method of claim 16, wherein the slider includes a drive tab that extends into the keyway, and step B comprises inserting a key into the keyway and contacting the drive tab with a side bitting of the key to move the slider from the first position to the second position.

18. The method of claim 16, wherein each secondary locking element includes one or more projections and the locking feature comprises a recess associated with each projection formed in the inner surface of the bore of the housing, wherein each recess has a surface that is complementary to a surface of the associated projection so that when a key is inserted into the keyway and each primary pin assembly is positioned such that the interface between the at least one top driver and the bottom pin coincides with the shear line between the bore of the housing and the plug, the slider is moved from the first position to the second position by the key, and torque is applied to the plug, the complementary surfaces of each projection of the secondary locking element and the associated recess cause each projection to move out of the associated recess and to the shear line.

19. The method of claim 18, wherein the one or more projections comprise a projection with angled surfaces and each recess comprises a groove having angled surfaces that are complementary to the angled surfaces of the associated projection.

20. The method of claim 18, wherein the one or more projections comprise two projections, each with a rounded surface, and each recess comprises a rounded surface that is complementary to the rounded surface of the associated projection.

21. The method of claim 15, wherein the at least one control feature comprises a leg extending into the plug, away from the locking feature, and a check pin extending laterally from the leg into the keyway, and wherein step B comprises:

inserting a key into the keyway and receiving the check pin within a first control slot formed on a side of the key to prevent the secondary locking element from moving inwardly and prevent the secondary locking element from disengaging from the locking feature; and fully inserting the key into the keyway until the check pin is received within a second control slot formed on a side of the key and extending from the first control slot to allow movement of the check pin within the second control slot to permit the secondary locking element to move inwardly and disengage from the locking feature.

22. The method of claim 21, wherein each secondary locking element includes one or more projections and the locking feature comprises a recess associated with each projection formed in the inner surface of the bore of the housing, wherein each recess has a surface that is complementary to a surface of the associated projection so that when a key is inserted into the keyway and each primary pin assembly is positioned such that the interface between the at least one top driver and the bottom pin coincides with the shear line between the bore of the housing and the plug, the slider is moved from the first position to the second position by the key, and torque is applied to the plug, the complementary surfaces of each projection of the secondary locking element and the associated recess cause each projection to move out of the associated recess and to the shear line.

23. The method of claim 22, wherein the one or more projections comprise a projection with angled surfaces and each recess comprises a groove having angled surfaces that are complementary to the angled surfaces of the projection.

24. The method of claim 22, wherein the one or more projections comprise two projections, each with a rounded surface, and each recess comprises a rounded surface that is complementary to the rounded surface of the associated projection.

25. The method of claim 16, wherein the at least one control feature further comprises a check pin extending laterally from the leg into the keyway, wherein step B further comprises inserting a key into the keyway and receiving the check pin within a first control slot formed on a side of the key to prevent the secondary locking element from moving inwardly and prevent the secondary locking element from disengaging from the locking feature, and fully inserting the key into the keyway until the check pin is received within a second control slot formed on a side of the key to allow movement of the check pin within the second control slot to permit the secondary locking element to move inwardly and disengage from the locking feature.

26. The method of claim 25, wherein each secondary locking element includes one or more projections and the locking feature comprises a recess associated with each projection formed in the inner surface of the bore of the housing, wherein each recess has a surface that is complementary to a surface of the associated projection so that when a key is inserted into the keyway and each primary pin assembly is positioned such that the interface between the at least one top driver and the bottom pin coincides with the shear line between the bore of the housing and the plug, the slider is moved from the first position to the second position by the key, and torque is applied to the plug, the complementary surfaces of each projection of the secondary locking element and the associated recess cause each projection to move out of the associated recess and to the shear line.

27. The method of claim 26, wherein the one or more projections comprise a projection with angled surfaces and each recess comprises a groove having angled surfaces that are complementary to the angled surfaces of the projection.

28. The method of claim 27, wherein the one or more projections comprise two projections, each with a rounded surface, and each recess comprises a rounded surface that is complementary to the rounded surface of the associated projection.

29. The method of claim 15, wherein the at least one control feature comprises a leg extending into the plug, away from the locking feature, and a drive pin extending laterally from the leg into the keyway, and wherein step B comprises inserting a key into the keyway and engaging the drive pin by a non-actuating control surface formed on a side of the key without causing movement of the secondary locking element and fully inserting the key into the keyway until the drive pin is engaged by an actuating control surface on the key to cause the secondary locking element to move inwardly and disengage from the locking feature.

30. The method of claim 15, wherein step A comprises inserting a key into the keyway and contacting the tip of the bottom pin of each primary pin assembly with an upper bitting surface of the key and step B comprises directly or indirectly engaging the control feature of the secondary locking element with at least one of a side bitting surface and a side control surface of the key.

31. A key blank adapted to be cut into a key for operating a lock assembly, wherein the lock assembly comprises (i) a housing, (ii) a plug rotatably disposed within a bore formed in the housing, with a keyway extending axially into the plug, (iii) a plurality of primary pin assemblies, each primary pin assembly comprising at least one top driver, a bottom pin, and a spring, wherein each primary pin assembly is disposed within aligned holes formed in the housing and the plug and wherein the spring contacts the at least one top driver within the hole formed in the housing to bias the primary pin assembly with an end of the bottom pin extending into the keyway, and (iv) at least one secondary locking element disposed within a pocket formed in the plug, each secondary locking element being associated with one primary pin assembly, wherein the secondary locking element is biased outwardly from the plug to engage a locking feature formed in an inner surface of the bore of the housing to prevent the plug from rotating within the bore of the housing, wherein a portion of the bottom pin of the associated primary pin assembly extends through the secondary locking element and into the keyway, and wherein the associated primary pin assembly is movable independently of the secondary locking element in a direction away from the keyway, and wherein each secondary locking element includes at least one control feature, wherein the key blank comprises:

a primary top edge, wherein the primary top edge is configured to receive primary bittings cut therein for contacting a tip of the bottom pin of each primary pin assembly to manipulate each primary pin assembly into a position such that an interface between the at least one top driver and the bottom pin coincides with a shear line between the bore of the housing and the plug;

a bottom edge;

first and second opposed sides extending between the primary top edge and the bottom edge; and at least one of a side bitting surface and a side control surface formed on at least one of the first and second opposed sides for directly or indirectly engaging the control feature of each secondary locking element (i) to cause the secondary locking element to move inwardly toward the plug so that the secondary locking element disengages from the locking feature or (ii) to permit the secondary locking element to be moved inwardly toward the plug so that the secondary locking element can disengage from the locking feature.

32. The key blank of claim 31, including a clearance cut formed in the primary top edge, wherein the clearance cut is lower than the primary top edge.

33. The key blank of claim 31, wherein the at least one control feature comprises a leg extending into the plug, away from the locking feature, and wherein the lock assembly further comprises a slider movably disposed within a slider pocket formed in the plug, wherein the slider includes a cutout formed in a top surface thereof and a drive tab that extends into the keyway, and wherein the key blank comprises:

a side bitting formed on at least one of the first and second opposed side surfaces, wherein the side bitting is configured to contact the drive tab when the key is inserted into the keyway to move the slider from (i) a first position in which the cutout is not aligned with the leg so that the leg contacts a top surface of the slider to prevent the secondary locking element from moving inwardly and prevent the secondary locking element from disengaging from the locking feature to (ii) a second position in which the cutout is aligned with the leg so that the leg may be received within the cutout to permit the secondary locking element to move inwardly and disengage from the locking feature.

34. The key blank of claim 31, wherein the at least one control feature comprises a leg extending into the plug, away from the locking feature, and a check pin extending laterally from the leg into the keyway, and wherein the key blank comprises a first control slot and a second control slot formed on at least one of the first and second opposed side surfaces, wherein the first control slot is configured to receive the check pin when the key is inserted into the keyway to prevent the secondary locking element from moving inwardly and prevent the secondary locking element from disengaging from the locking feature, and the second control slot is configured to receive the check pin when the key is fully inserted into the keyway to allow movement of the check pin within the second control slot to permit the secondary locking element to move inwardly and disengage from the locking feature.

35. The key blank of claim 33, wherein the at least one control feature comprises a check pin extending laterally from the leg into the keyway, and wherein the key blank comprises a first control slot and a second control slot formed on at least one of the first and second opposed side surfaces, wherein the first control slot is configured to receive the check pin when the key is inserted into the keyway to prevent the secondary locking element from moving inwardly and prevent the secondary locking element from disengaging from the locking feature, and the second control slot is configured to receive the check pin when the key is fully inserted into the keyway to allow movement of the check pin within the second control slot to permit the secondary locking element to move inwardly and disengage from the locking feature.

36. The key blank of claim 31, wherein the at least one control feature comprises a leg extending into the plug, away from the locking feature, and a drive pin extending laterally from the leg into the keyway, and wherein the key blank comprises a non-actuating control surface and an actuating control surface formed on at least one of the first and second opposed side surfaces, wherein the non-actuating control surface is configured to engage the drive pin when the key is first inserted into the keyway without causing movement of the secondary locking element and the actuating control surface is configured to engage the drive pin when the key is fully inserted into the keyway to cause the secondary locking element to move inwardly and disengage from the locking feature.

37. A method of forming a key from a key blank having a blade with a top edge, a bottom edge, and first and second opposed sides extending between the top edge and the bottom edge, wherein the key is operable for opening a lock assembly comprising (i) a housing, (ii) a plug rotatably disposed within a bore formed in the housing, with a keyway extending axially into the plug, (iii) a plurality of primary pin assemblies, each primary pin assembly comprising at least one top driver, a bottom pin, and a spring, wherein each primary pin assembly is disposed within aligned holes formed in the housing and the plug and wherein the spring contacts the at least one top driver within the hole formed in the housing to bias the primary pin assembly with an end of the bottom pin extending into the keyway, and (iv) at least one secondary locking element disposed within a pocket formed in the plug, each secondary locking element being associated with one primary pin assembly, wherein each secondary locking element is biased outwardly from the plug to engage a locking feature formed in an inner surface of the bore of the housing to prevent the plug from rotating within the bore of the housing, wherein a portion of the bottom pin of the associated primary pin assembly extends through the secondary locking element and into the keyway, and wherein the associated primary pin assembly is movable independently of the secondary locking element in a direction away from the keyway, and wherein each secondary locking element includes at least one control feature, wherein the method comprises:

forming primary bittings on the top edge of the blade of the key blank, wherein the primary bittings are configured contacting a tip of the bottom pin of each primary pin assembly to manipulate each primary pin assembly into a position such that an interface between the at least one top driver and the bottom pin coincides with a shear line between the bore of the housing and the plug; and forming at least one of a side bitting surface and a side control surface on at least one of the first and second opposed sides, wherein the at least one of the side bitting surface and the side control surface is configured to directly or indirectly engage the control feature of each secondary locking element when the key is inserted into the keyway to (i) cause the secondary locking element to move inwardly toward the plug so that the secondary locking element disengages from the locking feature or (ii) permit the secondary locking element to be moved inwardly toward the plug so that the secondary locking element can disengage from the locking feature.

38. The method of claim 37, wherein the at least one control feature comprises a leg extending into the plug, away from the locking feature, and wherein the lock assembly further comprises a slider movably disposed within a slider pocket formed in the plug, wherein the slider includes a cutout formed in a top surface thereof and a drive tab that extends into the keyway, and wherein the method comprises forming a side bitting on at least one of the first and second opposed side surfaces, wherein the side bitting is configured to contact the drive tab when the key is inserted into the keyway to move the slider from (i) a first position in which the cutout is not aligned with the leg so that the leg contacts a top surface of the slider to prevent the secondary locking element from moving inwardly and prevent the secondary locking element from disengaging from the locking feature to (ii) a second position in which the cutout is aligned with the leg so that the leg may be received within the cutout to permit the secondary locking element to move inwardly and disengage from the locking feature.

39. The method of claim 37, wherein the at least one control feature comprises a leg extending into the plug, away from the locking feature, and a check pin extending laterally from the leg into the keyway, and wherein the method comprises:

forming a first control slot formed on a side of the key, wherein the first control slot receives the check pin when the key is inserted into the keyway to prevent the secondary locking element from moving inwardly and prevent the secondary locking element from disengaging from the locking feature; and forming a second control slot on a side of the key and extending from the first control slot, wherein, when the key is fully inserted into the keyway, the check pin is received within second control slot to allow movement of the check pin within the second control slot to permit the secondary locking element to move inwardly and disengage from the locking feature.

40. The method of claim 38, wherein the at least one control feature comprises a check pin extending laterally from the leg into the keyway, and wherein the method comprises:

forming a first control slot formed on a side of the key, wherein the first control slot receives the check pin when the key is inserted into the keyway to prevent the secondary locking element from moving inwardly and prevent the secondary locking element from disengaging from the locking feature; and forming a second control slot on a side of the key and extending from the first control slot, wherein, when the key is fully inserted into the keyway, the check pin is received within second control slot to allow movement of the check pin within the second control slot to permit the secondary locking element to move inwardly and disengage from the locking feature.

41. The method of claim 37, wherein the at least one control feature comprises a leg extending into the plug, away from the locking feature, and a drive pin extending laterally from the leg into the keyway, and wherein the method comprises forming a non-actuating control surface on a side of the key and an actuating control surface, wherein the non-actuating control surface is configured to engage the drive pin as the key is inserted into the keyway without moving the secondary locking element, and wherein the actuating control surface is configured to engage the drive pin when the key is fully inserted into the keyway to cause the secondary locking element to move inwardly and disengage from the locking feature.

42. The method of claim 37, further comprising forming a clearance cut for each secondary locking element in the top edge of the blade, wherein each clearance cut is lower than a highest peak of the primary bittings.

43. The method of claim 37, wherein the key blank includes a clearance cut formed in the top edge of blade, wherein the clearance cut is lower than the top edge of the blade.

* * * * *